US007439309B2

(12) United States Patent
Yanagi et al.

(10) Patent No.: US 7,439,309 B2
(45) Date of Patent: Oct. 21, 2008

(54) SILVER HALIDE PHOTOGRAPHIC LIGHT-SENSITIVE MATERIAL, PHOTOGRAPHIC EMULSION, AND MERCAPTO GROUP-CONTAINING POLYMER COMPOUND USED FOR THEM

(75) Inventors: Terukazu Yanagi, Kanagawa (JP); Makiko Yokoi, Kanagawa (JP); Mamoru Sakurazawa, Kanagawa (JP); Yoshihisa Tsukada, Kanagawa (JP); Seiji Hatano, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 253 days.

(21) Appl. No.: 11/085,481

(22) Filed: Mar. 22, 2005

(65) Prior Publication Data

US 2005/0171296 A1 Aug. 4, 2005

Related U.S. Application Data

(62) Division of application No. 10/366,390, filed on Feb. 14, 2003, now Pat. No. 6,897,014.

(30) Foreign Application Priority Data

| | | | |
|---|---|---|---|
| Feb. 15, 2002 | (JP) | ............................. | 2002-037958 |
| Mar. 27, 2002 | (JP) | ............................. | 2002-088939 |
| Jul. 19, 2002 | (JP) | ............................. | 2002-211136 |

(51) Int. Cl.
*C08F 8/34* (2006.01)
*C08F 20/56* (2006.01)

(52) U.S. Cl. .............. 525/329.8; 525/329.4; 525/329.7; 525/329.9; 525/348; 525/349; 525/350

(58) Field of Classification Search .............. 525/329.4, 525/329.7, 329.8, 329.9, 348, 349, 350
See application file for complete search history.

(56) References Cited

U.S. PATENT DOCUMENTS

| | | | | |
|---|---|---|---|---|
| 3,598,599 | A | 8/1971 | Tuites et al. | |
| 3,746,548 | A | 7/1973 | Fitzgerald et al. | |
| 4,131,471 | A | 12/1978 | Fitzgerald | |
| 4,294,920 | A | 10/1981 | Helling et al. | |
| 5,213,959 | A | 5/1993 | Saitou et al. | |
| 5,695,908 | A * | 12/1997 | Furukawa ................... | 430/205 |
| 5,698,367 | A * | 12/1997 | Furukawa et al. ........... | 430/264 |
| 6,878,513 | B2 * | 4/2005 | Yanagi et al. ............... | 430/640 |
| 2002/0155398 | A1 | 10/2002 | Yanagi et al. | |

FOREIGN PATENT DOCUMENTS

| | | | |
|---|---|---|---|
| JP | 62/000949 | A | 1/1987 |
| JP | 62-6252 | A | 1/1987 |
| JP | 64/019343 | A | 1/1989 |
| JP | 3-37643 | A | 2/1991 |
| JP | 6-019029 | | 1/1994 |
| JP | 11-265036 | A | 9/1999 |

* cited by examiner

*Primary Examiner*—Helen L. Pezzuto
(74) *Attorney, Agent, or Firm*—Birch, Stewart, Kolasch & Birch, LLP

(57) ABSTRACT

Disclosed is a silver halide photographic light-sensitive material, which has at least one polymer compound having a nitrogen-containing aromatic ring having a mercapto group represented by the formula Z-SH wherein Z represents a nitrogen-containing aromatic ring as a partial structure. This silver halide photographic light-sensitive material can stably contain silver halide grains of a high aspect ratio showing high sensitivity and superior planarity, shows superior pressure resistance and can be stably prepared.

18 Claims, No Drawings

SILVER HALIDE PHOTOGRAPHIC LIGHT-SENSITIVE MATERIAL, PHOTOGRAPHIC EMULSION, AND MERCAPTO GROUP-CONTAINING POLYMER COMPOUND USED FOR THEM

CROSS-REFERENCE TO RELATED APPLICATIONS

The present application is a 37C.F.R. § 1.53(b) divisional of U.S. application Ser. No. 10/366,390 filed on Feb. 14, 2003, now U.S Pat. No. 6,897,014 and for which priority is claimed under 35 U.S.C. § 120. This application also claims priority under 35 U.S.C. § 119 on Japanese Patent Application Nos. 037958/2002 filed on Feb. 15, 2002, 088939/2002 filed on Mar. 27, 2002, and 211136/2002 filed Jul. 19, 2002; the entire contents of all are hereby incorporated by reference.

TECHNICAL FIELD

The present invention relates to a polymer compound having a nitrogen-containing aromatic ring having a mercapto group, a photographic emulsion containing the polymer compound and silver halide grains, and a silver halide photographic light-sensitive material containing the polymer compound, in particular, such a silver halide photographic light-sensitive material in which stability for aggregation of silver halide is improved.

RELATED ART

Water-soluble polymers have been used in the photographic chemical industry for a long time, and the water-soluble polymers play various roles in photographic systems. The water-soluble polymers take the various roles in photographic systems because of the superior characteristics of the water-soluble polymers such as superior protective colloid property, sol-gel convertibility, ion permeability, and moderate moisture absorbing property and water retention. In particular, gelatin, which is one of the water-soluble polymers, shows extremely superior ability to stabilize silver halide dispersion in addition to the aforementioned characteristics, and it is widely used as dispersion stabilizer, binder and so forth for photographic light-sensitive materials even at present.

However, since gelatin is a material derived from natural products, which is extracted from bones and skins of bovines, porcines etc., it is extremely difficult to maintain fixed quality, and therefore many attempts have been made to utilize synthetic polymers as stabilizers for dispersion of silver halide. Examples include, for example, the thioether group-containing polymers described in U.S. Pat. Nos. 3,615,624, 3,860,428 and 3,706,564; hydroxyquinoline-containing polymers described in U.S. Pat. Nos. 4,030,929 and 4,152,161; acrylamide polymers described in U.S. Pat. Nos. 2,541,474, 3,284,207, 3,713,834 and 3,746,548, German Patent No. 3,284,207, Japanese Patent Publication (Kokoku, henceforth referred to as "JP-B") No. 45-14031; polyacrylic acid-containing polymer described in U.S. Pat. No. 4,131,471; amine-containing polymers described in U.S. Pat. Nos. 3,345,346, 3,706,564, 3,425,836, 3,511,818, 4,350,759, 3,832,185 and 3,852,073; polyvinyl alcohol-containing polymers described in U.S. Pat. Nos. 3,000,741, 3,236,653, 2,579,016 and 3,479,189; copolymer of acrylamide, vinylimidazole and acrylic acid described in JP-B-43-7561 and so forth. However, although they allow formation of silver halide grains, they have drawbacks that they cause or provide sensitivity reduction, poor dispersion, rounded grains, large size distribution of grains and so forth, and thus any dispersing agent more superior to gelatin has not been found yet.

In recent years, higher sensitivity of silver halide photographic light-sensitive materials came to be desired, and it has become necessary to prepare silver halide emulsions containing grains showing higher planarity and a higher aspect ratio. However, as the aspect ratio is increased, the problem of aggregation of silver halide emulsions during the preparation of the silver halide emulsions, which cannot be prevented by gelatin alone, has become more serious. Therefore, it has been attempted to inhibit the aggregation of silver halide grains by using modified gelatin, in which function portions of gelatin originally having a superior dispersing ability are modified. As such modified gelatin, gelatin covalently bonded to latex (Japanese Patent Laid-open Publication (Kokai, henceforth referred to as "JP-A") No. 7-152103) and so forth have been proposed. However, the effect thereof cannot be considered sufficient, and thus development of a dispersing agent inhibiting the aggregation of silver halide grains having a high aspect ratio has been strongly desired.

The first object of the present invention is to provide a silver halide photographic light-sensitive material that can stably contain silver halide grains of a high aspect ratio showing high sensitivity and superior planarity, shows superior pressure resistance and can be stably prepared.

The second object of the present invention is to provide a silver halide photographic emulsion of high sensitivity that can stably contain silver halide grains of a high aspect ratio without causing aggregation of the grains.

The third object of the present invention is to provide a novel polymer that can inhibit aggregation of silver halide grains of high sensitivity, superior planarity and high aspect ratio and is useful for preparation of silver halide emulsions of high sensitivity.

SUMMARY OF THE INVENTION

The inventors of the present invention conducted various researches, and as a result, they found that the aforementioned objects can be achieved by the silver halide photographic light-sensitive material of the present invention, which comprises at least one polymer compound having a nitrogen-containing aromatic ring having a mercapto group represented by the following formula (1) as a partial structure; and a photographic emulsion containing at least one kind and of polymer compound having a nitrogen-containing aromatic ring having a mercapto group represented by the formula (1) as a partial structure and silver halide grains. The aforementioned polymer compound is preferably, in particular, a mercapto group-containing polymer compound represented by the following formula (2).

$$Z\text{-}SH \qquad \text{Formula (1)}$$

In the formula, Z represents a nitrogen-containing aromatic ring.

$$Y^1—[—X—]—Y^2 \qquad \text{Formula (2)}$$

In the formula, X represents a group derived from a homopolymer or copolymer of monomers having an ethylenic unsaturated bond. $Y^1$ and $Y^2$ represent an end group of X, and at least one of them represents HS-Z-$L^1$-, where Z represents a nitrogen-containing aromatic ring and $L^1$ represents a divalent bridging group or a single bond.

BEST MODE FOR CARRYING OUT THE INVENTION

Hereafter, methods for carrying out the invention and embodiments of the present invention will be explained in detail. In the present specification, ranges indicated with "-" mean ranges including the numerical values before and after "-" as a lower limit and an upper limit.

Polymer Compound

First, the polymer compound having a nitrogen-containing aromatic ring having a mercapto group represented by the formula (1) as a partial structure (henceforth also referred to as the "polymer of the present invention") will be explained.

In the aforementioned formula (1), the nitrogen-containing aromatic ring represented by Z is specifically a monocyclic or condensed nitrogen-containing aromatic heterocyclic ring, preferably a 5- to 7-membered nitrogen-containing aromatic heterocyclic ring, more preferably a 5- or 6-membered nitrogen-containing aromatic heterocyclic ring. Specific examples include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthooxazole, azabenzimidazole, purine, pyridine, pyrazine, pyrimidine, pyridazine, triazine, triazaindene, tetrazaindeneand so forth. More preferred is a 5-membered nitrogen-containing aromatic heterocyclic ring, and specific examples thereof include imidazole, pyrazole, triazole, tetrazole, thiazole, oxazole, benzotriazole, benzothiazole, benzoxazole, thiadiazole and oxadiazole. Particularly preferred are triazole and tetrazole, and most preferred is tetrazole.

The polymer of the present invention is preferably a water-soluble polymer. In the present specification, the "water-soluble polymer" is a polymer that is dissolved in water at a concentration of 0.5 weight % or more, preferably 1.0 weight % or more, more preferably 2.0 weight % or more, still more preferably 4.0 weight % more. Moreover, the polymer of the present invention is preferably a synthetic polymer.

The polymer of the present invention is preferably contains 2 or less of mercapto groups represented by the aforementioned formula (1) per one polymer chain in average. The polymer of the present invention contains more preferably 0.01-1.5, further preferably 0.1-2, still further preferably 0.1-1.8, particularly preferably 0.2-1.5, most preferably 1 or less, of the mercapto group represented by the aforementioned formula (1) per one polymer chain in average. The number of mercapto groups per polymer chain used herein can be obtained from a molar concentration of the water-soluble polymer in an aqueous solution $A_{Mn}$, which is obtained from number average molecular weight of the polymer Mn determined by GPC measurement for the polymer using polyethylene oxide as a standard substance, and the molar concentration of the nitrogen-containing aromatic ring having a mercapto group $Q_{uv}$ in the aqueous solution of the polymer, which is obtained from UV absorbance, as a value of $Q_{uv}/A_{Mn}$. That is, the polymer of the present invention preferably has a value $Q_{uv}/A_{Mn}$ of 2 or less, more preferably 1 or less. If the introduction amount of the mercapto group is in the aforementioned range, increase of fog density can be inhibited without reducing sensitivity of the silver halide photographic light-sensitive material, and the suppression effect for the aggregation of silver halide grains can be enhanced after the dissolution of emulsion and passage of time. As a result, degradation of photographic performance during coating is improved, and it becomes possible to prepare a silver halide emulsion having more superior suitability for the production.

In the polymer of the present invention, the mercapto group represented by the aforementioned formula (1) is preferably introduced into one end of the polymer.

Preferred embodiments of the polymer of the present invention include a polymer represented by the aforementioned formula (2).

In the formula, $Y^1$ and $Y^2$ are end groups of X, and at least one of them represents HS-Z-$L^1$-. Z has the same meaning as defined in the formula (1), and the preferred range thereof is also the same. When only one of $Y^1$ and $Y^2$ represents H-Z-$L^1$-, the other may be any group introduced during the polymer synthesis process, and for example, a hydrogen atom, a polymerization initiator, a solvent molecule or a monomer derivative as well as a derivative of an additive added during the synthesis may constitute the other end group.

$L^1$ represents a divalent bridging group or a single bond. Although it is not particularly limited so long as it is a divalent bridging group or a single bond, $L^1$ is preferably a divalent bridging group having 0-20 carbon atoms. Specific examples thereof include an alkylene group having 1-20 carbon atoms (e.g., methylene, ethylene, propylene, butylene, xylylene etc.), an arylene group having 6-20 carbon atoms (e.g., phenylene, naphthylene etc.), —C(=O)—, —S(=O)$_2$—, —S(=O)—, —S—, —O—, —P(=O)O$^-$—, —P(=O)OR$^a$—, —NR$^a$— ($R^a$ represents a hydrogen atom or a substituent, and the substituent may be any of those mentioned later as the substituent T), —N=, an aromatic heterocyclic ring group and a divalent bridging group having 0-20 carbon atoms consisting of a combination of two or more kinds of them. Specific examples are mentioned below.

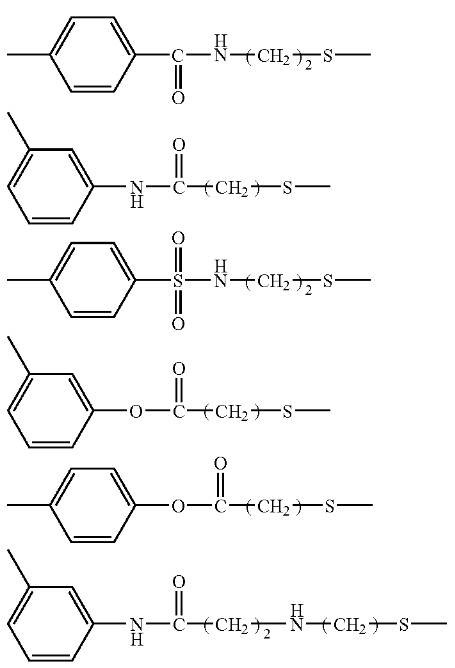

Although these groups may bond to Z at either the left sides or right sides of them, they preferably bond to Z at their left sides.

If possible, $L^1$ may further have a substituent Y, and examples of Y include, for example, an alkyl group having preferably 1-20 carbon atoms, more preferably 1-12 carbon atoms, particularly preferably 1-8 carbon atoms (e.g., methyl group, ethyl group, isopropyl group, tert-butyl group, n-octyl group, n-decyl group, n-hexadecyl group, cyclopropyl group, cyclopentyl group, cyclohexyl group etc.), an alkenyl group having preferably 2-20 carbon atoms, more preferably 2-12 carbon atoms, particularly preferably 2-8 carbon atoms (e.g., vinyl group, allyl group, 2-butenyl group, 3-pentenyl group etc.), an alkynyl group having preferably 2-20 carbon atoms, more preferably 2-12 carbon atoms, particularly preferably 2-8 carbon atoms (e.g., propargyl group, 3-pentynyl group etc.), an aryl group having preferably 6-30 carbon atoms, more preferably 6-20 carbon atoms, particularly preferably 6-12 carbon atoms (e.g., phenyl group, p-methylphenyl group, naphthyl group etc.), a substituted or unsubstituted amino group having preferably 0-20 carbon atoms, more preferably 0-10 carbon atoms, particularly preferably 0-6 carbon atoms (e.g., unsubstituted amino group, methylamino group, dimethylamino group, diethylamino group, dibenzylamino group etc.), an alkoxy group having preferably 1-20 carbon atoms, more preferably 1-12 carbon atoms, particularly preferably 1-8 carbon atoms (e.g., methoxy, ethoxy, butoxy etc.), an aryloxy group having preferably 6-20 carbon atoms, more preferably 6-16 carbon atoms, particularly preferably 6-12 carbon atoms (e.g., phenyloxy group, 2-naphthyloxy group etc.), an acyl group having preferably 1-20 carbon atoms, more preferably 1-16 carbon atoms, particularly preferably 1-12 carbon atoms (e.g., acetyl group, benzoyl group, formyl group, pivaloyl group etc.), an alkoxycarbonyl group having preferably 2-20 carbon atoms, more preferably 2-16 carbon atoms, particularly preferably 2-12 carbon atoms (e.g., methoxycarbonyl group, ethoxycarbonyl group etc.), an aryloxycarbonyl group having preferably 7-20 carbon atoms, more preferably 7-16 carbon atoms, particularly preferably 7-10 carbon atoms (e.g., phenyloxycarbonyl group etc.), an acyloxy group having preferably 2-20 carbon atoms, more preferably 2-16 carbon atoms, particularly preferably 2-10 carbon atoms (e.g., acetoxy group, benzoyloxy group etc.), an acylamino group having preferably 2-20 carbon atoms, more preferably 2-16 carbon atoms, particularly preferably 2-10 carbon atoms (e.g., acetylamino group, benzoylamino group etc.), an alkoxycarbonylamino group having preferably 2-20 carbon atoms, more preferably 2-16 carbon atoms, particularly preferably 2-12 carbon atoms (e.g., methoxycarbonylamino group etc.), an aryloxycarbonylamino group having preferably 7-20 carbon atoms, more preferably 7-16 carbon atoms, particularly preferably 7-12 carbon atoms (e.g., phenyloxycarbonylamino group etc.), a sulfonylamino group having preferably 1-20 carbon atoms, more preferably 1-16 carbon atoms, particularly preferably 1-12 carbon atoms (e.g., methanesulfonylamino group, benzenesulfonylamino group etc.), a sulfamoyl group having preferably 0-20 carbon atoms, more preferably 0-16 carbon atoms, particularly preferably 0-12 carbon atoms (e.g., sulfamoyl group, methylsulfamoyl group, dimethylsulfamoyl group, phenylsulfamoyl group etc.), a carbamoyl group having preferably 1-20 carbon atoms, more preferably 1-16 carbon atoms, particularly preferably 1-12 carbon atoms (e.g., carbamoyl group, methylcarbamoyl group, diethylcarbamoyl group, phenylcarbamoyl group etc.), an alkylthio group having preferably 1-20 carbon atoms, more preferably 1-16 carbon atoms, particularly preferably 1-12 carbon atoms (e.g., methylthio group, ethylthio group etc.), an arylthio group having preferably 6-20 carbon atoms, more preferably 6-16 carbon atoms, particularly preferably 6-12 carbon atoms (e.g., phenylthio group etc.), a sulfonyl group having preferably 1-20 carbon atoms, more preferably 1-16 carbon atoms, particularly preferably 1-12 carbon atoms (e.g., mesyl group, tosyl group etc.), a sulfinyl group having preferably 1-20 carbon atoms, more preferably 1-16 carbon atoms, particularly preferably 1-12 carbon atoms (e.g., methanesulfinyl group, benzenesulfinyl group etc.), a ureido group having preferably 1-20 carbon atoms, more preferably 1-16 carbon atoms, particularly preferably 1-12 carbon atoms (e.g., ureido group, methylureido group, phenylureido group etc.), a phosphoric acid amido group having preferably 1-20 carbon atoms, more preferably 1-16 carbon atoms, particularly preferably 1-12 carbon atoms (e.g., diethylphosphoric acid amido group, phenylphosphoric acid amido group etc.), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group having preferably 1-30 carbon atoms, more preferably 1-12 (examples of the hetero atom include, for example, nitrogen atom, oxygen atom, sulfur atom and so forth, and examples of the heterocyclic group include imidazolyl group, pyridyl group, quinolyl group, furyl group, piperidyl group, morpholino group, benzoxazolyl group, benzimidazolyl group, benzothiazolyl group etc.), a silyl group having preferably 3-40 carbon atoms, more preferably 3-30 carbon atoms, particularly preferably 3-24 carbon atoms (e.g., trimethylsilyl group, triphenylsilyl group, etc.) and so forth. These substituents may be further substituted with other substituents. Further, two or more substituents exist, they may be identical to or different from each other or one another. If possible, they may bond to each other to form a ring.

In the aforementioned formula (2), X represents a group derived from a homopolymer or copolymer of monomers having an ethylenic unsaturated bond. When it is derived from a copolymer, the copolymer may be in the form of any of a random copolymer, a block copolymer, an alternating copolymer and a graft copolymer. When X is derived from a copolymer, the monomer forming a covalent bond with $L^1$ is not also particularly limited.

X contains at least one monomer unit (henceforth referred to as "monomer") containing an ethylenic unsaturated bond. The monomer is not particularly limited so long as it is a polymerizable monomer, and either a monomer polymerizable by radical polymerization or a monomer polymerizable by ionic polymerization may be used. As the monomer of X, a monomer of which homopolymer becomes water-soluble is preferred. X may be a copolymer of two or more kinds of monomers, so long as the water solubility of the polymer is not degraded. Further, X preferably has at least one sulfonic acid group or phosphoric acid group.

Examples of the monomer having a sulfonic acid group contained in X include the monomers of the following monomer group (k), and examples of the monomer having a phosphoric acid group contained in X include the monomers of the following monomer group (l).

(k) Monomers having sulfonic acid group: sodium styrenesulfonate, ammonium styrenesulfonate, lithium styrenesulfonate, 2-acrylamido-2-methyl-propanesulfonic acid, sodium 2-acrylamido-2-methyl-propanesulfonate, ammonium 2-acryl-amido-2-methyl-propanesulfonate, sodium 3-acryloyloxypropanesulfonate, potassium 3-methacryloyloxypropanesulfonate, isoprenesulfonic acid etc. as well as vinylsulfonic acid etc.

(l) Monomers having phosphoric acid group:

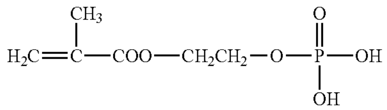

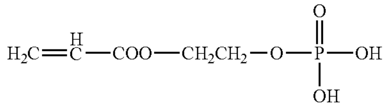

-continued

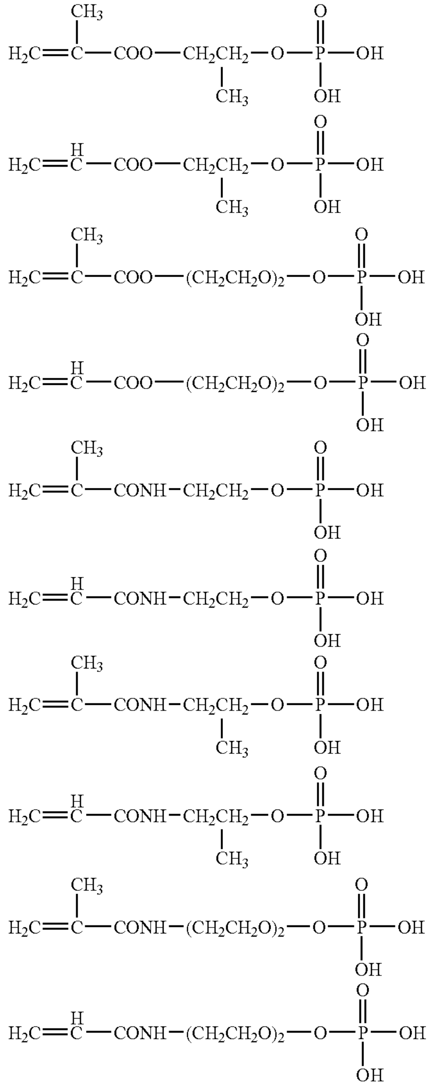

etc.

Examples of the monomer of which homopolymer becomes water-soluble include the monomers of the following monomer group (m), and all of them are preferably used as the monomer of X.

(m) Acrylic acid, methacrylic acid, acrylamide, N-methylacrylamide, N-n-propylacrylamide, N-isopropylacrylamide, N,N-dimethylacrylamide, N-acryloylmorpholine, N-acryloylpiperidine, methacrylamide, N-methylmethacrylamide, N-methacryloylmorpholine, N-vinylpyrrolidone, N-vinylacetamide, diacetoneacrylamide, ω-methoxypolyethylene glycol acrylate (molar number of added polyethylene glycol: n=9), ω-methoxypolyethylene glycol acrylate (molar number of added polyethylene glycol: n=23), N-methoxyethylacrylamide, N-vinylimidazole etc.

When X is derived from a copolymer, examples of the copolymer include copolymers consisting of at least one monomer selected from the monomer groups (k) to (m) mentioned above and at least one monomer selected from the monomer groups (a) to (j) mentioned below. Monomers belonging to the monomer groups (a) to (j) are mentioned again even if they are monomers belonging to the monomer group (k).

(a) Conjugated dienes: 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-butadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chloro-1,3-butadiene, 2-fluoro-1,3-butadiene, 2,3-dichloro-1,3-butadiene, 1,1,2-trichloro-1,3-butadiene, 2-cyano-1,3-butadiene, cyclopentadiene etc.

(b) Olefins: ethylene, propylene, vinyl chloride, vinylidene chloride, 6-hydroxy-1-hexene, 4-pentenoic acid, methyl 8-nonenate, vinylsulfonic acid, trimethylvinylsilane, trimethoxyvinylsilane, 1,4-divinylcyclohexane, 1,2,5-trivinylcyclohexane etc.

(c) α,β-Unsaturated carboxylic acid esters: alkyl acrylates (e.g., methyl acrylate, ethyl acrylate, butyl acrylate, cyclohexyl acrylate, 2-ethylhexyl acrylate, dodecyl acrylate etc.), substituted alkyl acrylates (e.g., 2-chloroethyl acrylate, benzyl acrylate, 2-cyanoethyl acrylate etc.), alkyl methacrylates (e.g., methyl methacrylate, butyl methacrylate, 2-ethylhexyl methacrylate, dodecyl methacrylate etc.), substituted alkyl methacrylates (e.g., 2-hydroxyethyl methacrylate, glycidyl methacrylate, glycerol monomethacrylate, 2-acetoxyethyl methacrylate, tetrahydrofurfuryl methacrylate, 2-methoxyethyl methacrylate, polypropylene glycol monomethacrylate (molar number of added polyoxypropylene=2-100), 3-N,N-dimethylaminopropyl methacrylate, chloro-3-N,N,N-trimethylammoniopropyl methacrylate, 2-carboxyethyl methacrylate, 3-sulfopropyl methacrylate, 4-oxysulfobutyl methacrylate, 3-trimethoxysilylpropyl methacrylate, allyl methacrylate, 2-isocyanatoethyl methacrylate etc.), derivatives of unsaturated dicarboxylic acids (e.g., monobutyl maleate, dimethyl maleate, monomethyl itaconate, dibutyl itaconate etc.), multifunctional esters (e.g., ethylene glycol diacrylate, ethylene glycol dimethacyrlate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate, 1,2,4-cyclohexane tetramethacrylate etc.);

(d) Amides of β-unsaturated carboxylic acids: for example, acrylamide, methacrylamide, N-methylacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetoacetoxyethyl)acrylamide, N-acryloylmorpholine, diacetoneacrylamide, itaconicacid diamide, N-methylmaleimide, 2-acrylamido-methylpropanesulfonic acid, methylenebisacrylamide, dimethacryloylpiperazine etc.

(e) Unsaturated nitriles: acrylonitrile, methacrylonitrile etc.

(f) Styrene and derivatives thereof: styrene, vinyltoluene, p-tert-butylstyrene, vinylbenzoic acid, methyl vinylbenzoate, α-methylstyrene, p-chloromethylstyrene, vinylnaphthalene, p-hydroxymethylstyrene, p-aminomethylstyrene, 1,4-divinylbenzene etc.

(g) Vinyl ethers: methyl vinyl ether, butyl vinyl ether, methoxyethyl vinyl ether etc.

(h) Vinyl esters: vinyl acetate, vinyl propionate, vinyl benzoate, vinyl salicylate, vinyl chloroacetate etc.

(i) Monomers having carboxylic acid group: acrylic acid, sodium acrylate, potassium acrylate, lithium acrylate, ammonium acrylate, methacrylic acid, sodium methacrylate, potassium methacrylate, lithium methacrylate, ammonium methacrylate, itaconic acid, potassium itaconate, maleic acid, $CH_2{=}CHCOOCH_2CH_2COOH$, $CH_2{=}CHCONHCH_2CH_2COOH$, $CH_2{=}CHC_6H_5COOH$ (p), $CH_2{=}CHCOOCH_2CH_2CH_2COOH$, α-chloroacrylic acid etc.

(j) Other polymerizable monomers: N-vinylimidazole, 4-vinylpyridine, N-vinylpyrrolidone, 2-vinyloxazoline, 2-isopropenyloxazoline etc.

Examples of X obtained from monomers of the monomer group (m) include those derived from copolymers of at least one monomer selected from the monomer group (m) and at least one monomer having an acid radical selected from the aforementioned monomer group (i). More preferred examples include those derived from homopolymers of one monomer selected from monomer group (m) or copolymers of two or more kinds of monomers selected from monomer group (m). Further preferred embodiments are those derived from homopolymers of a monomer having a carboxylic acid group or an amide group and copolymers of two or more monomers having a carboxylic acid group or an amide group, still further preferred examples are those derived from homopolymers and copolymers of one or more kinds of monomers selected from acrylic acid, methacrylic acid, acrylamide, $CH_2{=}CHCOOCH_2CH_2COOH$, $CH_2{=}CHCONHCH_2CH_2COOH$ and $CH_2{=}CHCOOCH_2CH_2CH_2COOH$, and particularly preferred embodiments are those derived from homopolymers of acrylic acid, methacrylic acid or acrylamide, and copolymers of these monomers and a monomer of acrylic acid, methacrylic acid, acrylamide, $CH_2{=}CHCOOCH_2CH_2COOH$, $CH_2{=}CHCONHCH_2CH_2COOH$, $CH_2{=}CHCOOCH_2CH_2CH_2COOH$ or the like.

Particularly preferred examples of X are those derived from homopolymers of one monomer selected from the monomer groups (k) to (l), copolymers of two or more kinds of monomers selected from the monomer groups (k) to (l) and copolymers of at least one monomer selected from the monomer groups (k) to (l) and at least one monomer selected from the monomer group (m), and more preferred are those derived from homopolymers of one monomer selected from the monomer groups (k), copolymers of two or more kinds of monomers selected from the monomer groups (k) and copolymers of at least one monomer selected from the monomer group (k) and at least one monomer selected from the monomer group (m). Particularly preferred are those derived from homopolymers and copolymers consisting of one or more kinds of monomers selected from 2-acrylamido-2-methyl-propanesulfonic acid, sodium 2-acrylamido-2-methylpropanesulfonate, ammonium 2-acrylamido-2-methyl-propanesulfonate, sodium 3-acryloyloxypropanesulfonate and potassium 3-methacryloyloxypropanesulfonate and copolymers of at least one monomer selected from 2-acrylamido-2-methylpropanesulfonic acid, sodium 2-acrylamido-2-methylpropanesulfonate, ammonium 2-acrylamido-2-methylpropanesulfonate, sodium 3-acryloyloxypropanesulfonate and potassium 3-methacryloyloxypropanesulfonate and at least one monomer selected from the monomer group (m).

A preferred embodiment of the polymer represented by the aforementioned formula (2) is a polymer represented by the following formula (2-A).

Formula (2-A)

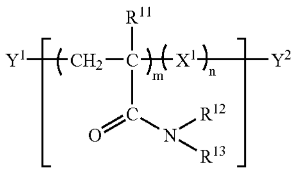

In the formula, $R^{11}$ represents a hydrogen atom or methyl group, preferably a hydrogen atom.

$R^{12}$ and $R^{13}$ each independently represent a hydrogen atom or a substituent, and the substituent has the same meaning as the aforementioned substituent Y. $R^{12}$ and $R^{13}$ represent preferably a hydrogen atom or an alkyl group, more preferably a hydrogen atom or an alkyl group having 1-6 carbon atoms, further preferably a hydrogen atom or methyl group, particularly preferably a hydrogen atom.

In the formula, $X^1$ represent a unit of a monomer having an ethylenic unsaturated bond, and $(X^1)_n$ may consist of two or more monomers. $X^1$ is not particularly limited so long as it can be polymerized, and a monomer selected from the monomer groups (a) to (m) mentioned as examples of the monomer of X in the aforementioned formula (2) can be used.

Preferred embodiment of the polymer compound represented by the aforementioned formula (2-A) are such a polymer in which $X^1$ consists of at least one monomer selected from the monomer group (i) of monomers having an acid group, and such a polymer not having $X^1$ (that is, n=0). A more preferred embodiment is such a polymer in which $X^1$ consists of at least one monomer having carboxylic acid group, a still more preferred embodiment is such a polymer in which $X^1$ is acrylic acid, methacrylic acid, $CH_2{=}CHCOOCH_2CH_2COOH$, $CH_2{=}CHCONHCH_2CH_2COOH$ or $CH_2{=}CHCOOCH_2CH_2CH_2COOH$, and a particularly preferred embodiment is such a polymer in which $X^1$ is acrylic acid or methacrylic acid.

In the formula, m and n represent weight ratios of the monomer units, and m+n=100. m is preferably 50-100, more preferably 70-100, further preferably 80-100. n is preferably 0-50, more preferably 0-30, further preferably 0-20.

When $X^1$ include two or more kinds of monomer units, the sum of the weight ratios of these monomer units is used as n.

$Y^1$ and $Y^2$ represent an end group, and at least one of them represents HS-Z-$L^1$-. It is preferred that at least $y^1$ should be HS-Z-$L^1$-. Z represents a nitrogen-containing aromatic ring and has the same meaning as Z in the aforementioned formula (1), and the preferred range thereof is also the same. $L^1$ represents a divalent bridging group or a single bond and has the same meaning as $L^1$ in the aforementioned formula (2), and the preferred range thereof is also the same.

A more preferred embodiment of the polymer represented by the aforementioned formula (2) is a polymer represented by the following formula (2-B).

Formula (2-B)

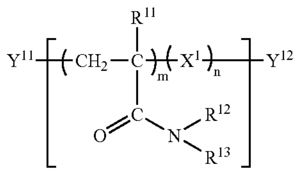

In the formula, $X^1$, $R^{11}$, m and n have the same meanings as those defined in the formula (2-A), and the preferred ranges thereof are also the same. $Y^{11}$ and $Y^{12}$ represent an end group, and at least one of them represents a group represented by the following formula (3).

Formula (3)

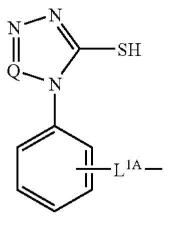

In the formula, $L^{1A}$ represents a divalent bridging group or a single bond. Although it is not particularly limited so long as it is a divalent bridging group or a single bond, $L^{1A}$ is preferably a divalent bridging group having 0-14 carbon atoms.

Specific examples include an alkylene group having 1-14 carbon atoms (e.g., methylene, ethylene, propylene, butylene, xylylene etc.), an arylene group having 6-14 carbon atoms (e.g., phenylene, naphthylene etc.), —C(═O)—, —S(═O)$_2$—, —S (═O)—, —S—, —O—, —P(═O)$O^-$—, —P(═O)$OR^a$—, —$NR^a$— ($R^a$ represents a hydrogen atom or a substituent, and the substituent may be any of those mentioned above as the substituent Y), —N═, an aromatic heterocyclic ring group and a divalent bridging group having 0-14 carbon atoms consisting of a combination of two or more kinds of these. Specific examples are mentioned below.

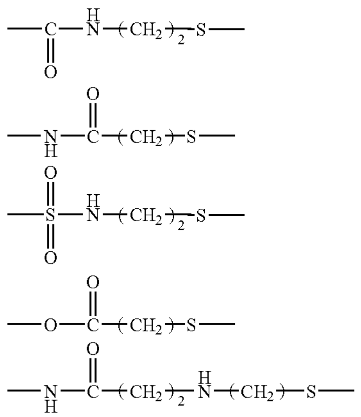

In the formula, Q represents N, CH or C—SH, preferably N or CH, more preferably N.

A further preferred embodiment of the polymer represented by the aforementioned formula (2) is a polymer represented by the following formula (2-C).

Formula (2-C)

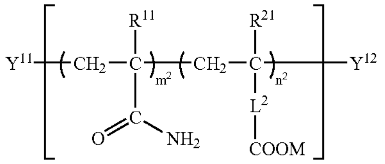

In the formula, $Y^{11}$ and $Y^{12}$ have the same meanings as those mentioned in the aforementioned formula (2-B). That is, at least $Y^{12}$ or $Y^{12}$ represents a group represented by the aforementioned formula (3), and the preferred ranges thereof are also the same.

In the formula, $R^{11}$ has the same meaning as $R^{11}$ defined in the aforementioned formula (2-B), and the preferred range thereof is also the same.

In the formula, $R^{21}$ represents a hydrogen atom or methyl group, preferably a hydrogen atom.

In the formula, $L^2$ represents a divalent bridging group or a single bond. Although it is not particularly limited so long as it is a divalent bridging group or a single bond, $L^2$ is preferably a single bond or a divalent bridging group having 0-20 carbon atoms, more preferably a single bond or a divalent bridging group having 0-10 carbon atoms. Specific examples include a single bond, an alkylene group having 1-10 carbon atoms (e.g., methylene, ethylene, propylene, butylene, xylylene etc.), an arylene group having 6-10 carbon atoms (e.g., phenylene, naphthylene etc.), —C(═O)—, —S(═O)$_2$—, —S (═O)—, —S—, —O—, —P(═O)_O—, —P(═O)$OR^a$—, —$NR^a$— ($R^a$ represents a hydrogen atom or a substituent, and the substituent may be any of those mentioned above as the substituent Y), —N═, an aromatic heterocyclic ring group and a divalent bridging group having 0-10 carbon atoms consisting of a combination of two or more kinds of these, and more preferred are a single bond or groups represented by the following formulas.

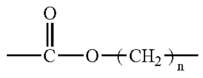

n = 1~9

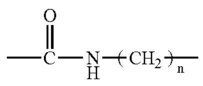

n = 1~9

Although these groups may bond to the polymer backbone at either the left sides or right sides of them, they preferably bond to the polymer backbone at their left sides.

In the formula, $m^2$ and $n^2$ represent weight ratios of the monomer units, and $m^2+n^2=100$. $m^2$ is preferably 50-100, more preferably 70-100, further preferably 80-100. $n^2$ is preferably 0-50, more preferably 0-30, further preferably 0-20.

In the formula, M represents a hydrogen atom or a cation. It is preferably a hydrogen atom, an alkali metal ion, an alkaline earth metal ion or an ammonium ion, particularly preferably a hydrogen atom, lithium ion, sodium ion, potassium ion or an ammonium ion.

A particularly preferred embodiment of the polymer represented by the aforementioned formula (2) is a polymer represented by the following formula (2-D).

Formula (2-D)

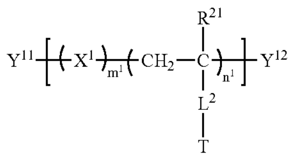

In the formula, $R^{21}$ represents a hydrogen atom or a substituent, and the substituent has the same meaning as the aforementioned substituent Y. $R^2$ preferably represents a hydrogen atom or an alkyl group, more preferably a hydrogen atom or an alkyl group having 1-6 carbon atoms, further preferably a hydrogen atom or methyl group, particularly preferably a hydrogen atom.

In the formula, $X^1$ represent a unit of monomer having an ethylenic unsaturated bond, and $(X^1)_{m1}$ may consist of two or more monomers. $X^1$ is not particularly limited so long as it can be polymerized, and a monomer selected from the monomer groups (a) to (j) and (m) mentioned as examples of the monomer of X in the aforementioned formula (2) can be used.

A preferred embodiment of the polymer compound represented by the aforementioned formula (2-D) is such a polymer in which $X^1$ consists of at least one monomer unit selected from the monomer group (m) and monomer groups (a) to (j). A more preferred embodiment is such a polymer in which $X^1$ consists of at least one monomer selected from the monomer groups (m) mentioned as examples of the monomer of X in the aforementioned formula (2).

In the formula, $m^1$ and $n^1$ represent weight ratios of the monomer units, and $m^1+n^1=100$. $m^1$ is preferably 50-99, more preferably 70-95, further preferably 80-95. $n^1$ is preferably 1-50, more preferably 5-30, further preferably 5-20.

When $X^1$ contains two or more kinds of monomer units, the sum of the weight ratios of these monomer units is used as $m^1$.

In the formula, $L^2$ represents a divalent bridging group or a single bond and has the same meaning as $L^1$ in the aforementioned formula (2), and the preferred range thereof is also the same. Specific examples are mentioned below. However, the present invention is not limited to these.

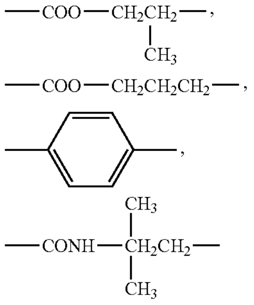

Although these groups may bond to the polymer backbone at either the left sides or right sides of them, they preferably bond to the polymer backbone at their left sides.

In the formula, T represents $—SO_3M$ or $—P(O)—(OM)_2$. M represents a hydrogen atom or a monovalent cation. T is more preferably $—SO_3M$. In the formula, M represents a hydrogen atom or a cation. It is preferably a hydrogen atom, an alkali metal ion, an alkaline earth metal ion or an ammonium ion, particularly preferably a hydrogen atom, lithium ion, sodium ion, potassium ion or an ammonium ion.

The copolymer of the monomer unit in the formula may be in the form of any of a random copolymer, a block copolymer and an alternating copolymer.

In the formula, $Y^{11}$ and $Y^{12}$ represent an end group, and at least one of them represents a group represented by the aforementioned formula (3).

The polymer of the present invention preferably has a molecular weight of 5,000 or more, more preferably 10,000 or more, further preferably 30,000 or more, particularly preferably 50,000 or more, most preferably 100,000 or more, in terms of number average molecular weight.

Specific examples of the polymer represented by the aforementioned formula (2) are mentioned below. However, the present invention is not limited to the following examples at all. The numeric values representing monomer composition are indicated in terms of weight percent, and molecular weights are indicated in terms of number average molecular weight (as PEO determined by GPO).

$Y^1—[X]—Y^2$ (At least one of $Y^1$ and $Y^2$ is $HS—Z—L^1—$)

| No. | $HS—Z—L^1—$ | $—[X]—$ |
|---|---|---|
| WP-1 | 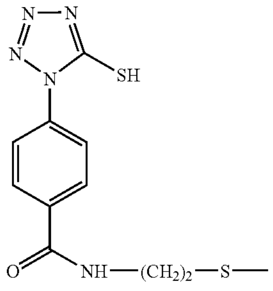 | 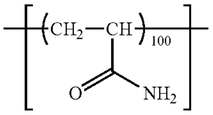 |
| WP-2 | 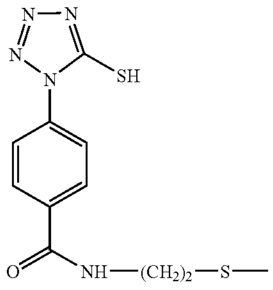 | 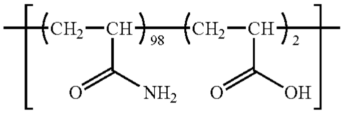 |

-continued
$Y^1 + X + Y^2$ (At least one of $Y^1$ and $Y^2$ is HS—Z—$L^1$—)
| No. | HS—Z—$L^1$— | $+X+$ |
| --- | --- | --- |
| WP-3 | 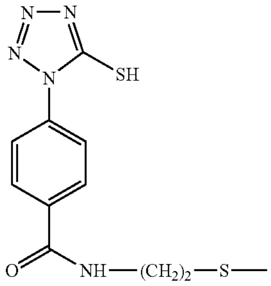 | 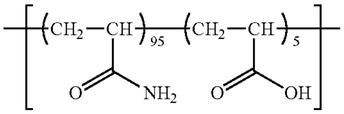 |
| WP-4 | 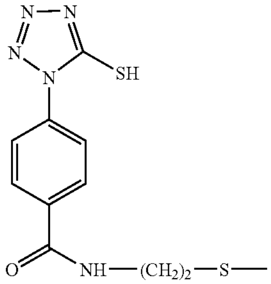 | 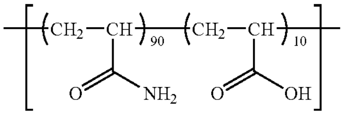 |
| WP-5 | 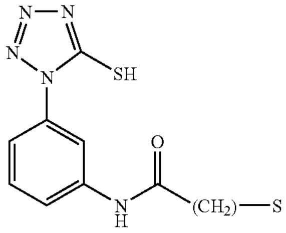 | 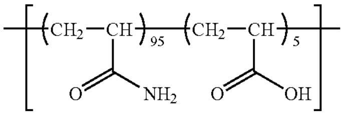 |
| WP-6 | 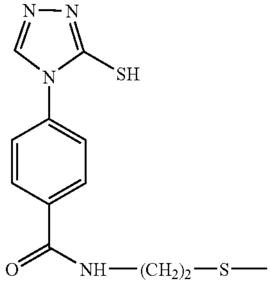 | 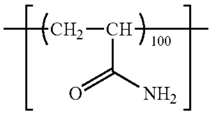 |
| WP-7 | 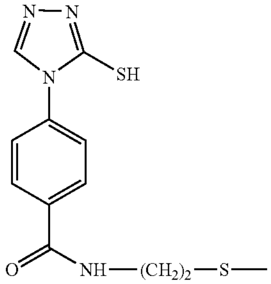 | 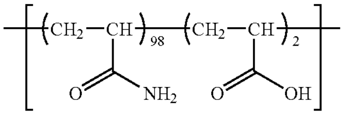 |

-continued
$Y^1$—X—$Y^2$ (At least one of $Y^1$ and $Y^2$ is HS—Z—$L^1$—)
| No. | HS—Z—$L^1$— | —X— |
| --- | --- | --- |
| WP-8 | 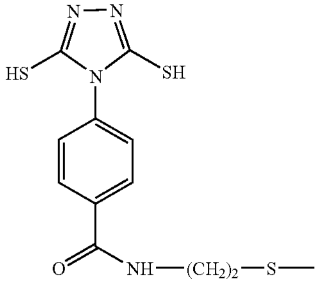 | 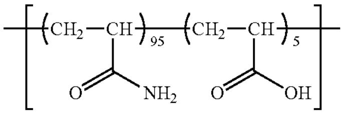 |
| WP-9 | 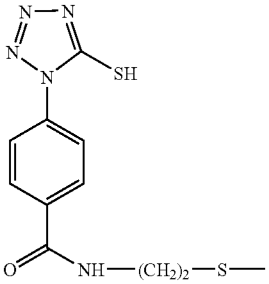 | 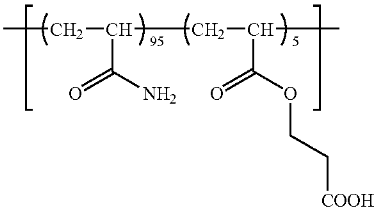 |
| WP-10 | 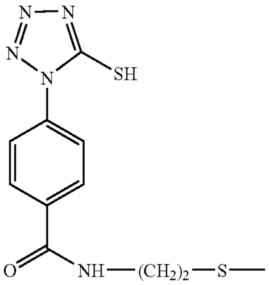 | 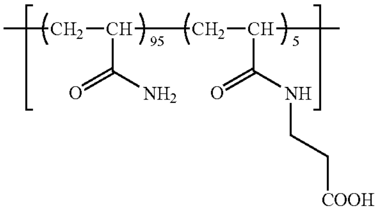 |
| WP-11 | 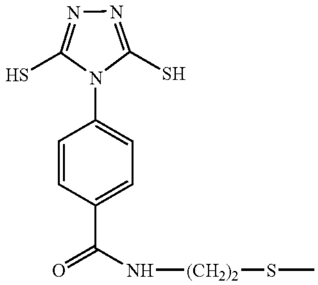 | 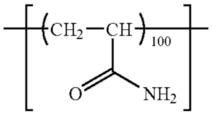 |
| WP-12 | 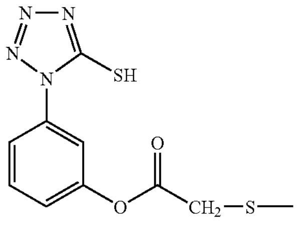 | 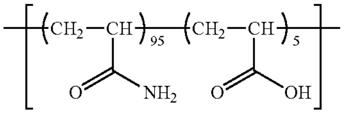 |

-continued
$Y^1-\!\!\!+X\!\!+\!\!-Y^2$ (At least one of $Y^1$ and $Y^2$ is $HS—Z—L^1—$)
| No. | $HS—Z—L^1—$ | $—\!\!+X\!\!+\!\!—$ |
|---|---|---|
| WP-13 | 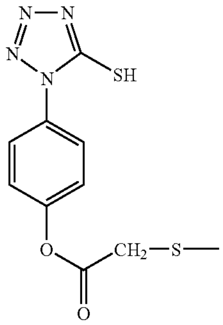 | 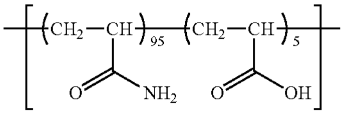 |
| WP-14 | 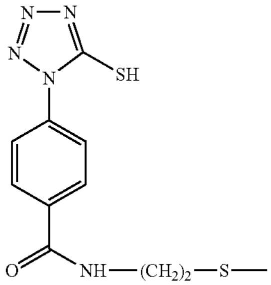 | 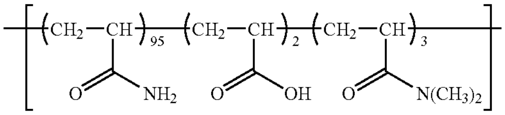 |
| WP-15 | 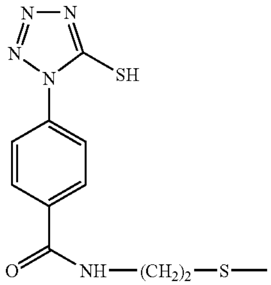 | 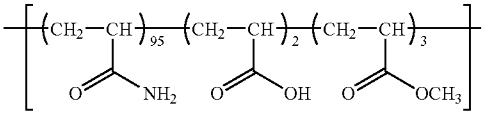 |
| WP'-1 | 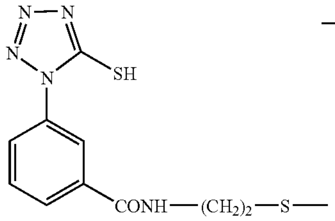 | 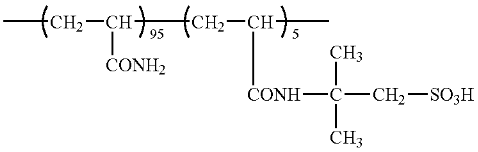 Mn = 72000 |
| WP'-2 | 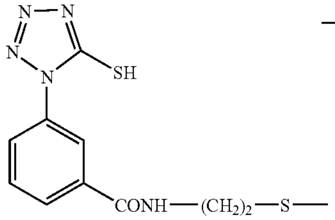 | 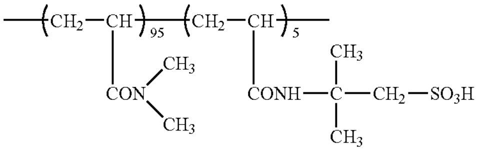 Mn = 101000 |

-continued
$Y^1 \mathrm{+}X\mathrm{+} Y^2$ (At least one of $Y^1$ and $Y^2$ is $HS—Z—L^1—$)
| No. | $HS—Z—L^1—$ | $\mathrm{+}X\mathrm{+}$ |
|---|---|---|
| WP'-3 | 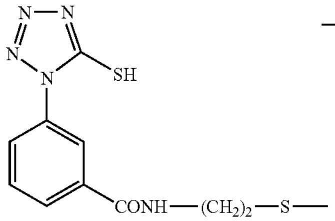 | 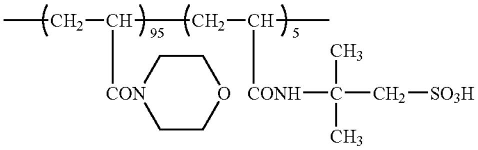 Mn = 111000 |
| WP'-4 | 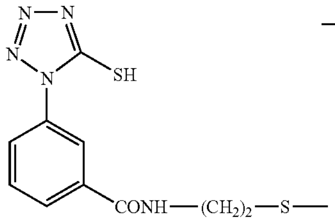 | 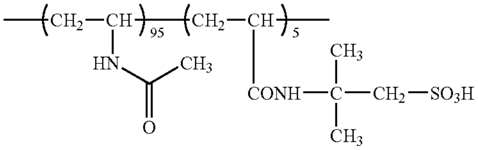 Mn = 62000 |
| WP'-5 | 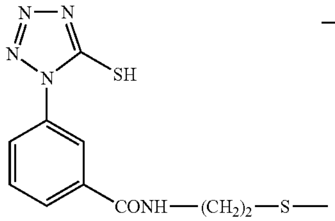 | 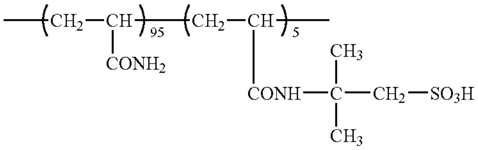 Mn = 70000 |
| WP'-6 | 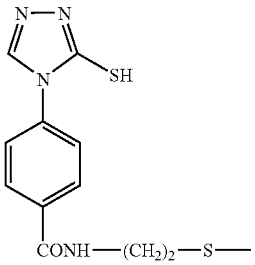 | 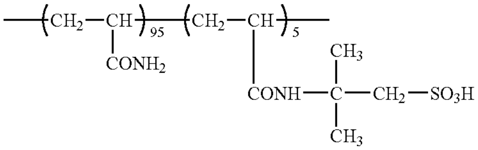 Mn = 70000 |
| WP'-7 | 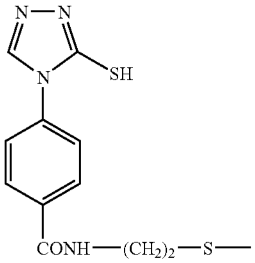 | 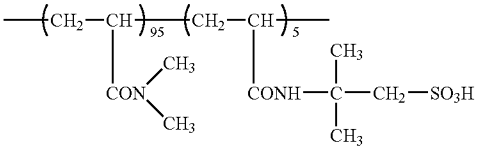 Mn = 102000 |

-continued
$Y^1$—[X]—$Y^2$ (At least one of $Y^1$ and $Y^2$ is HS—Z—$L^1$—)
| No. | HS—Z—$L^1$— | —[X]— |
|---|---|---|
| WP'-8 | 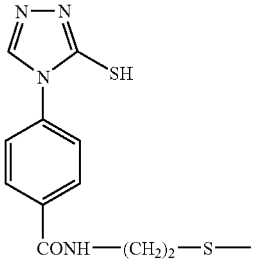 | 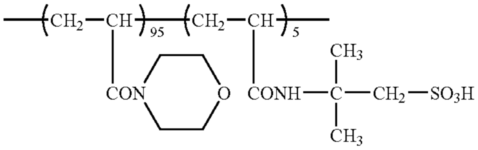 Mn = 110000 |
| WP'-9 | 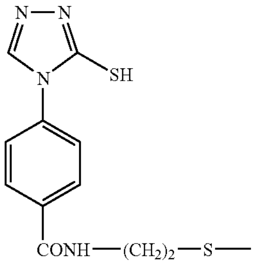 | 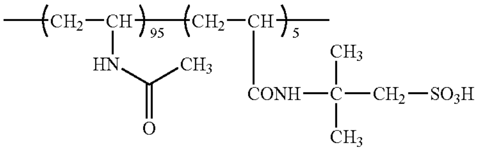 Mn = 64000 |
| WP'-10 | 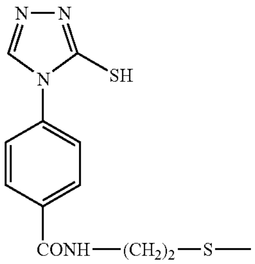 | 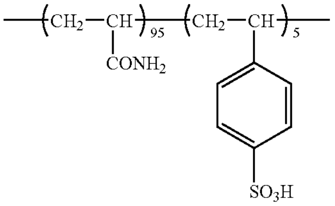 Mn = 50000 |
| WP'-11 | 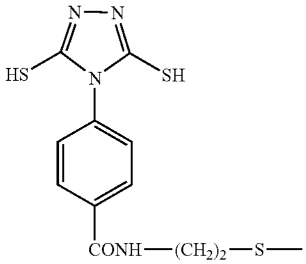 | 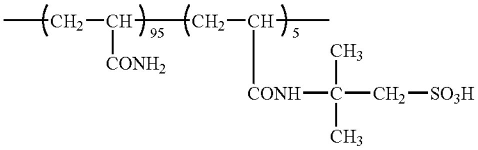 Mn = 72000 |
| WP'-12 | 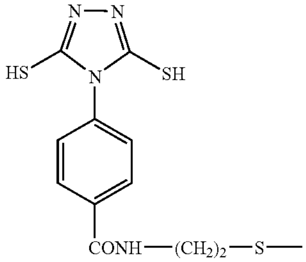 | 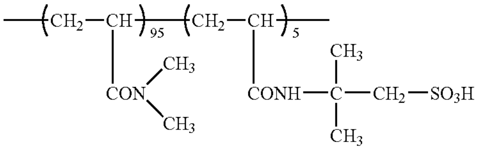 Mn = 101000 |

-continued
$Y^1\text{-}[X]\text{-}Y^2$ (At least one of $Y^1$ and $Y^2$ is $HS—Z—L^1—$)
| No. | $HS—Z—L^1—$ | $-[X]-$ |
|---|---|---|
| WP'-13 | 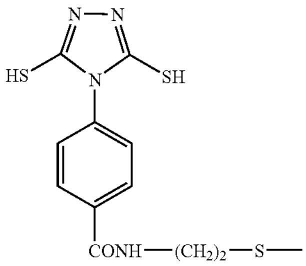 | 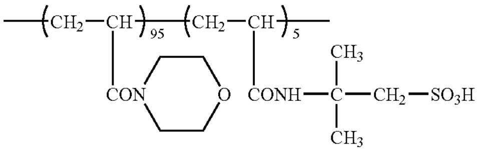 Mn = 115000 |
| WP'-14 | 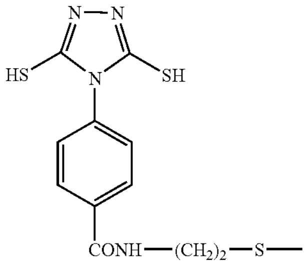 | 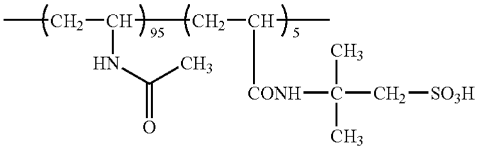 Mn = 64000 |
| WP'-15 | 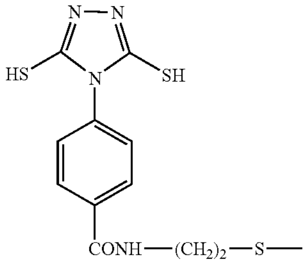 | 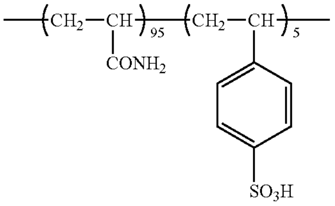 Mn = 50000 |
| WP'-16 | 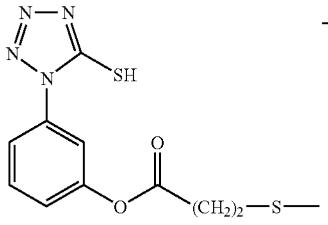 | 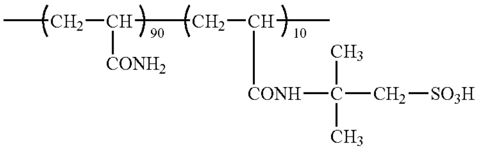 Mn = 77000 |
| WP'-17 | 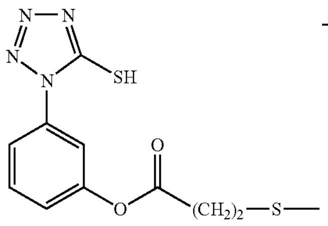 | 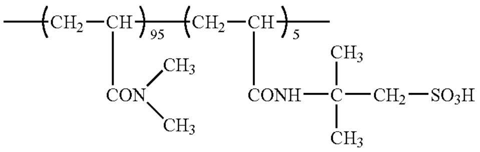 Mn = 112000 |

-continued $Y^1$—X—$Y^2$ (At least one of $Y^1$ and $Y^2$ is HS—Z—$L^1$—)

| No. | HS—Z—$L^1$— | —X— |
|---|---|---|
| WP'-18 | 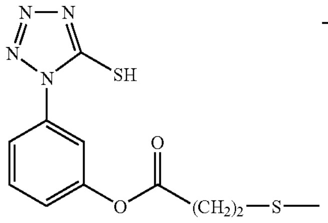 | 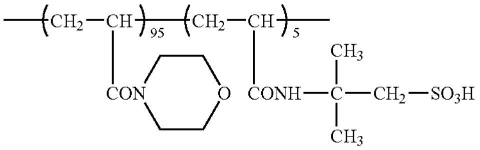 Mn = 113000 |
| WP'-19 | 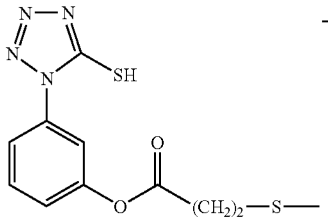 | 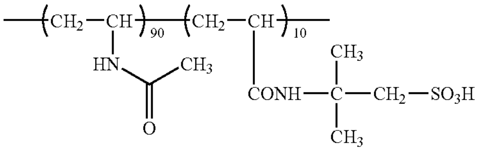 Mn = 72000 |
| WP'-20 | 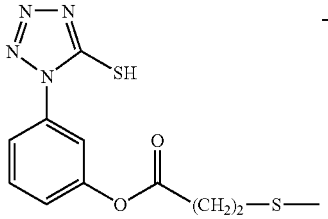 | 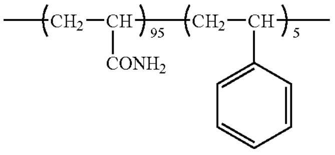 Mn = 75000 |

The polymer of the present invention may be synthesized by (1) reacting, with a polymer preliminarily obtained by polymerization reaction, a compound that contains a nitrogen-containing aromatic ring having a mercapto group and can form a covalent bond with a reactive group in the polymer to introduce the aforementioned mercapto group into the polymer, or (2) polymerizing a compound that contains a nitrogen-containing aromatic ring having a mercapto group and one or more kinds of monomers. The monomer units may be polymerized by any of radical polymerization, ionic polymerization, condensation polymerization, ring opening polymerization, polyaddition etc. However, the synthetic method of the polymer of the present invention is not limited to these.

Photographic Emulsion

Hereafter, the photographic emulsion containing the polymer of the present invention and silver halide grains (henceforth also referred to as "emulsion of the present invention") will be explained in detail.

Although the content of the polymer of the present invention varies depending on the use and types of materials used and cannot generally be defined, it is generally preferably 0.1 mg to 5 g, more preferably 1-100 mg, per mol of silver halide. Although the polymer of the present invention may be added during silver halide grain formation process or chemical ripening process, or after chemical ripening, it is most preferably added during silver halide grain formation process. The polymer of the present invention can be added, for example, after it is dissolved in water or a hydrophilic organic solvent (e.g., methanol, N,N-dimethylformamide). The silver halide contained in the emulsion of the present invention is preferably silver bromide, silver chloride, silver iodobromide, silver chlorobromide, silver chloroiodobromide or the like. The shape of the silver halide is particularly preferably a tabular shape.

According to the first embodiment of the emulsion of the present invention, it contains the polymer of the present invention and silver halide grains, and the silver halide grains providing 50% or more of the total projected area satisfy the following (a) to (d).

(a) The grains have (111) faces as parallel main faces.

(b) The grains have an aspect ratio of 2 or more.

(c) The grains have 10 or more dislocation lines per grain.

(d) The grains consist of silver iodobromide or silver chloroiodobromide having a silver chloride content of less than 10 mol %.

As for the silver halide grains used in this embodiment, silver halide grains having facing (111) main faces and side faces connecting the main faces and comprising silver iodobromide or silver chloroiodobromide provide 50% or more of the total projected area. Although the grains may contain silver chloride, the silver chloride content is 10 mol % or less, preferably 8 mol % or less, more preferably 3 mol % or less or 0 mol %. The silver iodide content is preferably 20 mol % or less, more preferably 40 mol % or less. The silver iodide content and the silver bromide content are preferably 0.5 mol % or more, respectively.

Irrespective of the silver iodide content, the variation coefficient of silver iodide content distribution among the grains is preferably 20% or less, particularly preferably 10% or less. In each grain, a certain structure concerning silver iodide distribution is preferably formed. The structure of the silver iodide distribution may be double, triple or quadruple structure, or a structure of further higher order. Further, the silver iodide content may continuously change in a grain.

In this embodiment, it is preferred that grains having an aspect ratio of 2 or more provide 50% or more of the total projected area. The projected area and aspect ratio of a tabular grain can be measured from a shadowed electron micrograph of it taken together with a reference latex sphere by the carbon replica method. Since a higher aspect ratio provides more preferred photographic performance, it is more preferred that 50% or more of the total projected area of the tabular grains in the emulsion is provided by grains having an aspect ratio of 5 or more, more preferably 8 or more. However, if the aspect ratio becomes too high, the variation coefficient of the grain size distribution tends to increase. Accordingly, it is usually preferred that grains should have an aspect ratio of 100 or less, more preferably 50 or less. A tabular grain usually has a hexagonal, triangular or circular shape when viewed in a direction perpendicular to the main face thereof, and the aspect ratio is a value obtained by dividing a diameter of a circle having the same area as the projected area of the grain with the thickness of the grain. As for the shape of the tabular grains, a higher ratio of hexagonal grains is more preferred, and the ratio of the lengths of adjacent sides of the hexagon is preferably 1:2 or less.

Tabular silver halide grains have a grain diameter of preferably 0.1-20.0 μm, more preferably 0.2-10.0 μm, as a diameter as circle. The diameter as circle is a diameter of a circle having the same area as the projected area of the silver halide grain. Thickness of tabular grain is preferably 0.01-0.5 μm, more preferably 0.02-0.1 μm. The thickness of tabular grain means the spacing between two of the main face. In this embodiment, it is preferred that grains having a thickness of 0.1 μm or less provide 50% or more of the total projected area of silver halide grains. The diameter as sphere is preferably 0.1-5.0 μm, more preferably 0.2-3 μm. The diameter as sphere means a diameter of sphere having the same volume as that of each grain.

In this embodiment and the second embodiment described later, it is preferred that silver halide grains contained in the emulsion should be monodispersed. In this embodiment and the second embodiment described later, it is preferred that variation coefficient of the diameter as sphere for the total silver halide grains contained in the emulsion is preferably 30% or less, more preferably 25% or less. Further, in this embodiment and the second embodiment described later, when tabular grains are used, the variation coefficient of the diameter as circle is also important, and the variation coefficient of the diameter as circle for the total silver halide grains is preferably 30% or less, more preferably 25% or less, further preferably 20% or less. Further, the variation coefficient of the thickness of tabular grains is preferably 30% or less, more preferably 25% or less, further preferably 20% or less. The variation coefficient is a value obtained by dividing standard deviation of distribution of the diameters as circle of the silver halide grains with a mean diameter as circle, or a value obtained by dividing standard deviation of distribution of the thickness of the tabular silver halide grains with a mean thickness.

In this embodiment and the second embodiment described later, the spacing of the two twin faces can be made less than 0.012 μm as described in U.S. Pat. No. 5,219,720. Further, the value obtained by dividing the spacing between (111) main faces with the twin face spacing can be made at least 15 as described in JP-A-5-249585, and it may be suitable selected depending on the purpose.

Dislocation lines in tabular grains can be observed by a direct method described in, for example, J. F. Hamilton, Phot. Sci. Eng., 11, 57 (1967) or T. Shiozawa, J. Soc. Phot. Sci. Japan, 35, 213 (1972), which utilizes a transmission electron microscope at a low temperature. That is, silver halide grains are carefully extracted from an emulsion so as not to produce a pressure that forms dislocation lines in the grains and placed on a mesh for electron microscopic observation. The sample is observed by the transmission method while being cooled to prevent damages (e.g., print out) caused by electron rays. In this method, as the thickness of a grain increases, it becomes more difficult to transmit electron rays through it. Therefore, grains can be observed more clearly by using an electron microscope of high voltage type (200 kV or higher for a grain having a thickness of 0.25 μm). A photograph of grains obtained by this method shows positions and number of dislocation lines in each grain when the grain is viewed in a direction perpendicular to the main face.

In this embodiment, silver halide grains providing 50% or more of the total projected area preferably have an average number of dislocation lines of preferably 10 or more, more preferably 20 or more, per grain. If dislocation lines are densely present or cross each other when observed, it is sometimes impossible to accurately count the number of dislocation lines per grain. Even in such cases, however, dislocation lines can be roughly counted to such an extent as in a unit of ten lines, i.e., 10 lines, 20 lines, 30 lines and so on. Accordingly, these cases can be clearly distinguished from cases where only several dislocation lines are present. The average number of dislocation lines per grain is obtained as a number average by counting the dislocation lines of 100 grains or more.

Dislocation lines can be introduced into, e.g., a portion near a side face of a tabular grain. In this case, dislocations are substantially perpendicular to the side face and produced from a position corresponding to x % of the length between the center and the edge (side face) of a tabular grain to the side face. The value of x is preferably 10 to less than 100, more preferably 30 to less than 99, most preferably 50 to less than 98. In this case, although the shape obtained by connecting the start positions of the dislocations is almost similar to the shape of the grain, it is sometimes not perfectly similar and distorted. Dislocations of this type are not found in the central region of a grain. The direction of dislocation lines is crystallographically approximately in a (211) direction. Dislocation lines, however, are often zigzagged and sometimes cross each other.

The tabular grain may have dislocation lines either almost uniformly across the whole regions near side faces or at a particular position of the regions near side faces. That is, in the case of a hexagonal tabular silver halide grain, for example, dislocation lines may be limited to either portions near the six corners or only a portion near one of the six corners. Conversely, it is also possible to limit dislocation lines to only portions near the sides except for the portions near the six corners.

Dislocation lines can also be formed across a region including the centers of two parallel main faces of a tabular grain. When dislocation lines are formed across the entire region of the main faces, the direction of the dislocation lines is sometimes crystallographically approximately in a (211) direction with respect to a direction perpendicular to the main faces. In some cases, however, the direction is in a (110) direction or random. The lengths of the individual dislocation lines are also random, and the dislocation lines are sometimes observed as short lines on the main faces or sometimes observed as long lines reaching the sides (periphery). Dislocation lines are sometimes straight or often zigzagged. In many cases, dislocation lines cross one another.

As described above, the positions of dislocation lines may be limited to a portion near the side face region or the main face or the dislocation lines may be localized at a certain position, or the dislocations can be positioned at combination of the aforementioned areas. That is, dislocation lines may be formed on both of a portion near the side face and the main face.

The silver iodide content at the grain surface in the tabular grain emulsion of the present invention is preferably 10 mol % or less, particularly preferably 5 mol % or less. The silver iodide content at the grain surface used in the present specification is a content measured by using XPS (X-ray Photoelectron Spectroscopy). The principle of XPS used in an analysis of the silver iodide content near the surface of a silver halide grain is described in Aihara et al., "Spectra of Electrons" (Kyoritsu Library Vol. 16, Kyoritsu Shuppan, 1978). A standard measurement method of XPS is to use Mg—K as an excitation X-ray and measure the intensities of photoelectrons of iodine (I) and silver (Ag) (usually I-3d5/2 and Ag-3d5/2) released from silver halide grains in an appropriate sample form. The content of iodine can be calculated from a calibration curve of the photoelectron intensity ratio of iodine (I) to silver (Ag) (intensity (I)/intensity (Ag)) formed by using several different standard samples of known iodine contents. XPS measurement for a silver halide emulsion must be performed after gelatin adsorbed on the surface of a silver halide grain is decomposed and removed with, for example, proteinase. A tabular grain emulsion having a silver iodide content on the grain surface of 10 mol % or less is an emulsion of which silver iodide content is 10 mol % or less when the emulsion grains contained in the emulsion are analyzed by XPS. If obviously two or more types of emulsions are mixed, an appropriate pretreatment such as centrifugal separation or filtration must be performed before one type of emulsion is analyzed.

In this embodiment and the second embodiment described later, the structure of a tabular grain in the emulsion of the present invention is preferably a triple structure of silver bromide/silver iodobromide/silver bromide or a higher-order structure. The boundary of silver iodide content between structures may be a clear boundary or the content may continuously gradually change. Usually, when the silver iodide content is measured by using the powder X-ray diffraction method, the silver iodide content does not show any two distinct peaks, and it shows an X-ray diffraction profile in which tail of the peak extends in the direction of higher silver iodide content. The silver iodide content in a layer inside the grain is preferably higher than that at the surface, and the silver iodide content in a layer inside the grain is higher than that at the surface by preferably 5 mol % or more, more preferably 7 mol % or more.

The emulsion of the present invention according to the second embodiment contains the polymer of the present invention and silver halide grains, and the silver halide grains providing 50% or more of the total projected area satisfy the following (a), (d) and (e).

(a) The grains have (111) faces as parallel main faces.

(d) The grains consist of silver iodobromide or silver chloroiodobromide having a silver chloride content of less than 10 mol %.

(e) The grains consist of grains having at least one epitaxial joint per grain at a corner portion and/or on a side face and/or a main face of hexagonal silver halide grain.

In the silver halide photographic emulsion containing tabular grains according to the second embodiment, used are grains having (111) faces as parallel main faces and at least one epitaxial joint per grain at a corner portion and/or on a side face and/or a main face of each hexagonal grain in which a ratio of a length of side having the maximum length to a length of side having the minimum length is 2 or less. A grain having an epitaxial joint is a grain containing, in addition to a grain body, a crystal portion (i.e., epitaxial portion) joined to the silver halide grain, and the joined crystal portion usually protrudes from the silver halide grain body. The ratio of the joined crystal portion (epitaxial portion) to the total grain silver amount is preferably 2-30%, more preferably 5-15%. Although the epitaxial portion may exist on any portion of the grain body, it preferably exists on a grain main face, grain side face or grain corner portion.

The epitaxial portion exists preferably in a number of at least one. Further, composition of the epitaxial portion preferably consists of AgCl, AgBrCl, AgBrClI, AgBrI, AgI, AgSCN or the like. When the epitaxial portion exists, dislocation lines may exist inside the grain or may not exist.

In the second embodiment, the grains consist of silver iodobromide or silver chloroiodobromide having a silver chloride content of less than 10 mol % as in the first embodiment.

Hereafter, preparation method of silver halide grains used for the aforementioned first and second embodiments will be explained.

An exemplary preparation method of the silver halide grains includes a base grain formation step (a) and a subsequent grain formation step (step (b)). Basically, it is preferable to perform the step (a) and then the step (b). However, the preparation may comprise only the step (a). The step (b) may be any one of a dislocation introducing step (b1), corner-limited dislocation introduction step (b2) and epitaxial joint formation step (b3). It is sufficient that the preparation should include at least one of these steps, and two or more steps may be combined.

First, the base grain formation step (a) will be explained.

The base grains preferably contains at least 50% or more, more preferably 60% or more, of silver with respect to the total silver amount used for the grain formation. Further, The mean content ratio of iodine to the silver amount in the base grain is preferably 0-30 mol %, more preferably 0-15 mol %. Furthermore, the base grains may have a core/shell structure as required. In that case, silver amount in the core of base grain is preferably 50-70% of the total silver amount used in the base grain, and the mean iodine content in the core is preferably 0-30 mol %, more preferably 0-15 mol %. The iodine content in the shell is preferably 0-3 mol %.

As the preparation method of silver halide emulsion, generally used is a method of forming silver nuclei and then further growing silver halide grains to obtain grains of a desired size. Further, tabular grain formation process generally comprises at least steps of nucleation, ripening and growth. These steps are described in detail in U.S. Pat. No. 4,945,037.

Hereafter, the steps of nucleation, ripening and growth will be explained.

1. Nucleation

The nucleation of the tabular grain is generally performed by a double jet method where an aqueous solution of a silver salt and an aqueous solution of an alkali halide are added to a reaction vessel containing an aqueous solution of gelatin or by a single jet method where an aqueous solution of a silver salt is added to a gelatin solution containing an alkali halide. Further, a method of adding an aqueous solution of an alkali halide to a gelatin solution containing a silver salt may also be used, as required. Furthermore, nucleation of tabular grains may be performed as required by adding a gelatin solution, a silver salt solution and an alkali halide solution to a mixer disclosed in JP-A-2-44335 and immediately transferring the mixture to a reaction vessel. Further, the nucleation may also be performed by passing an aqueous solution containing an alkali halide and a protective colloid solution through a pipe and adding an aqueous solution of a silver salt to the solution as disclosed in U.S. Pat. No. 5,104,786. Furthermore, such nucleation as disclosed in U.S. Pat. No. 6,022,681 may also be used, in which chlorine content is 10 mol % or more with respect to the silver amount used for the nucleation.

The nucleation is preferably performed by using gelatin as a dispersion medium under such a condition that pBr should be 1-4. As for the type of gelatin, alkali-treated gelatin, low molecular weight gelatin (molecular weight: 3000-40,000), oxidized gelatin disclosed in U.S. Pat. Nos. 4,713,320 and 4, 942,120 and oxidized low molecular weight gelatin may be used. It is particularly preferable to use oxidized low molecular weight gelatin.

The dispersion medium is preferably used at a concentration of 10 weight % or less, more preferably 1 weight % or less. Although the temperature during the nucleation is preferably 5-60° C., it is more preferably 5-48° C. when fine tabular grains having a mean grain size of 0.5 μm or less are formed. The dispersion medium preferably has pH of 1-10, more preferably 1.5-9.

Further, it is possible to add the polyalkylene oxide compounds described in U.S. Pat. Nos. 5,147,771, 5,147,772, 5,147,773, 5,171,659, 5,210,013 and 5,252,453 and Japanese Patent No. 3,089,578 during the nucleation step or subsequent ripening step or growth step.

2. Ripening

In the nucleation process, fine grains (particularly, octahedrons and single twin grains) other than tabular grains are formed. Before entering into a growth process described below, it is necessary to allow the grains other than tabular grains to disappear and to obtain nuclei having a shape that forms a tabular grain and having good monodispersibility. It is well known that, in order to make this possible, Ostwald ripening is performed fallowing the nucleation.

Immediately after the nucleation, pBr is adjusted, and then the temperature is increased to conduct the ripening until the ratio of hexagonal tabular grains reaches the maximum value. At this time, a gelatin solution may be additionally added. In such a case, the concentration of gelatin with respect to the dispersion medium solution is preferably 10% by weight or less. As the additionally added gelatin used in this operation, alkali-treated gelatin, amino group-modified gelatin described in JP-A-11-143002 such as succinated gelatin in which 95% or more of amino groups are modified and trimellitated gelatin, imidazole-group modified gelatin described in JP-A-11-143003 or oxidized gelatin is used. The succinated gelatin and trimellitated gelatin are particularly preferably used.

The ripening temperature is 40-80° C., preferably 50-80° C. pBr is 1.2-3.0. Further, pH is preferably 1.5-9.

Further, for allowing the grains other than tabular grains to disappear rapidly in this operation, a silver halide solvent may be added. In this case, the concentration of the silver halide solvent is preferably 0.3 mol/L or less, more preferably 0.2 mol/L or less. When the emulsion is used as a direct reversal emulsion, a silver halide solvent used on the neutral or acidic side such as a thioether compound is more preferred than $NH_3$ used on the alkaline side as the silver halide solvent.

The ripening is performed as described above to convert the grains into approximately 100% tabular grains.

After the ripening is completed, when the silver halide solvent is not required in the subsequent growth process, it is removed as follows.

(I) For an alkaline silver halide solvent such as $NH_3$, an acid providing a high solubility product with $Ag^+$ such as $HNO_3$ is added to invalidate the solvent.

(2) For a thioether silver halide solvent, an oxidizing agent such as $H_2O_2$ is added to invalidate the solvent as described in JP-A-60-136736.

3. Growth

In the crystal growth stage subsequent to the ripening, pBr is preferably maintained at 1.4-3.5. When the gelatin concentration in the dispersion medium solution before entering into the growth process is low (i.e., 1 weight % or less), gelatin may be additionally added. At this time, the gelatin concentration in the dispersion medium solution is preferably adjusted to 1-10 weight %. In this procedure, alkali-treated gelatin, succinated gelatin in which 95% or more of amino groups are modified, trimellitated gelatin and oxidized gelatin are used. The succinated gelatin and trimellitated gelatin are particularly preferably used.

pH during the growth is preferably 2-10, more preferably 4-8. However, when succinated gelatin or trimellitated gelatin is present, pH in is preferably 5-8. The addition rates of $Ag^+$ and halogen ions during the crystal growth stage is preferably selected so as to give a crystal growth speed of 20% to 100%, preferably 30% to 100% of the critical crystal growth speed. In this case, the addition rates of the silver ions and the halogens ion are increased with the crystal growth. In that case, the addition rates of the aqueous solutions of the silver salt and halogen salt may be increased, or the concentration of the aqueous solution may be increased, as described in JP-B-48-36890 and JP-B-52-16364. While the addition may be performed by the double jet method in which an aqueous silver salt solution and an aqueous halogen salt solution are added simultaneously, it is preferable to simultaneously add an aqueous silver nitrate solution, an aqueous halogen salt solution containing bromide and a silver iodide fine grain emulsion as described in U.S. Pat. Nos. 4,672,027 and 4,693, 964. In this case, the growth temperature is preferably 50-90° C., more preferably 60-85° C.

Further, the AgI fine grain emulsion to be added may be prepared beforehand or may be added while continuously preparing it. As for this preparation method, JP-A-10-43570 can be referred to.

The grains in the AgI emulsion to be added preferably have a mean grain size of 0.005-0.1 μm, more preferably 0.007-0.08 μm. The iodine content of the base grains can be changed by controlling the amount of AgI emulsion to be added.

Further, instead of the aqueous silver salt solution and aqueous halogen salt solution, silver iodobromide fine grains are preferably added. In this case, by using a iodine amount in the fine grains equal to the iodine amount of base grains, base grains having a desired iodine content can be obtained. Although the silver iodobromide fine grains may be prepared beforehand, it is more preferable to add them while continuously preparing them. The iodobromide fine grains preferably have a size of 0.005-0.1 μm, more preferably 0.01-0.08 μm. The temperature during the growth is preferably 50-90° C., more preferably 60-85° C.

Hereafter, the step (b) will be explained.

First, the step (b1) will be explained. The step (b1) consists of a first shell formation step and a second shell formation step. The first shell is formed on the base grain described above. The silver amount in the first shell is preferably 1-30 mol % of the total silver amount of the grain, and the average silver iodide content in the first shell is 20-100 mol %. The silver amount in the first shell is preferably 1-20 mol % of the total silver amount of the grain, and the average silver iodide content in the first shell is preferably 25-100 mol %. The growth of the first shell on the base grain can be basically attained by adding an aqueous silver nitrate solution and an aqueous halide solution containing iodide and bromide according to the double-jet method. Alternatively, the aqueous silver nitrate solution and an aqueous halide solution containing iodide are added by the double jet method. Or an aqueous halide solution containing iodide is added by the single jet method.

As clearly seen from the mean silver iodide content of the first shell, silver iodide may deposit in addition to the silver iodobromide mixed crystal at the time of the first shell formation. In any case, silver iodide usually disappears and wholly changes into silver iodobromide mixed crystal during the following second shell formation.

As a preferred method of first shell formation, there is a method of adding silver iodobromide or silver iodide fine grain emulsion and allowing ripening to obtain dissolution. Furthermore, as a preferred method, there is a method of adding silver iodide fine grain emulsion and then adding an aqueous silver nitrate solution or an aqueous silver nitrate solution and an aqueous halide solution. In this case, the dissolution of the silver iodide fine grain emulsion is promoted by the addition of the aqueous silver nitrate solution, and the silver amount of the added silver iodide fine grain emulsion is used for the first shell to obtain a silver iodide content of 100 mol %. Then, the silver content of the second shell is calculated by using the silver amount of the added aqueous silver nitrate solution.

When the silver iodide fine grain emulsion is added, it is preferable to abruptly add the silver iodide fine grain emulsion. "Abruptly adding the silver iodide fine grain emulsion" means to add the silver iodide fine grain emulsion within preferably ten minutes, more preferably seven minutes.

This condition may vary depending on the temperature, pBr and pH of the system to be added, type and concentration of protective colloid such as gelatin and the presence or absence, type and concentration of a silver halide solvent. However, a shorter addition time is more preferred as described above. During the addition of the silver iodide fine grain emulsion, it is preferred that an aqueous solution of silver salt such as silver nitrate be not substantially added. The temperature of the system during the addition is preferably 40-90° C., particularly preferably 50-80° C.

The silver iodide fine grain emulsion need to only be substantially silver iodide and may contain silver bromide and/or silver chloride so long as a mixed crystal can be formed. The emulsion preferably consists of 100% silver iodide. The crystal structure of silver iodide may be the β-form, γ-form, or, as described in U.S. Pat. No. 4,672,026, α-form or a structure similar to the α-form. Although the crystal structure is not particularly restricted, it is preferably a mixture of β- and γ-forms, more preferably β-form. The silver iodide fine grain emulsion can be either an emulsion formed immediately before addition as described in U.S. Pat. No. 5,004,679 or an emulsion subjected to a usual washing step. In the present invention, an emulsion subjected to a usual washing step is preferably used. The silver iodide fine grain emulsion can be readily formed by a method described in, for example, U.S. Pat. No. 4,672,026. The double jet addition method using an aqueous silver salt solution and an aqueous iodide salt solution for performing grain formation at a fixed pI value is preferred. pI used herein is a logarithm of the reciprocal of the $I^-$ ion concentration of the system. The temperature, pI and pH of the system, type and concentration of the protective colloid agent such as gelatin, and the presence or absence, type and concentration of the silver halide solvent are not particularly limited. However, the grain size is preferably 0.1 μm or less, more preferably 0.07 μm or less, for the present invention. Although the grain shapes cannot be perfectly specified because the grains are fine grains, the variation coefficient of the grain size distribution is preferably 25% or less. Particularly marked effect of the present invention is attained when the variation coefficient is 20% or less. The sizes and the size distribution of grains in the silver iodide fine grain emulsion are obtained by placing silver iodide fine grains on a mesh for electron microscopic observation and directly observing the grains by a transmission method instead of a carbon replica method. This is because observation by the carbon replica method increases measurement errors since the grain sizes are small. The grain size is defined as the diameter of a circle having an area equal to the projected area of the observed grain. The grain size distribution is also obtained by using this diameter of the projected area. In the present invention, the most effective silver iodide fine grains have a grain size of 0.06 to 0.02 μm and a variation coefficient of grain size distribution of 18% or less.

After the grain formation described above, the silver iodide fine grain emulsion is preferably subjected to usual washing described in, for example, U.S. Pat. No. 2,614,929, and adjustments of pH, pI and concentration of protective colloid agent such as gelatin as well as adjustment of concentration of the contained silver iodide. pH is preferably 5-7. pI value is preferably at a level at which the solubility of silver iodide is minimized or a level higher than that level. As the protective colloid agent, usual gelatin having an average molecular weight of about 100,000 is preferably used. Low molecular weight gelatin having an average molecular weight of 20,000 or less is also preferably used. It is sometimes convenient to use a mixture of gelatins having different molecular weights described above. The gelatin amount in the emulsion is preferably 10-100 g, more preferably 20-80 g, per kg of the emulsion. The silver amount in the emulsion is preferably 10-100 g, more preferably 20-80 g, in terms of silver per kg of emulsion. The gelatin amount and/or the silver amount are preferably selected to be values suitable for abrupt addition of the silver iodide fine grain emulsion.

The silver iodide fine grain emulsion is usually dissolved before being added. During the addition, it is necessary to sufficiently increasing stirring efficiency of the system. The rotating speed of stirring is preferably set to be higher than usual. Addition of an antifoaming agent is effective to prevent foaming during the stirring. Specifically, an antifoaming agent described in, for example, the examples of U.S. Pat. No. 5,275,929 is used.

As a more preferred method of forming the first shell, a silver halide phase containing silver iodide can be formed while iodide ions are abruptly generated by using the iodide ion-releasing agent described in U.S. Pat. No. 5,496,694, instead of the conventional iodide ion supplying method (the method of adding free iodide ions). The iodide ion-releasing agent releases iodide ions by a reaction with an iodide ion release control agent (a base and/or a nucleophilic reagent). Preferred examples of this nucleophilic reagent used include chemical species of hydroxide ion, sulfite ion, hydroxylamine, thiosulfate ion, metabisulfite ion, hydroxamic acids, oximes, dihydroxybenzenes, mercaptanes, sulfinate, carboxylate, ammonia, amines, alcohols, ureas, thioureas, phenols, hydrazines, hydrazides, semicarbazides, phosphines and sulfides.

The rate and timing of release of iodide ions can be controlled by regulating the concentration and addition method of the base or nucleophilic reagent or the temperature of the reaction solution. A preferable base is alkali hydroxide.

To abruptly generate iodide ions, the concentrations of the iodide ion-releasing agent and iodide ion release control agent are preferably $1\times10^{-7}$ to 20 M, more preferably $1\times10^{-5}$ to 10 M, further preferably $1\times10^{-4}$ to 5 M, particularly preferably $1\times10^{-3}$ to 2 M.

If the concentration exceeds 20 M, the addition amounts of the iodide ion-releasing agent and iodide ion release control agent having large molecular weights becomes too large compared with the volume of the grain formation vessel.

If the concentration is less than $1\times10^{-7}$ M, the iodide ion releasing reaction rate becomes low, and this makes it difficult to abruptly generate the iodide ion release agent.

The temperature is preferably 30-80° C., more preferably 35-75° C., particularly preferably 35-60° C.

At a high temperature exceeding 80° C., the iodide ion releasing reaction rate generally becomes extremely high. At a low temperature below 30° C., the iodide ion releasing reaction temperature generally becomes extremely low. Either case is unfavorable because the usable conditions are restricted.

When a base is used for releasing iodide ions, a change in the solution pH can also be used.

In this case, preferred pH range for controlling the rate and timing of release of iodide ions is 2-12, more preferably 3-11, particularly preferably 5-10, most preferably 7.5-10.0 in terms of pH after adjustment. Even under a neutral condition of pH 7, hydroxide ions of a concentration determined by the ion product of water function as a control agent.

The nucleophilic reagent and the base can be used in combination. In such a case, pH can be controlled within the above range to control the release rate and release timing of iodide ions.

When iodine atoms are released in the form of iodide ions from the iodide ion-releasing agent, these iodine atoms may be entirely released or partially left behind without decomposition.

In the step (b1), the second shell is further formed on a tabular grain consisting of the base grain and the first shell described above. The ratio of silver in the second shell is 10-40 mol % of the total silver amount, and the average silver iodide content thereof is 0-5 mol %. More preferably, the ratio of silver in the second shell is 15-30 mol % of the total silver amount, and the average silver iodide content thereof is 0-3 mol %. The growth of the second shell on a tabular grain consisting of the base grain and the second shell may be performed either in a direction to increase the aspect ratio of the tabular grain or in a direction to decrease it. The growth of the second shell is basically attained by adding an aqueous silver nitrate solution and an aqueous halogen solution containing bromide using the double jet method. Alternatively, after an aqueous silver halogen solution containing bromide is added, an aqueous silver nitrate solution can be added by the single jet method. Temperature and pH of the system, type and concentration of a protective colloid agent such as gelatin and the presence or absence, type and concentration of a silver halide solvent may vary with in a broad range. pBr at the end of the formation of the second shell is preferably higher than that in the initial stage of the formation of that layer. Preferably, pBr in early stages of the formation of the layer is 2.9 or less, and pBr at the end of the formation of the layer is 1.7 or more. More preferably, pBr in early stages of the formation of the layer is 2.5 or less, and pBr at the end of the formation of the layer is 1.9 or more. Most preferably, pBr in early stages of the formation of the layer is 1 to 2.3, and pBr at the end of the formation of the layer is 2.1 to 4.5.

The portion formed by the step (b1) preferably has dislocation lines. The dislocation lines preferably exist in the vicinity of the side face of tabular grain. The vicinity of the side face of tabular grain means the side faces corresponding to the six sides of tabular grain and portions inside them, i.e., portions formed by the step (b1). The number of dislocation lines existing on the side faces is preferably 10 or more in average, more preferably 20 or more in average, per grain. If dislocation lines are densely present or cross each other when observed, it is sometimes impossible to accurately count the number of dislocation lines per grain. Even in such cases, however, dislocation lines can be roughly counted to such an extent as in a unit of ten lines, i.e., 10 lines, 20 lines, 30 lines and so on. Accordingly, these cases can be clearly distinguished from cases where only several dislocation lines are present. The average number of dislocation lines per grain is obtained as a number average by counting the dislocation lines of 100 grains or more.

The dislocation line amount distribution is desirably uniform among tabular grains of the present invention. In the emulsion of the present invention, silver halide grains containing 10 or more dislocation lines per grain account for preferably 100-50%, more preferably 100-70%, particularly preferably 100-90%. A percentage lower than 50% is not preferred in view of homogeneity of grains.

When a ratio of grains containing dislocation lines and number of dislocation lines are determined, they are preferably determined by directly observing dislocation lines of at least about 100 grains, more preferably 200 or more grains, particularly preferably 300 or more grains.

Hereafter, the step (b2) will be explained.

The step (b2) can be performed by (i) a method of dissolving only portions near corners with iodide ions, (ii) a method of simultaneously adding a silver salt solution and an iodide salt solution, (iii) a method of substantially dissolving only portions near corners by using a silver halide solvent, or (iv) a method of utilizing halogen conversion, and the step (b2) may be carried out by any of these. Each method will be explained below.

First, (i) the method of dissolving with iodide ions will be explained.

When iodide ions are added to the base grains, portions in the vicinity of corners of base grains are dissolved and thereby rounded. When a silver nitrate solution and a bromide solution or a mixture of a silver nitrate solution, a bromide solution and an iodide solution is subsequently added simultaneously, the grains further grow, and dislocations are introduced in the vicinity of the corners. For this method, JP-A-4-149541 and JP-A-9-189974 can be referred to.

In this method, with a premise that the silver iodide content of the base grains is represented as $I_1$ (mol %), and a value obtained by dividing the total molar number of the added iodide ions with the total molar number of silver in the base grains and multiplying the quotient with 100 is represented as $I_2$ (mol %), a value of $(I_2-I_1)$ preferably falls with in the range of 0-8, more preferably 0-4, for obtaining effective dissolution.

A lower concentration of the added iodide ions is more preferred, and specifically, it is preferably 0.2 mol/L or less, more preferably 0.1 mol/L. Further, pAg at the time of the addition of iodide ions is preferably 8.0 or more, more preferably 8.5 or more.

Following the dissolution of the corner portions of the base grains by the addition of iodide ions to the base grains, a silver nitrate solution and a bromide solution or a mixture of a silver nitrate solution alone is added, or a silver nitrate solution and a bromide solution or a silver nitrate solution and an iodide solution are simultaneously added as a mixture to further grow the grains and introduce dislocations in the vicinity of the corners.

Hereafter, (ii) the method of simultaneously adding a silver salt solution and an iodide salt solution will be explained.

By rapidly adding a silver salt solution and an iodide salt solution to the base grains, silver iodide or silver halide having a high content of silver iodide can be epitaxially grown at the corner portions of the grains. In this process, the addition of the silver salt solution and the iodide salt solution are carried out for preferably 0.2-0.5 minutes, more preferably 0.5-2 minutes. This method is described in JP-A-4-149541 in detail, and therefore one can refer to it.

Following the dissolution of the corner portions of the base grains by the addition of iodide ions to the base grains, a silver nitrate solution alone is added, or a silver nitrate solution and a bromide solution or a silver nitrate solution, a bromide solution and an iodide solution are simultaneously added as a mixture to further grow the grains and introduce dislocations in the vicinity of the corners.

Hereafter, (iii) the method of using a silver halide solvent will be explained.

After a silver halide solvent is added to a dispersion medium containing the base grains, if a silver salt solution and an iodide salt solution are simultaneously added, silver iodide or silver halide having a high silver iodide content preferentially grows at the corner portions dissolved by the silver halide solvent. In this case, the silver salt solution and the iodide salt solution do not need to be rapidly added. This method is disclosed in JP-A-4-149541 in detail, and therefore one can refer to it.

Examples of the silver halide solvent that can be used in the present invention include (a) organic thioethers described in, for example, U.S. Pat. Nos. 3,271,157, 3,531,289 and 3,574,628, and JP-A-54-1019 and JP-A-54-158917, (b) thiourea derivatives described in, for example, JP-A-53-82408, JP-A-55-77737 and JP-A-55-2982, (c) silver halide solvent having a thiocarbonyl group sandwiched between an oxygen or sulfur atom and a nitrogen atom described in JP-A-53-144319, (d) imidazoles described in JP-A-54-100717, (e) ammonia, (g) thiocyanate and so forth.

Following the dissolution of the corner portions of the base grains by the addition of iodide ions to the base grains, a silver nitrate solution alone is added, or a silver nitrate solution and a bromide solution or a silver nitrate solution, a bromide solution and an iodide solution are simultaneously added as a mixture to further grow the grains and introduce dislocations in the vicinity of the corners.

Hereafter, (iv) the method of utilizing halogen conversion will be explained.

This method is a method of halogen conversion for converting silver chloride into silver iodide or silver halide having a high content of silver iodide by adding an epitaxial growth site director (henceforth referred to as "site director) such as the sensitizing dyes disclosed in JP-A-58-108526 or water-soluble iodides to the base grains to epitaxially grow silver chloride at the corner portions of the base grains and then adding iodide ions. Although sensitizing dyes, water-soluble thiocyanate ions and water-soluble iodide ions can be used as the site director, iodide ions are preferred. Iodide ions are preferably added in an amount of 0.0005-1 mol %, more preferably 0.001-0.5 mol %, with respect to the base grains. After optimum amount of iodide ions are added, by simultaneously adding a silver salt solution and chloride salt solution, silver chloride can be epitaxially formed at the corner portions of the base grains.

The halogen conversion of silver chloride with iodide ions can be explained as follows. That is, a silver halide showing a high solubility is converted into a silver halide showing a lower solubility by adding halogen ions that can form the silver halide showing a lower solubility. This process is called halogen conversion, and described in, for example, U.S. Pat. No. 4,142,900. By selective halogen conversion of silver chloride epitaxially grown at the corner portions of the base grains with iodide ions, silver iodide phases are formed at the base grain corner portions. The details are described in JP-A-4-149541.

Following the halogen conversion of silver chloride epitaxially grown at the corner portions of the base grains into silver iodide phases by addition of iodide ions, a silver nitrate solution alone is added, or a silver nitrate solution and a bromide solution, or a silver nitrate solution, a bromide solution and an iodide solution is simultaneously added as a mixture to further grow the grains and introduce dislocations in the vicinity of the corners.

The portion formed by the step (b2) preferably has dislocation lines. The dislocation lines preferably exist in the vicinity of the corner portions of the tabular grains. The vicinity of the corner portions of tabular grain means three-dimensional spaces defined by plumb lines drawn from points on lines connecting the center of the grain and corners at a distance corresponding to x % of the lines from the centers of the lines to the sides forming the corners and the sides. The value of x is preferably 50 to less than 100, more preferably 75 to less than 100. The number of dislocation lines on the side faces is preferably 10 or more, more preferably 20 or more, per grain.

The dislocation line amount distribution is desirably uniform among the tabular grains of the present invention. In the emulsion of the present invention, silver halide grains containing 10 or more dislocation lines per grain account for preferably 100-50%, more preferably 100-70%, particularly preferably 100-90%. A percentage lower than 50% is unfavorable in respect of homogeneity of grains.

When a ratio of grains containing dislocation lines and number of dislocation lines are determined, they are preferably determined by directly observing dislocation lines of at least about 100 grains, more preferably 200 or more grains, particularly preferably 300 or more grains.

Hereafter, the step (b3) will be explained.

As for the epitaxial formation of silver halide on a base grain, it was shown that epitaxial silver salt can be formed on a site selected by using a site director such as iodide ions, aminoazaindene or spectral sensitization dyes adsorbed on the base grain surface, such as a side face or corner of the base grain, as disclosed in U.S. Pat. No. 4,435,501. Further, in JP-A-8-69069, higher sensitivity is achieved by forming epitaxial silver salt on a selected site of an extremely thin tabular base grain and optimally chemically sensitizing the epitaxial phase.

Also in the present invention, it is extremely preferable to obtain higher sensitivity of the base grains of the present invention by using these methods. As the site director, aminoazaindene or a spectral sensitization dye may be used, or iodide ion or thiocyanate ion may be used. They can be each properly used or used in combination depending on the purpose.

The formation site of the epitaxial silver salt can be limited to the side face or corner of the base grain by changing the addition amount of the sensitizing dye or addition amount of iodide ions or thiocyanate ions. The amount of iodide ions is preferably 0.0005-1.0 mol %, more preferably 0.001-0.5 mol %, with respect to the silver amount of the base grains. Further, the amount of thiocyanate ions is preferably 0.01-0.2 mol %, more preferably 0.02-0.1 mol %, with respect to the silver amount of the base grains. After the addition of these sites directors, a silver salt solution and a halogen salt solution are added to form epitaxial silver salt. The temperature for this process is preferably 40-70° C., more preferably 45-60° C. Further, pAg for this process is preferably 7.5 or less, more preferably 6.5 or less. By using a site director, epitaxial silver salt is formed at a corner portion or side face of the base grain. Although an emulsion obtained as described above may be made to have higher sensitivity by selectively subjecting the epitaxial phase to chemical sensitization as described in JP-A-8-69069, a silver salt solution and a halogen salt solution may be simultaneously added following the formation of epitaxial silver salt to further grow the epitaxial silver salt. In this case, the aqueous halogen salt solution to be added is preferably a bromide salt solution or a mixture of a bromide salt solution and an iodide salt solution. Further, the temperature for this process is preferably 40-80° C., more preferably 45-70° C. pAg for this process is preferably 5.5-9.5, more preferably 6.0-9.0.

The epitaxial silver salt formed by the step (b3) is basically characterized in that it is formed outside the base grain formed in the step (a) with a halogen composition different from that of the base grain. The composition of the epitaxial silver salt preferably comprises AgCl, AgBrCl, AgBrClI, AgBrI, AgI, AgSCN or the like. Further, it is more preferable to introduce a "dopant (metal complex)" such as those described in JP-A-8-69069 into the epitaxial layer. The site of the epitaxial growth may be at least a part of corner portions, side faces and main faces of the base grain, and it may cover multiple sites. The site of the epitaxial growth preferably covers only a corner portion or only a side face, or a corner portion and a side face.

Although the portion formed by the step (b3) may not have dislocation lines, it is more preferred that it should have dislocation lines. The dislocation lines preferably exist at a joint portion of a base grain and an epitaxially grown portion or at an epitaxially grown portion. The number of dislocation lines existing at the joint portion or the epitaxial portion is preferably 10 or more, more preferably 20 or more, per grain. If dislocation lines are densely present or cross each other when observed, it is sometimes impossible to accurately count the number of dislocation lines per grain. Even in such cases, however, dislocation lines can be roughly counted to such an extent as in a unit of ten lines, i.e., 10 lines, 20 lines, 30 lines and so on. Accordingly, these cases can be clearly distinguished from cases where only several dislocation lines are present. The average number of dislocation lines per grain is obtained as a number average by counting the dislocation lines of 100 grains or more.

The epitaxial portion is preferably doped with hexacyano metal complexes during the formation thereof. Among hexacyano metal complexes, those containing iron, ruthenium, osmium, cobalt, rhodium, iridium or chromium are preferred. The amount of the metal complex is preferably $10^{-9}$-$10^{-2}$ mol, more preferably $10^{-8}$-$10^{-4}$ mol, per mol of silver halide. The metal complex can be used after being dissolved in water or an organic solvent. The organic solvent preferably shows miscibility with water. Examples of the solvent include alcohols, ethers, glycols, ketones, esters and amides.

As the metal complex to be added, hexacyano metal complexes represented by the following formula (MA) are particularly preferred. The hexacyano metal complexes provide light-sensitive materials of high sensitivity, and in addition, the hexacyano metal complexes have an effect of suppressing generation of fog, even when light-sensitive materials before light exposure are stored for a long period of time.

$$[M(CN)_6]^{n-} \qquad \text{Formula (MA)}$$

In the formula, M represents iron, ruthenium, osmium, cobalt, rhodium, iridium or chromium, and n represents 3 or 4.

Specific examples of the hexacyano metal complexes are shown below.

| | |
|---|---|
| (MA-1) | $[Fe(CN)_6]^{4-}$ |
| (MA-2) | $[Fe(CN)_6]^{3-}$ |
| (MA-3) | $[Ru(CN)_6]^{4-}$ |
| (MA-4) | $[Os(CN)_6]^{4-}$ |
| (MA-5) | $[Co(CN)_6]^{3-}$ |
| (MA-6) | $[Rh(CN)_6]^{3-}$ |
| (MA-7) | $[Ir(CN)_6]^{3-}$ |
| (MA-8) | $[Cr(CN)_6]^{4-}$ |

As counter cation of the hexacyano complexes, a cation readily dissolvable in water and suitable for precipitation procedure for silver halide emulsion is preferably used. Examples of the counter cation include alkali metal ions (e.g., sodium ion, potassium ion, rubidium ion, cesium ion, lithium ion), ammonium ions and alkylammonium ions.

At the time of preparation of the silver halide emulsion, as a dispersion medium or protective colloid or a binder of the other hydrophilic colloid layers, gelatin may be advantageously used. However, other hydrophilic binders may also be used. For example, there can be used derivatives of gelatin, graft polymers of gelatin and other polymers, proteins such as albumin and casein; cellulose derivatives such as hydroxyethylcellulose, carboxymetholcellulose and cellulose sulfates, sodium alginate, derivatives of saccharide such as derivatives of starch; various synthetic hydrophilic polymers including homopolymers and copolymers such as polyvinyl alcohol, polyvinyl alcohol partial acetal, polyvinyl-N-pyrrolidone, polyacrylic acid, polymethacrylic acid, polyacrylamide, polyvinylimidazole and polyvinylpyrazole and so forth.

As gelatin, besides lime-processed gelatin, acid-processed gelatin and enzyme-processed gelatin such as one described in Bull. Soc. Sci. Photo. Japan. No. 16, p. 30 (1966) may be used, and hydrolysis and enzymolysis products of gelatin may also be used. Preferred are succinated gelatin in which 95% or more of amino groups are modified and trimellitated gelatin, or oxidized gelatin. Low molecular weight gelatin and oxidized low molecular weight gelatin are also preferably used. Gelatin containing components having molecular weight distribution of 280,000 or more in a ratio of 30 weight % or more, preferably 35 weight % or more, with respect to the total gelatin can also be used. Lime-processed gelatin comprises sub-α (low molecular weight), α(molecular weight: about 100,000), β (molecular weight: about 200,000), γ (molecular weight: about 300,000) and high molecular weight (void: molecular weight of 300,000 or more) portions, which are classified based on the molecular weight. The ratios of the portions, i.e., molecular weight distribution, can be measured by the PAGI method defined as an international standard. More detailed explanations and production method therefor are detailed in JP-A-11-237704.

It is preferable to wash the emulsion of the present invention with water for desalting and then disperse it in a newly prepared protective colloid. As the protective colloid used for this process, the aforementioned hydrophilic colloids and gelatins can be used. In such a case, gelatin containing a component having molecular weight distribution of 280,000 or more in a ratio of 30 weight % or more, preferably 35 weight % or more is preferably used. Although temperature of the washing with water can be selected depending on the purpose, it is preferably selected in the range of 5-50° C. Although pH for the washing with water can also be selected depending on the purpose, it is preferably 2-10, more preferably 3-8. pAg for the washing with water is preferably 5-10, although it can also be selected depending on the purpose. The method for washing with water can be selected from noodle washing, dialysis using a semipermeable membrane, centrifugal separation, coagulation precipitation and ion exchange. As for the coagulation precipitation, there can be selected a method using a sulfate, a method using an organic solvent, a method using a water-soluble polymer, a method using a gelatin derivative or the like.

The emulsion of the present invention according to the third embodiment contains the aforementioned mercapto group-containing polymer, and it is a photographic emulsion containing tabular silver halide grains, wherein the silver halide grains providing 50% or more of the total projected area satisfy the following (b), (d) and (g).

(b) The grains have an aspect ratio of 2 or more.

(d) The grains consist of silver iodobromide or silver chloroiodobromide having a silver chloride content of less than 10 mol %.

(g) The grains have (100) faces as parallel main faces.

In the third embodiment, as for the (100) tabular grains, tabular grains having (100) faces as parallel main faces and an aspect ratio of2 or more provide 50-100%, preferably 70-100%, more preferably 90-100%, of the total project area. The grain thickness is 0.01-0.10 μm, preferably 0.02-0.08 μm, more preferably 0.03-0.07 μm, and the aspect ratio is 2-100, preferably 3-50, more preferably 5-30. The variation coefficient of the grain thickness (percentage of "standard deviation of distribution/mean grain thickness", henceforth referred to as COV.) is preferably 30% or less, more preferably 25% or less, further preferably 20% or less. A smaller COV. represents a higher monodispersion degree of grain thickness.

As for the diameter as circle and thickness of tabular grains, diameter as circle and thickness of each tabular grain are obtained by taking photograph using a transmission electron microscope (TEM) according to the replica method. In this case, thickness is calculated from the length of the shadow of the replica. The measurement results for COV. mentioned in the present invention are results of the measurement for at least 600 or more grains.

The composition of the (100) tabular grains according to this embodiment consists of silver chloroiodobromide or silver iodobromide having a silver chloride content of less than 10 mol %. Further, other silver salts, for example, rhodan silver, silver sulfide, silver selenide, silver telluride, silver carbonate, silver phosphate, organic acid silver salts and so forth may be contained as another grains or parts of the silver halide grains.

The X-ray diffraction method is known as a method of investigating the halogen composition of AgX crystals. The X-ray diffraction method is described in detail in, for example, "Kiso Bunseki Kagaku Koza (Lecture of Basic Analytical Chemistry), Vol. 24, X-Ray Diffraction". In a standard measurement method, a diffraction angle of a (420) face of AgX is obtained according to the powder method by using Kβ ray of Cu as a radiation source. If the diffraction angle 2θ is obtained, the lattice constant a can be determined in accordance with the Bragg's equation as follows.

$$2d\sin\theta=\lambda$$

$$d=a/(h^2+k^2+l^2)^{1/2}$$

In the equations, 2θ is the diffraction angle of an (hkl) face, λ is the wavelength of X-ray, and d is the face-to-face spacing of (hkl) faces. Since the relationship between the halogen composition of a silver halide solid solution and the lattice constant a is already known (described in, for example, T. H. James ed., "The Theory of The Photographic Process Fourth Edition", Macmillan, New York), if the lattice constant is obtained, the halogen composition can be determined.

The (100) tabular grains according to this embodiment may have any halogen composition. For example, grains having a double structure in which the halogen compositions of core and shell differ (a core/shell) and grains having a multiple structure including a core and two or more of shells can be mentioned, for example. Although the composition of the core preferably has a higher silver bromide content, it is not limited to such a composition. Further, the composition of shell preferably has a higher silver iodide content compared with the core.

The aforementioned (100) tabular grains preferably have a mean silver iodide content of 2.3 mol % or more and a mean silver iodide content at surfaces of 8 mol % or more. Further, the variation coefficient of the silver iodide content among the grains is more preferably less than 20%. The surface silver iodide content can be measured by using XPS described above.

The aforementioned (100) tabular grains can be configurationally classified into the following six groups: (1) grains of which main faces have a shape of a right angled parallelogram, (2) grains of which main faces have the shape of a right angled parallelogram, in which at least one, preferably 1-4 of the four corners of the right angled parallelogram are non-equivalently deleted, that is, grains where (area of the largest deleted part)/(area of the smallest deleted part)=K1 ranges 2-8, (3) grains of which main faces have the shape of a right angled parallelogram, in which the four corners of the right angled parallelogram are equivalently deleted, that is, grains where the value of K1 is smaller than 2, (4) grains of which main faces have the shape of a right angled parallelogram, in which the four corners of the right angled parallelogram are deleted, and 5-100%, preferably 20-100%, of the area of side faces of the deleted parts consist of {111} faces, (5) grains in which, among four sides defining the main face, at least two opposite sides thereof are in forms of outwardly protruding curves, and (6) grains of which main faces have the shape of a right angled parallelogram, in which at least one, preferably 1-4, of the four corners of the right angled parallelogram are deleted in the form of a right angled parallelogram. These can be confirmed by observation using an electron microscope.

The (100) face ratio of the aforementioned (100) tabular grains in the surface crystal habit is 80% or more, preferably 90% or more, and it can be statistically estimated from an electron micrograph of grains. When the (100) tabular grain ratio of AgX grains in an emulsion is approximately 100%, the aforementioned estimation can also be confirmed by the following method. The method is the method disclosed in Journal of the Japan Chemical Society, No. 6, p. 942, 1984, in which a benzothiacyanine dye is allowed to adsorb in varying amounts on a certain amount of the (100) tabular grains at 40 for 17 hours, then light absorbance at 625 nm is measured to obtain the sum of surface areas of the total grains (S) and the sum of (100) face areas (S1) for an emulsion of unit volume, and the (100) face ratio is calculated form the values in accordance with the equation of S1/S×100 (%).

The mean diameter as sphere of the aforementioned (100) tabular grains is preferably less than 0.35 μm. The grain size can be estimated from the measurement of project area and thickness by the replica method.

The aforementioned (100) tabular grains are preferably introduced with electron-capturing zones by doping with multivalent metal ions during the grain formation. The "electron-capturing zone" is a portion in which the concentration of contained multivalent metal ions is $1\times10^{-5}$ to $1\times10^{-3}$ mol/mol local silver and which accounts for 5-30% of the grain volume. The "local silver" means silver amount (mol) incorporated during introduction of the multivalent metal ions. The concentration of the contained multivalent metal ions is preferably $5\times10^{-5}$ to $5\times10^{-4}$ mol/mol local silver.

The concentration of the contained multivalent metal ions must be uniform. The term "uniform" means that the metal ions are introduced into the grains with a constant amount per unit silver amount, and that multivalent metal ions are introduced into a reaction vessel for grain formation at the same time as the silver nitrate used for the grain formation. The halogen solution may also be simultaneously added. A compound containing the multivalent metal ion may be added as an aqueous solution, or fine grains in which a compound releasing the multivalent metal ion is doped or adsorbed can be prepared and added. Examples of the multivalent metal include iron, ruthenium, osmium, cobalt, rhodium, iridium, and chromium. The electron-capturing zone may be at any site in a grain. Further, two or more electron-capturing zones may be present in a grain.

Further, the emulsion of the present invention according to the fourth embodiment of the emulsion of the present invention contains the aforementioned mercapto-group containing polymer, and it is a photographic silver halide emulsion wherein the silver halide grains providing 50% or more of the total projected area satisfy the following (b), (h) and (i).

(b) The grains have an aspect ratio of 2 or more.

(h) The grains have (111) or (100) faces as main faces.

(i) The grains contains at least 80 mol % of silver chloride.

In the forth embodiment, special means is required to produce the silver chloride-rich (111) grains. The method of producing silver chloride-rich tabular grains by using ammonia disclosed in U.S. Pat. No. 4,399,215 of Way may be used. The method of producing silver chloride-rich tabular grains by using a thiocyanate disclosed in U.S. Pat. No. 5,061,617 of Maskasky may also be used. Methods of adding an additive (crystal habit-controlling agent) at the time of the grains formation in order to form silver chloride-rich grains having (111) faces as exterior faces are mentioned below. Any of these methods may be used for the present invention.

| Patent No. | Crystal habit-controlling agent | Inventor |
|---|---|---|
| U.S. Pat. No. 4,400,463 | Azaindenes + thioether peptizer | Maskasky |
| U.S. Pat. No. 4,783,398 | 2-4-Diazolidinone | Mifune et al. |

-continued

| Patent No. | Crystal habit-controlling agent | Inventor |
|---|---|---|
| U.S. Pat. No. 4,713,323 | Aminopyrazolopyrimidine | Maskasky |
| U.S. Pat. No. 4,983,508 | Bispyridinium salt | Ishiguro et al. |
| U.S. Pat. No. 5,185,239 | Triaminopyrimidine | Maskasky |
| U.S. Pat. No. 5,178,997 | 7-Azaindole compound | Maskasky |
| U.S. Pat. No. 5,178,998 | Xanthine | Maskasky |
| JP-A-64-70741 | Dye | Nishikawa et al. |
| JP-A-3-212639 | Aminothioether | Ishiguro |
| JP-A-4-283742 | Thiourea derivative | Ishiguro |
| JP-A-4-335632 | Triazolium salt | Ishiguro |
| JP-A-2-32 | Bispyridinium salt | Ishiguro et al. |
| JP-A-8-227117 | Monopyridinium salt | Ozeki et al. |

For the formation of (111) tabular grains, methods of using various kinds of crystal habit-controlling agents are known as listed in the aforementioned table. Of these agents, preferred are compounds described in JP-A-2-32 (Exemplary Compounds 1 to 42), and Crystal habit-controlling agents 1 to 29 described in JP-A-8-227117 are particularly preferred. However, the present invention is not limited to these compounds.

The (111) tabular grains can be obtained by forming two parallel twin faces.

Formation of the twin faces is affected by temperature, dispersion medium (gelatin), halogen concentration and so forth, and therefore suitable conditions for them should be chosen. In a case where a crystal habit-controlling agent exists at the time of nucleation, the gelatin concentration is preferably 0.1-10%. The chloride concentration is generally 0.01 mol/l or more, preferably 0.03 mol/l or more.

Further, JP-A-8-184931 discloses that it is preferable to use no crystal habit-controlling agent at the time of nucleation in order to obtain monodispersed grains. When no crystal habit-controlling agent is used at the time of nucleation, the gelatin concentration is generally 0.03-10%, preferably 0.05-1.0%. The chloride concentration is generally 0.001-1 mol/l, preferably 0.003-0.1 mol/l. Although the nucleation temperature may be 2-90° C., it is preferably 5-80° C., particularly preferably 5-40° C.

At the first stage of nucleation, nuclei of tabular grains are formed. However, immediately after the nucleation, a lot of nuclei other than tabular grains exist in a reaction vessel. Consequently, it is necessary to use a technique by which a ripening step following the nucleation is carried out so that only tabular grains should remain, whereas other grains should disappear. If usual Ostwald ripening is carried out, the nuclei of the tabular grains are dissolved and disappeared, so that the nuclei of the tabular grains decrease. As a result, the size of the resultant tabular grains increases. In order to prevent this phenomenon, a crystal habit-controlling agent is added. In particular, combined used of phthalated gelatin enhance the effect of the crystal habit-controlling agent, so that dissolution of the tabular grains can be prevented. pAg during the ripening is particularly important, and it is preferably 60-130 mV with respect to a silver/silver chloride electrode.

Then, the formed nuclei are grown by physical ripening and addition of a silver salt and a halide, in the presence of a crystal habit-controlling agent. At this time, the chloride concentration is generally 5 mol/l or less, preferably 0.05-1 mol/l. Although the temperature at the time of grain growth may be selected from the range of 10-90° C., it is preferably 30-80° C. The total amount of the crystal habit-controlling agent to be used is preferably $6\times10^{-5}$ mol or more, particularly preferably $3\times10^{-4}$ to $6\times10^{-2}$ mol, per mol of silver halide in the finished emulsion. The addition time of the crystal habit-controlling agent may be at any stage of nucleation, physical ripening and grain growth of silver halide grains. Formation of the (111) face is triggered by addition thereof. The crystal habit-controlling agent may be placed in a reaction vessel before the reaction. However, in order to produce small sized tabular grains, it is preferable to add the crystal habit-controlling agent into the reaction vessel as the grains grow such that its concentration should increase as the grains grow.

If the amount of dispersion medium employed at the time of nucleation becomes insufficient for the growth of the nuclei, replenishment of the medium by addition is necessary. For the growth, it is preferred that gelatin should be present in an amount of 10-100 g/l. Preferred gelatin for replenishment is phthalated gelatin or trimellit gelatin.

Although pH at the time of the nucleus formation is not particularly limited, it is preferably in the neutral to acidic range.

Then, the (100) tabular grains used in this embodiment are explained. The (100) tabular grains are tabular grains of which main faces are (100) faces. Examples of the shape of the main face include a right-angled parallelogram, a triangle to pentagon corresponding to a right-angled parallelogram of which any one of corners is deleted (the shape of the deleted portion is a right-angled triangular which is formed by sides around the corner with the corner as an apex), tetragon to octagon corresponding to a right-angled parallelogram having two to four deleted portions.

A deleted right-angled parallelogram supplemented for the deleted portions is herein referred to a supplemented tetragon. The ratio of the lengths of neighboring sides (i.e. length of long side/length of short side) of the right-angled parallelogram and the supplemented tetragon is generally 1-6, preferably 1-4, more preferably 1-2.

Tabular silver halide emulsion grains having (100) main faces can be formed by adding an aqueous silver salt solution and an aqueous halide salt solution to a dispersion medium such as an aqueous gelatin solution with stirring and mixing them. For example, JP-A-6-301129, JP-A-6-347929, JP-A-9-34045 and JP-A-9-96881 disclose methods of forming tabular grains, which comprises carrying out the above grain formation in the presence of silver iodide or iodide ions, or silver bromide or bromide ions to generate a strain occurring due to a difference in size of crystal lattice between silver chloride and silver iodide or silver bromide in the silver halide nuclei and thereby introduce crystal defects allowing anisotropic growth such as a helical dislocation into the grains. If the helical dislocation is introduced, formation of two-dimensional nuclei at the dislocation face under low supersaturation conditions is no longer a rate-determining factor, and therefore crystallization at the face proceeds. Thus, tabular grains are formed by introduction of the helical dislocation. The term "low supersaturation conditions" used herein means preferably 35% or less, more preferably 2-20%, based on the critical addition amount. Although it is not established that the crystal defects are helical dislocations, it is considered that they are highly possibly helical dislocations in view of the direction in which the dislocations are introduced or allowance of anisotropic growth to the grains. JP-A-8-122954 and JP-A-9-189977 disclose that maintenance of the introduced dislocations is preferred in order to make the tabular grains thinner.

Further, methods of forming (100) tabular grains by adding a (100) face-forming accelerator are disclosed in JP-A-6-347928 where imidazoles and 3,5-diaminotriazoles are used and JP-A-8-339044 where polyvinyl alcohols are used. However, the present invention should not be limited to them.

In the present invention, the term "silver chloride-rich grains" means grains having a silver chloride content of 80 mol % or more, preferably 95 mol % or more. The grains for use in the present invention preferably have a so-called core/shell structure consisting of a core part and a shell part covering the core part. The core part preferably contains silver chloride in a ratio of 90 mol % or more. Further, the core part may be composed of at least two parts each having a different halogen composition. The shell part preferably accounts for 50% or less, particularly preferably 20% or less, of the total grain volume. The shell part is preferably composed of silver iodochloride or silver iodobromochloride. The shell part preferably has an iodine content of 0.5 mol % to 13 mol %, particularly preferably 1 mol % to 13 mol %. The silver iodide content of the total grains is preferably 5 mol % or less, particularly preferably 1 mol % or less.

Preferably, the silver bromide content is higher in the shell part than in the core part. The silver bromide content is preferably 20 mol % or less, particularly preferably 5 mol % or less. Although the average grain size (an average diameter of a sphere having the same volume of grain) of the silver halide grains is not particularly limited, the average grain size is preferably 0.1-0.8 μm, particularly preferably 0.1-0.6 μm.

The diameter as circle of the silver halide tabular grain is preferably 0.2-1.0 μm. The term "diameter as circle of the silver halide grain" used herein means a diameter of a circle having an area equivalent to the projected area of an individual grain in photographs taken by means of an electron microscope. Further, the thickness of the tabular grain is generally 0.2 μm or less, preferably 0.1 μm or less, particularly preferably 0.06 μm or less. In the present invention, 50% or more of total projected area of the silver halide grains is provided by grains having an aspect ratio (a ratio of diameter/thickness of the grain) of 2 or more, preferably 5-20.

The tabular grain is generally in a tabular shape having two parallel faces. Accordingly, the term "thickness" used in the present invention is defined as a spacing between two parallel faces constituting the tabular grain.

The grain size distribution of the silver halide grains for use in this embodiment may be polydispersed or monodispersed. However, monodispersed distribution is more preferred. In particular, variation coefficient of the diameter as circle of the tabular grains providing 50% or more of total grain projected area is preferably 20% or less, ideally 0%.

The presence of the crystal habit-controlling agent on grain surfaces after grain formation adversely affects adsorption of sensitizing dyes and development. Therefore, it is preferable to remove the crystal habit-controlling agent after the grain formation. However, if the crystal habit-controlling agent is removed, it is difficult for the silver chloride-rich (111) tabular grains to maintain the (111) faces under normal conditions. Therefore, it is preferable to maintain the shape of the grains by replacing the crystal habit-controlling agent with a photographically useful compound such as a sensitizing dye. This method is described in, for example, JP-A-9-80656, JP-A-9-106026, U.S. Pat. Nos. 5,221,602, 5,286,452, 5,298,387, 5,298,388 and 5,176,992.

The crystal habit-controlling agent can be desorbed from the grains by the aforementioned method. The desorbed crystal habit-controlling agent is preferably removed from the emulsion by means of washing with water. The temperature for washing with water may be a temperature that does not cause coagulation of gelatin usually employed as a protective colloid. The method for washing with water may be any of various known techniques such as the flocculation method and the ultrafiltration method. The washing temperature is preferably 40° C. or more.

A lower pH value accelerates the desorption of the crystal habit-controlling agent from the grains. Therefore, the use of a lower pH in the washing step is preferred so long as the grains are not unduly aggregated.

The silver halide grains may contain metals belonging to Group VIII of the periodic table, i.e., ions or complex ions of metals selected from osmium, iridium, rhodium, platinum, ruthenium, palladium, cobalt, nickel and iron individually or in a combination thereof. Further, two or more kinds of these metals may be used together.

The aforementioned metal ion-donating compounds may be contained in the silver halide grains used in the present invention by adding them to an aqueous gelatin solution used as the dispersion medium, an aqueous halide solution, an aqueous silver salt solution or another aqueous solution during the silver halide grain formation, or alternatively by adding them in the form of previously prepared fine silver halide grains containing the metal ions to a silver halide emulsion and then dissolving them in the emulsion. Further, incorporation of the metal ions into the grains may be effected before, during or immediately after the formation of grains. The time of the incorporation may be determined depending on the position in the grain at which the metal ions shall be incorporated and amount of the metal ions incorporated into the grain.

It is preferred that 50 mol % or more, preferably 80 mol % or more, more preferably 100%, of the metal ion-donating compound incorporated into the silver halide grains should be localized in a surface layer corresponding to 50% or less of the total grain volume from the grain surface. The value of the surface layer is preferably 30% or less. Localization of the metal ions in the surface layer is advantageous for suppressing increase in internal sensitivity and obtaining high sensitivity.

Such localized incorporation of the metal ion-donating compound into a surface layer of the silver halide grain as mentioned above can be achieved by, for example, forming the silver halide grain except for the surface layer (core) and then supplying the metal ion-donating compound with addition of a water-soluble silver salt solution and an aqueous halide solution used for forming the surface layer.

The silver halide emulsion may also contain various kinds of polyvalent metal ion impurities in addition to the Group VIII metals in the process of emulsion grain formation or physical ripening. Although the amount of these compounds to be added widely ranges in accordance with the purpose of these compounds, it is preferably $10^{-9}$-$10^{-2}$ mol per mol of silver halide.

The silver halide emulsion may have a further characteristic depending on a layer in which the emulsion is used. In particular, when it is used in a blue-sensitive layer, silver halide grains contained in the silver halide emulsion preferably have a silver iodide content of 3 mol % or more, more preferably 5 mol % or more. Further, when it is used in a high sensitivity layer, the diameter as circle is preferably 1 μm or more, more preferably 2 μm or more.

As another embodiment of the present invention, there can be mentioned a silver halide photographic emulsion containing tabular grains wherein the emulsion contains the aforementioned mercapto group-containing polymer, and silver halide grains providing 50% or more of the total projected areas satisfy the following (j), (k) and (m) mentioned below.

(j) The silver halide grains have a diameter as circle of 2 μm or more.

(k) The grains have an aspect ratio of 10 or more.

(m) Average AgI content in each grain is 5 mol % or more.

Further, as a further embodiment of the present invention, there can be mentioned a silver halide photographic emulsion containing tabular grains wherein the emulsion contains the aforementioned mercapto group-containing polymer, silver halide grains providing 50% or more of the total projected areas satisfy the following (j), and silver halide grains providing 80% or more of the total projected areas do not have dislocation lines in an area corresponding to 50% of the projected area of each grain from the center of the projected area. (j) The silver halide grains have a diameter as circle of 2 μm or more.

In this embodiment, grains in which dislocation lines are not observed in an area corresponding to 50%, preferably 80%, of the projected area of each grain from the center of the main face when observed with a transmission electron microscope preferably provide 80% or more, more preferably 90% or more, of the total projected areas. The center of the main face is a position of the center of gravity in the area of the main face. This embodiment contributes to, in particular, impartation of pressure resistance of the light-sensitive material.

For the embodiments where the aspect ratio is not particularly defined among the various embodiments mentioned above, the aspect ratio may be arbitrarily selected. However, the aspect ratio is preferably 10-300, more preferably 10-100, particularly preferably 15-100.

Hereafter, techniques applicable to all the emulsions of the present invention will be explained.

The photographic emulsion that can be used in the present invention can be prepared by methods described in, for example, P. Glafkides in "Chemie et Phisique Photographique", Paul Montel, 1967; G. F. Duffin in "Photographic Emulsion Chemistry", Focal Press, 1966; V. L. Zelikman et al., "Making and Coating Photographic Emulsion", Focal Press, 1964 and so forth. That is, the preparation can be performed by the acidic method, neutral method, ammonia method and so forth. Further, the single jet method, double jet method and so forth may be used individually or in a combination thereof as a method for supplying reaction solutions of water-soluble silver salt and water-soluble halogen salt. A method of forming grains in the presence of excessive silver ions (so-called reverse mixing method) may also be used. It is also preferable to employ one type of the double jet method, i.e., the so-called controlled double jet method, where pAg in the liquid phase in which silver halide is formed is maintained constant. By this method, a silver halide emulsion characterized by regular crystal form and substantially uniform grain size can be obtained.

A method in which previously precipitated and formed silver halide grains are added to a reaction vessel for the preparation of an emulsion and the methods described in, for example, U.S. Pat. Nos. 4,334,012, 4,301,241, and 4,150,994 are preferred in some cases. These can be used as seed crystals, or supply of them as silver halide for the growth is also effective. In the latter case, an emulsion containing grains having a small grain size is preferably added, and as for the addition method, the whole amount may be added at one time, added as divided portions at plurality of times, or added continuously. Further, in some cases, it is also effective to add grains having different halogen compositions in order to modify the surfaces.

The method in which a large part or only a small part of the halogen composition of silver halide grains is converted by the halogen conversion method is disclosed in, for example, U.S. Pat. Nos. 3,477,852 and 4,142,900, EP273,429A, EP273,430A, West German Patent Publication No. 3,819,241 and so forth, and it is an effective grain formation method. To convert to a more hardly soluble silver salt, it is possible to add a solution of a soluble halogen or to add silver halide grains. The conversion may be performed for the total halogen composition at one time, portionwise at plurality of times, or continuously.

In addition to methods for allowing grains to grow by adding a soluble silver salt and a halogen salt at constant concentrations at constant flow rates, methods for forming grains with varying concentrations or at varying flow rates as described in British Patent 1,469,480, U.S. Pat. Nos. 3,650,757 and 4,242,445 are preferred. The amount of the silver halide to be supplied can be varied as a linear function, a secondary function or a more complicated function of addition time by changing the concentration or increasing the flow rate. Further, if necessary, it is also preferred that the amount of the silver halide is decreased in some cases. Furthermore, when a plurality of soluble silver salts or a plurality of soluble halogen salts different in solution composition are added, they are also effectively added in such a manner that one is increased and the other is decreased.

A mixing vessel that is used when a solution of a soluble silver salt and a solution of a soluble halogen salt are reacted can be selected for use from methods described in U.S. Pat. Nos. 2,996,287, 3,342,605, 3,415,650 and 3,785,777, and West German Patent Publication Nos. 2,556,885 and 2,555,364.

For promoting ripening, for silver halide solvents are useful. For example, the presence of an excess amount of halogen ions in a reaction vessel is known to promote ripening. Further, other ripening agents can also be used. The ripening agent can be added in the whole amount to a dispersion medium in a reaction vessel before addition of the halide and silver salts, or can also be introduced into the reaction vessel with addition of the silver and halide salts or a deflocculant. As another modified embodiment, the ripening agent can also be independently introduced in the stage of addition of the halide and silver salts.

Examples of the ripening agent include, for example, ammonia, thiocyanates (e.g. potassium rhodanate and ammonium rhodanate), organic thioether compounds (e.g. compounds described in, for example, U.S. Pat. Nos. 3,574,628, 3,021,215, 3,057,724, 3,038,805, 4,276,374, 4,297,439, 3,704,130 and 4,782,013, and JP-A-57-104926), thione compounds (e.g. tetra-substituted thioureas described in, for example, JP-A-53-82408 and 55-77737 and U.S. Pat. No. 4,221,863; and compounds described in JP-A-53-144319), mercapto compounds capable of promoting the growth of silver halide grains described in JP-A-57-202531, and amine compounds (e.g., those described in JP-A-54-100717).

In some cases, a method wherein a chalcogen compound is added during the preparation of the emulsion, as described in U.S. Pat. No. 3,772,031, is also useful. In addition to S, Se and Te, a cyanate, a thiocyanate, a selenocyanate, a carbonate, a phosphate or an acetate may be present.

The silver halide grains for use in the present invention can be subjected to at least one of chalcogen sensitization such as sulfur sensitization and selenium sensitization, noble metal sensitization such as gold sensitization and palladium sensitization and reduction sensitization, in any step of the production of the silver halide emulsion. A combination of two or more kinds of sensitizations is preferred. Various types of emulsions can be produced, depending on the steps in which the chemical sensitization is carried out. There are a type wherein chemical sensitizing nuclei are embedded in grains, a type wherein chemical sensitizing nuclei are embedded at parts near the surface of grains, and a type wherein chemical sensitizing nuclei are formed on the surface. In the emulsion for use in the present invention, the location at which chemical sensitizing nuclei are situated can be selected depending on the purpose. However, it is generally preferred that at least one chemical sensitizing nuclei are formed in the vicinity of the surface of the grain.

Chemical sensitizations that can be carried out preferably in the present invention are chalcogen sensitization and noble metal sensitization, which may be used singly or in combination, and the chemical sensitization can be carried out by using active gelatin, as described in T. H. James, The Theory of the Photographic Process, 4th edition, Macmillan, 1997, pages 67 to 76, or by using sulfur, selenium, tellurium, gold, platinum, palladium or iridium or a combination of these sensitizing agents at pAg of 5-10, pH of 5-8 and a temperature of 30-80° C., as described in Research Disclosure, Vol. 120, Item 12008 (April 1974); Research Disclosure, Vol. 34, Item 13452 (June 1975); U.S. Pat. Nos. 2,642,361, 3,297,446, 3,772,031, 3,857,711, 3,901,714, 4,266,018, and 3,904,415 and GB1,315,755. In the noble metal sensitization, a salt of a noble metal such as gold, platinum, palladium and iridium can be used, and specifically gold sensitization, palladium sensitization and a combination thereof are particularly preferred. In the case of gold sensitization, a known compound such as chloroauric acid, potassium chloroaurate, potassium auriothiocyanate, gold sulfide and gold selenide can be used. The palladium compound means salts such as divalent or tetravalent palladium salt. Preferred palladium compounds are represented as $R_2PdX_6$ or $R_2PdX_4$, wherein R represents a hydrogen atom, an alkali metal atom or an ammonium group; and X represents a halogen atom, i.e. a chlorine atom, a bromine atom or an iodine atom.

Specifically, $K_2PdCl_4$, $(NH_4)_2PdCl_6$, $Na_2PdCl_4$, $(NH_4)_2PdCl_4$, $Li_2PdCl_4$, $Na_2PdCl_6$ and $K_2PdBr_4$ are preferred. Preferably, a gold compound and a palladium compound are used in combination with a thiocyanate or a selenocyanate.

As the sulfur sensitizer, there can be used hypo, thiourea compounds, rhodanine compounds and sulfur-containing compounds described in U.S. Pat. Nos. 3,857,711, 4,266,018 and 4,054,457. The chemical sensitization can also be performed in the presence of a so-called chemical sensitization aid. Examples of useful chemical sensitization aid are compounds known as those capable of suppressing fog and increasing sensitivity in the process of chemical sensitization, such as azaindene, azapyridazine and azapyrimidine. Examples of the chemical sensitization aid and modifier are described in U.S. Pat. Nos. 2,131,038, 3,411,914, 3,554,757, JP-A-58-126526 and G. F. Duffin, "Chemistry of Photographic Emulsion", pages 138-143.

It is preferable to also perform gold sensitization for the silver halide emulsion for use in the present invention. The amount of a gold sensitizer is preferably $1\times10^{-4}$ to $1\times10^{-7}$ mol, more preferably $1\times10^{-5}$ to $5\times10^{-7}$ mol, per mol of silver halide. The amount of a palladium compound is preferably $1\times10^{-3}$ to $5\times10^{-7}$ mol per mol of silver halide. The amount of a thiocyan compound or selenocyan compound is preferably $5\times10^{-2}$ to $1\times10^{-6}$ mol per mol of silver halide.

The amount of a sulfur sensitizer used for the silver halide grains is preferably $1\times10^{-4}$ to $1\times10^{-7}$ mol, more preferably $1\times10^{-5}$ to $5\times10^{-7}$ mol, per mol of silver halide.

Selenium sensitization is a preferred sensitization technique for a silver halide emulsion. In the selenium sensitization, known unstable selenium compounds are used. Specifically, selenium compounds such as colloidal metallic selenium, selenoureas (e.g., N,N-dimethylselenourea, N,N-diethylselenourea etc.), selenoketones and selenoamides can be used. In some cases, selenium sensitization is preferably used in combination with sulfur sensitization, noble metal sensitization or both of them.

It is preferred that the silver halide emulsions used in the invention are subjected to reduction sensitization during grain formation, after grain formation and before or during chemical sensitization, or after chemical sensitization.

For reduction sensitization as used herein, any of methods of adding reduction sensitizers to the silver halide emulsions, methods of conducting growth or ripening in an atmosphere of a low pAg of 1 to 7, which is called silver ripening, and methods of conducting growth or ripening in an atmosphere of a high pH of 8 to 11, which is called high pH ripening can be selected. Further, two or more of them can also be used in combination.

The methods of adding the reduction sensitizers are preferred, because the level of reduction sensitization can be precisely controlled.

Examples of known reduction sensitizers include thiourea dioxide, ascorbic acid and derivatives thereof, amines and polyamines, hydrazine derivatives, dihydroxybenzenes and derivatives thereof (e.g., disodium 4,5-dihydroxy-1,3-benzenesulfonate etc.), hydroxylamines and derivatives thereof, silane compounds and borane compounds. In the reduction sensitization according to the present invention, appropriate one may be selected from among these known reduction sensitizers and used or at least two may be selected and used in combination. Preferred reduction sensitizers are thiourea dioxide, ascorbic acid and derivatives thereof, hydrazine derivatives, dihydroxybenzenes and derivatives thereof. Although the addition amount of reduction sensitizer must be selected because it depends on the emulsion production conditions, it is preferably in the range of $10^{-7}$-$10^{-3}$ mol per mol of silver halide.

Each reduction sensitizer is dissolved in water or any of organic solvents such as alcohols, glycols, ketones, esters and amides and added during the grain growth. Although the reduction sensitizer may be put in a reaction vessel in advance, it is preferred that the addition should be effected at an appropriate time during the grain growth. It is also possible to add in advance the reduction sensitizer to an aqueous solution of a water-soluble silver salt or a water-soluble alkali halide and use these aqueous solutions to precipitate silver halide grains. Alternatively, the reduction sensitizer solution may preferably be either divided and added a plurality of times in accordance with the grain growth or continuously added over a prolonged period of time.

Preferably an oxidizing agent for silver is added during the process of the production of the emulsion according to the present invention. The oxidizing agent for silver refers to a compound that acts on metal silver to convert it to silver ions. Particularly useful is a compound that converts extremely fine silver grains, which are concomitantly produced during the formation and the chemical sensitization of silver halide grains, to silver ions. The produced silver ions may form a silver salt that is hardly soluble in water, such as a silver halide, silver sulfide and silver selenide, or they may form a silver salt that is readily soluble in water such as silver nitrate. The oxidizing agent for silver may be an inorganic or organic substance. Examples of inorganic oxidizing agents include ozone, hydrogen peroxide and its adducts (e.g., $NaBO_2.H_2O_2.3H_2O$, $2NaCO_3.3H_2O_2$, $Na_4P_2O_7.2H_2O_2$ and $2Na_2SO_4.H_2O_2.2H_2O$), oxygen acid salts such as peroxyacid salts (e.g., $K_2S_2O_8$, $K_2C_2O_6$ and $K_2P_2O_8$), peroxycomplex compounds (e.g., $K_2[Ti(O_2)C_2O_4].3H_2O$, $4K_2SO_4.Ti(O_2)OH.SO_4.2H_2O$ and $Na_3[VO(O_2)(C_2H_4)_2].6H_2O$), permanganates (e.g., $KMnO_4$) and chromates (e.g., $K_2Cr_2O_7$), halogen elements such iodine and bromine, perhalates (e.g., potassium periodate), salts of metals having higher valences (e.g., potassium hexacyanoferrate (III) and thiosulfonates.

Examples of the organic oxidizing agents include quinones such as p-quinone, organic peroxides such as peracetic acid and perbenzoic acid, and compounds that can release active halogen (e.g., N-bromosuccinimide, chloramine T and chloramine B).

Oxidizing agents preferred in the present invention are inorganic oxidizing agents selected from hydrogen peroxide and its adducts, halogen elements and thiosulfonates and organic oxidizing agents selected from quinones. The use of the oxidizing agent for silver in combination with the above reduction sensitization is preferred. This combined use can be effected by performing the reduction sensitization after the use of the oxidizing agent or vice versa or by simultaneously performing the reduction sensitization and using the oxidizing agent. These methods can be performed during the step of grain formation or the step of chemical sensitization.

The photographic emulsion used in the present invention can contain various compounds in order to prevent fog or stabilize photographic performance during the production process, storage or photographic process of the light-sensitive material. That is, various compounds known as an antifoggant or a stabilizer can be added, and examples thereof include, for example, thiazoles such as benzothiazolium salt, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles and mercaptotetrazoles (in particular 1-phenyl-5-mercaptotetrazole); mercaptopyrimidines; mercaptotriazines; thioketo compounds such as oxadolinethione; azaindenes such as triazaindenes, tetrazaindenes (in particular, tetrahydroxy-substituted (1,3,3a,7)-tetrazaindenes) and pentazaindenes. For example, the compounds described in U.S. Pat. Nos. 3,954,474 and 3,982,947 and JP-B-52-28660 can be used. One class of preferred compounds are those described in JP-A-63-212932. The antifoggant and the stabilizer can be added at any of different times, for example, they can be added before, during and after the grain formation, during the washing with water, during dispersion after the washing, before, during and after the chemical sensitization and before coating, depending on the purpose. The antifoggant and the stabilizer can be added during preparation of the emulsion to achieve their original fog preventing effect and stabilizing effect, and in addition, they can be used for various purposes of, for example, controlling crystal habit of grains, decreasing grain size, decreasing solubility of grains, controlling chemical sensitization, controlling arrangement of dyes and so forth.

The photographic emulsion to be used in the present invention is generally sensitized with methine dyes and so forth. Dyes that can be used include cyanine dyes, merocyanine dyes, composite cyanine dyes, composite merocyanine dyes, halopolar cyanine dyes, hemicyanine dyes, styryl dyes and hemioxonol dyes. Particularly useful dyes are those belonging to cyanine dyes, merocyanine dyes and composite merocyanine dyes. In these dyes, any of nuclei generally used in cyanine dyes as basic heterocyclic nuclei can be used. That is, pyrroline nucleus, oxazoline nucleus, thiazoline nucleus, pyrrole nucleus, oxazole nucleus, thiazole nucleus, selenazole nucleus, imidazole nucleus, tetrazole nucleus and pyridine nucleus; and a nucleus formed by fusing an cycloaliphatic hydrocarbon ring or an aromatic hydrocarbon ring to any of these nuclei, that is, for example, indolenine nucleus, benzindolenine nucleus, indole nucleus, benzoxazole nucleus, naphthooxazole nucleus, benzothiazole nucleus, naphthothiazole nucleus, benzoselenazole nucleus, benzimidazole nucleus and quinoline nucleus can be used. These nuclei may be substituted on the carbon atom.

In the merocyanine dyes or the composite merocyanine dyes, as a nucleus having a ketomethylene structure, a 5- to 6-membered heterocyclic nucleus such as pyrazolin-5-one nucleus, thiohydantoine nucleus, 2-thiooxazolidine-2,4-dione nucleus, thiazolidine-2,4-dione nucleus, rhodanine nucleus and thiobarbituric acid nucleus can be used.

These sensitizing dyes can be used singly or in combination, and a combination of these sensitizing dyes is often used, in particular, for the purpose of supersensitization. Typical examples thereof are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862 and 4,026,707, GB1,344,218, GB1,507,803, JP-B-43-4936, JP-B-53-12,375, JP-A-52-110618 and JP-A-52-109925.

Together with the sensitizing dye, a dye having no spectral sensitizing action itself, or a substance that does not substantially absorb visible light and that exhibits supersensitization, may be included in the emulsion.

The time of adding the sensitizing dye to the emulsion may be at any stage known to be useful in the preparation of emulsions. The addition is carried out most usually at a time after the completion of chemical sensitization and before coating, but it can be carried out at the same time as the addition of a chemical sensitizer to simultaneously carry out spectral sensitization and chemical sensitization, as described in U.S. Pat. Nos. 3,628,969 and 4,225,666, it can also be carried out prior to chemical sensitization as described in JP-A-58-113928, or it can also be carried out before the completion of the formation of the precipitate of silver halide grains to start spectral sensitization. Further, as taught in U.S. Pat. No. 4,255,666, these foregoing compounds may be added in portions, i.e., part of these compounds may be added prior to chemical sensitization, and the rest may be added after the chemical sensitization, and the addition may also be carried out at any time during the formation of silver halide grains as, for example, the method disclosed in U.S. Pat. No. 4,183,756 and so forth.

The amount of the sensitizing dye to be added may be $4\times10^{-6}$ to $8\times10^{-3}$ mol per mol of the silver halide. However, when the silver halide grain size is 0.2-1.2 μm, which is more preferable, the amount of the sensitizing dye to be added is more effectively about $5\times10^{-5}$ to $2\times10^{-3}$ mol per mol of the silver halide.

By using the emulsions of the present invention, a high sensitivity silver halide photographic light-sensitive material wherein aggregation of grains is prevented and which can be stably produced, and a silver halide photographic light-sensitive material showing superior pressure resistance can be provided.

Silver Halide Photographic Light-Sensitive Material

Hereafter, the silver halide photographic light-sensitive material of the present invention will be explained.

The silver halide photographic light-sensitive material of the present invention is characterized by containing the polymer compound of the present invention. The polymer compound of the present invention is preferably contained in at least one of hydrophilic colloid layers (e.g., silver halide emulsion layer and non-photosensitive hydrophilic colloid layer). A preferred embodiment of the silver halide photographic light-sensitive material of the present invention is one in which the polymer compound of the present invention is contained in at least one of silver halide emulsion layers and hydrophilic colloid layers adjacent thereto, and a particularly preferred embodiment is one in which the polymer compound of the present invention is contained in a silver halide emulsion layer. When the polymer compound of the present invention is contained in a silver halide emulsion layer, it is particularly preferable to use the emulsion of the present invention.

The silver halide photographic light-sensitive material of the present invention is a material showing photosensitivity to light, laser light or X-ray radiation, and may be in the form of any of monochrome reversal film, monochrome negative film, color negative film, color reversal film, film in which photosensitive photographic components are digitally scanned, monochrome reversal paper, monochrome paper, color paper, reversal color paper and paper in which photosensitive photographic components are exposed with laser irradiation controlled based on signals from a digital database. The silver halide photographic light-sensitive material is preferably a color negative film, and examples of the configuration thereof include those described in JP-A-11-305396 and so forth.

Techniques such as those for layer arrangement, silver halide emulsions, dye forming couplers, functional couplers such as DIR couplers, various additives and development usable for silver halide photographic light-sensitive materials to which the present invention is applicable are described in European Patent No. 0565096A1 (published on Oct. 13, 1993) and the patents cited in it. The individual items and the corresponding portions are listed below.

1. Layer structure: page 61, lines 23-35, page 61, line 41 to page 62, line 14
2. Intermediate layer: page 61, lines 36-40
3. Interlayer effect-imparting layer: page 62, lines 15-18
4. Silver halide halogen composition: page 62, lines 21-25
5. Silver halide grain crystal habit: page 62, lines 26-30
6. Silver halide grain size: page 62, lines 31-34
7. Emulsion preparation method: page 62, lines 35-40
8. Silver halide grain size distribution: page 62, lines 41-42
9. Tabular grains: page 62, lines 43-46
10. Internal structures of grain: page 62, lines 47-53
11. Latent image formation type of emulsion: page 62, line 54 to page 63, line 5
12. Physical ripening and chemical ripening of emulsion: page 63, lines 6-9
13. Use of emulsion mixture: page 63, lines 10-13
14. Fogged emulsion: page 63, lines 14-31
15. Light-insensitive emulsion: page 63, lines 32-43
16. Silver coating amount: page 63, lines 49-50
17. Photographic additives: described in Research Disclosure (RD) Item 17643 (December, 1978), Item 18716 (November, 1979), and Item 308119 (December, 1989). The individual items and the corresponding portions of descriptions are mentioned below.

| Kind of Additive | RD 17643 | RD 18716 | RD 308119 |
|---|---|---|---|
| 1. Chemical sensitizer | p. 23 | p. 648, right column | page 996 |
| 2. Sensitivity enhancing agent | | p. 648, right column | |
| 3. Spectral sensitizer and supersensitizer | pp. 23-24 | p. 648, right column to p. 649, right column | page 996, right column to page 998, right column |

-continued

| Kind of Additive | RD 17643 | RD 18716 | RD 308119 |
|---|---|---|---|
| 4. Brightening agent | p. 24 | | page 998, right column |
| 5. Antifoggant and stabilizer | pp. 24-25 | p. 649, right column | page 998, right column to page 1,000, right column |
| 6. Light absorber, filter dye and UV absorber | pp. 25-26 | p. 649, right column to p. 650, left column | page 1,003, left column to right column |
| 7. Anti-staining agent | p. 25, right column | p. 650, left column to right column | page 1,002, right column |
| 8. Dye image stabilizer | p. 25 | | page 1,002, right column |
| 9. Hardener | p. 26 | p. 651, left column | page 1,004, right column to page 1,005, left column |
| 10. Binder | p. 26 | p. 651, left column | page 1,003, right column to page 1,004, right column |
| 11. Plasticizer and lubricant | p. 27 | p. 650, right column | page 1,006, left column to right column |
| 12. Coating aid and surfactant | pp. 26-27 | p. 650, right column | page 1,005, left column to page 1,006, left column |
| 13. Antistatic agent | p. 27 | p. 650, right column | page 1,006, right column to page 1,007, left column |
| 14. Matting agents | | | page 1,008, left column to page 1,009, left column |

18. Formaldehyde scavenger: page 64, lines 54-57
19. Mercapto type antifoggant: page 65, lines 1-2
20. Agents releasing fogging agent etc.: page 65, lines 3-7
21. Dyes: page 65, lines 7-10
22. General review for color couplers: page 65, lines 11-13
23. Yellow, magenta and cyan couplers: page 65, lines 14-25
24. Polymer coupler: page 65, lines 26-28
25. Diffusing dye-forming coupler: page 65, lines 29-31
26. Colored coupler: page 65, lines 32-38
27. General review for functional couplers: page 65, lines 39-44
28. Bleaching accelerator releasing coupler: page 65, lines 45-48
29. Development accelerator releasing coupler: page 65, lines 49-53
30. Other DIR couplers: page 65, line 54 to page 66, line 4
31. Coupler diffusing method: page 66, lines 5-28
32. Antiseptic and mildewproofing agents: page 66, lines 29-33
33. Types of light-sensitive materials: page 66, lines 34-36
34. Film thickness and swelling speed of light-sensitive layer: page 66, line 40 to page 67, line 1
35. Back layer: page 67, lines 3-8
36. General review for development treatment: page 67, lines 9-11
37. Developer and developing agent: page 67, lines 12-30
38. Developer additives: page 67, lines 31-44
39. Reversal processing: page 67, lines 45-56
40. Processing solution aperture ratio: page 67, line 57 to page 68, line 12
41. Development time: page 68, lines 13-15
42. Bleach fixing, bleaching and fixing: page 68, line 16 to page 69, line 31
43. Automatic processor: page 69, lines 32-40
44. Washing with water, rinsing and stabilization: page 69, line 41 to page 70, line 18
45. Replenishment and reuse of processing solutions: page 70, lines 19-23
46. Incorporation of developing agent into light-sensitive material: page 70, lines 24-33
47. Development temperature: page 70, lines 34-38
48. Application to film with lens: page 70, lines 39-41

When a silver halide photographic light-sensitive material is prepared according to the present invention, the silver halide photographic light-sensitive material may contain a color developing agent in order to simplify the processing and increase the processing speed. For this purpose, various types of precursors of the color developing agent can be preferably used. Examples of the precursor are indoaniline compounds described in U.S. Pat. No. 3,342,597, e.g., Schiff base compounds described in U.S. Pat. No. 3,342,599 and Research Disclosure Nos. 14,850 and 15,159, aldol compounds described in Research Disclosure No. 13,924, metal salt complexes described in U.S. Pat. No. 3,719,492, and urethane compounds described in JP-A-53-135628.

A silver halide photographic light-sensitive material to which the present invention is applied can contain various 1-phenyl-3-pyrazolidones in order to accelerate color development, if necessary. Typical examples of the compounds are described in JP-A-56-64339, JP-A-57-144547 and JP-A-58-115438.

Each processing solution used in the present invention is used at a temperature of 10-50° C. Although a normal processing temperature is 33-38° C., processing can be accelerated at higher temperatures to shorten the processing time, or the image quality or the stability of processing solutions can be improved at lower temperatures.

The silver halide photographic light-sensitive material of the present invention can be applied to the photothermographic materials described in U.S. Pat. No. 4,500,626, JP-A-60-133449, JP-A-59-218443, JP-A-61-238056, EP210, 660A2 and so forth.

Further, when the silver halide photographic light-sensitive material of the present invention is applied to a film unit with lens, such as those described in JP-B-2-32615 and Japanese Utility Model Publication No. 3-39784, the effects of the present invention can be achieved more easily and thus effective.

The characteristics of the present invention will be further specifically explained with reference to the following examples and comparative examples. The materials, amounts, ratios, types of procedures, orders of procedures and so forth shown in the following examples can be optionally changed so long as such change does not depart from the spirit of the present invention. Therefore, the scope of the present invention should not be construed in a limitative way based on the following examples.

Example 1

Polymer Synthesis (Synthesis of Polymers WP-1a to le)

Solution A was prepared by dissolving 50 g of acrylamide and 0.396 g of 2-mercaptoethylamine hydrochloride in a pH 4.7 phthalic acid buffer solution (90 mL), and Solution B was prepared by dissolving the radical generating agent V-50 made by Wako Junyaku in a phthalic acid buffer solution (50 mL).

Under a nitrogen atmosphere, a phthalic acid buffer solution (150 mL) was charged to a 1,000 mL three-necked flask and Solutions A and B were separately added dropwise over 3 hours at 60° C. Following the dropwise addition, the mixture was stirred with heating for 3 hours at 80° C. and cooled to room temperature. The reaction solution was added dropwise to 10 L of methanol and reprecipitated. The solid component obtained was removed by filtration and dried under reduced pressure at 40° C., yielding 50 g of polyacrylamide.

A20 g (0.22 mmol) quantity of the polyacrylamide obtained was dissolved in 300 mL of water and adjusted to pH 8.0 with mol/L of NaOH. To this polyacrylamide aqueous solution was added dropwise over a period of 20 min a solution prepared in advance by dissolving 495 mg (2.2 mmol) of 4-(5-mercapto-1-tetrazolyl)benzoic acid, 253 mg (2.2 mmol) of N-hydroxysuccinimide (NHS), and 422 mg (2.2 mmol) of (N-ethyl-N,N-dimethylaminopropylcarbodiimide (WSC) in 30 mL of N,N-dimethyl formamide and stirring the mixture for 3 hours at room temperature. Following the dropwise addition, the mixture was stirred for 30 min while being maintained at 40° C. With the conclusion of the reaction, the reaction solution was slowly added to 6 L of methanol and the solid component obtained was filtered out. It was then redissolved in 270 mL of water and reprecipitated from 6 L of methanol. The solid component was filtered out. The solid component obtained was dried under reduced pressure at 40° C., yielding 20 g of WP-1a in the form of a white solid.

Further, polyacrylamide of controlled molecular weight was synthesized by varying the quantity of 2-mercaptoethylamine hydrochloride added. Using 10 mol equivalents relative to the polymer obtained of 4-(5-mercapto-1-tetrazolyl) benzoic acid, NHS, and WSC, polymers WP-1b to WP-1e of differing molecular weights were synthesized. Table 1 gives the physical properties of each of the polymers synthesized.

(Synthesis of Polymers WP-2a and 2b)

Solution A was prepared in advance by adding 47.5 g of acrylamide, 2.5 g of acrylic acid, and 0.396 g of 2-mercaptoethylamine hydrochloride to a pH 4.7 phthalic acid buffer solution (90 mL), and Solution B was prepared in advance by dissolving the radical generating agent V-50 made by Wako Junyaku in a phthalic acid buffer solution (50 mL).

Under a nitrogen atmosphere, a phthalic acid buffer solution (150 mL) was added to a 1,000 mL three-necked flask and Solutions A and B were separately added dropwise over 3 hours at 60° C. Following the dropwise addition, the mixture was stirred with heating for 3 hours at 80° C. and cooled to room temperature. The pH was adjusted to 7.8 with 5 mol/L NaOH and then added dropwise to 5 L of methanol and reprecipitated. The solid component obtained was removed by filtration and dried under reduced pressure at 40° C., yielding 50 g of acrylamide-acrylic acid copolymer.

A 20 g quantity of the polymer obtained was dissolved in 70 mL of water and adjusted to pH 8.0 with 5 mol/L NaOH. To this polymer aqueous solution was added dropwise over a period of 20 min a solution prepared in advance by dissolving 1.43 g (5.9 mmol) of disodium 4-(5-mercapto-1-tetrazolyl)-benzoate, 0.68 g (5.9 mmol) of NHS, and 1.13 g (5.9 mmol) of WSC in 70 mL of N,N-dimethyl formamide and stirring the mixture for 3 hours at room temperature. Following the dropwise addition, the mixture was stirred for 3 hours while maintained a temperature of 40° C. With the conclusion of the reaction, the reaction solution was slowly added to 3 L of methanol and the solid component obtained was filtered out. It was then redissolved in 50 mL of water and reprecipitated from 3 L of methanol. The solid component was filtered out. The solid component obtained was dried under reduced pressure at 40° C., yielding 2 g of WP-2a in the form of a white solid.

Further, acrylamide-acrylic acid copolymer of controlled molecular weight was synthesized by varying the quantity of 2-mercaptoethylamine hydrochloride added. Using 10 mol equivalents relative to the polymer obtained of 4-(5-mercapto-1-tetrazolyl)benzoic acid, NHS, and WSC, polymer WP-2b of differing molecular weight was synthesized. Table 1 gives the physical properties of each of the polymers synthesized.

(Synthesis of Polymers WP-3a to 3d)

An acrylamide-acrylic acid copolymer of controlled molecular weight was synthesized by the same method as employed for polymers WP-2a and 2b by changing the quantity of 2-mercaptoethylamine hydrochloride added and changing the mass ratio of acrylamide and acrylic acid added to 95:5. Using 10 mol equivalents relative to the polymer obtained of 4-(5-mercapto-1-tetrazolyl)benzoic acid, NHS, and WSC, polymers WP-3a to WP-3d of differing molecular weights were synthesized. Table 1 gives the physical properties of each of the polymers synthesized.

TABLE 1

| Sample | Amount of mercaptoethylamine hydrochloride | Number average molecular weight | Amount of nitrogen-containing aromatic ring per 1 g of polymer (μm/g) | Amount of nitrogen-containing aromatic ring per a polymer chain (mol) | Note |
|---|---|---|---|---|---|
| WP-1a | 0.396 g | 120000 | 4.0 | 0.48 | Invention |
| WP-1b | 0.79 g | 21000 | 28.0 | 0.58 | Invention |
| WP-1c | 1.58 g | 13000 | 48.0 | 0.62 | Invention |
| WP-1d | 2.68 g | 8000 | 125.0 | 1.00 | Invention |
| WP-1e | 2.71 g | 8000 | 128.0 | 1.02 | Invention |
| WP-2a | 0.396 g | 170000 | 4.5 | 0.76 | Invention |
| WP-2b | 0.198 g | 43000 | 18.0 | 0.77 | Invention |
| WP-3a | 0.304 g | 131000 | 7.7 | 1.00 | Invention |
| WP-3b | 0.132 g | 55000 | 18.0 | 1.00 | Invention |
| WP-3c | 0.396 g | 131000 | 10.0 | 1.30 | Invention |
| WP-3d | 0.198 g | 55000 | 27.0 | 1.48 | Invention |

(Synthesis of Polymer WP'-1)

Solution A was prepared in advance by dissolving 47.5 g of acrylamide, 2.5 g of sodium 2-acrylamide-2-methyl-propanesulfonate, and 0.2 g of 2-mercaptoethylamine hydrochloride in ion-exchange water (70 mL) and adjusting the solution to pH 8, and solution B was prepared in advance by dissolving 0.25 g of radical generating agent V-50 made by Wako Junyaku in ion-exchange water (40 mL). Solutions A and B were then separately added dropwise to ion-exchange water (150 mL) in a 1000 mL three-necked flask over a period of 3 hours at 60° C. Following completion of the dropwise addition, stirring was conducted for 1 hour at 60° C. The mixture was then maintained at a temperature of 80° C. for 3 hours with stirring and cooled to room temperature. A 10 L quantity of methanol was added dropwise to the reaction solution and reprecipitation was conducted. The solid component obtained was filtered out and dried under reduced pressure at 40° C., yielding 49 g of polymer.

A 20 g quantity of the polymer obtained was dissolved in 50 mL of water and the solution was adjusted to pH 8.0 with 5 mol/L NaOH. A solution prepared in advance by dissolving 0.67 g (2.78 mmol) of disodium 4-(5-mercapto-1-tetrazolyl)-benzoate, 0.68 g (2.78 mmol) of NHS, and 0.53 g (2.78 mmol) of 1-ethyl-3-(3-dimethylaminopropyl)-carbodiimide hydrochloride (WSC) in 40 mL of N,N-dimethyl formamide and stirring the solution for 3 hours at room temperature was added dropwise to the polymer aqueous solution over 20 min. Following completion of the dropwise addition, the mixture was maintained at 40° C. for 3 hours with stirring. Following completion of the reaction, the reaction solution was slowly added dropwise to 3 L of methanol. The solid component obtained was filtered out, dissolved in 50 mL of water, and reprecipitated from 3 L of methanol. The solid component was filtered out. The solid component obtained was dried under reduced pressure at 40° C., yielding 20 g of WP'-1 in the form of a white solid.

(Synthesis of Polymers WP'-2 to 20)

Copolymers of controlled molecular weight were synthesized by the same method as employed for Polymer WP'-1 by varying the quantity of chain-transferring agent added, the types of monomers, and the mass ratio of the monomers added. Ten mol equivalent quantities of a mercapto group-containing nitrogenous aromatic compound, NHS, and WSC were employed to synthesize Polymers WP'-2 to 20.

Example 2

The Preparation and Evaluation of Photographic Emulsions (Preparation of Emulsion Em-A1)

A 1,300 mL quantity of aqueous solution comprising 2.0 g of low-molecular-weight gelatin with a mass average molecular weight of 15,000 and 1.1 g of KBr was maintained at 45° C., adjusted to pH 9, and vigorously stirred.

An aqueous solution containing 1.1 g of $AgNO_3$, 1.1 g of KBr, and an aqueous solution containing 1.0 g of a low-molecular-weight gelatin with a mass average molecular weight of 15,000 were added over 30 sec by the double jet method to form nuclei. A 6.6 g quantity of KBr was added and the mixture was aged by heating to 75° C. Following aging, 20.0 g of alkali-treated gelatin with a mass average molecular weight of 100,000 that had been chemically modified with succinic anhydride were added and the mixture was adjusted to pH 5.2 (internal nuclei have been formed thus far). A 230 mL quantity of aqueous solution comprising 29.3 g of $AgNO_3$ and an aqueous solution comprising 15.8 g of KBr and 1.92 g of KI were added over 40 min by the double jet method. At the time, the silver potential was maintained at −30 mV relative to a saturated calomel electrode. An aqueous solution comprising 64.5 g of $AgNO_3$ and 233 mL of an aqueous solution comprising 42.3 g of KBr and 5.14 g of KI was added over 57 min by the double jet method at an accelerating flow rate yielding a final flow rate of 1.33 times the initial flow rate. During the addition, the silver potential was maintained at −25 mV (the description from the end of the formation of internal nuclei through this point has related to the formation of a first coating phase). Next, an aqueous solution comprising 47.2 g of $AgNO_3$ and a KBr aqueous solution were added over 25 min by the double jet method while maintaining a silver potential of −20 mV.

The temperature was reduced to 40° C., 3.9 g of Compound 1 were added, and 25.6 mL of 0.8 M sodium sulfite aqueous solution were added. An NaOH aqueous solution was then employed to adjust the mixture to pH 9.0 and maintain it for 5 min. The temperature was increased to 55° C., after which the mixture was adjusted to pH 5.5 with $H_2SO_4$. A 1.5 mg quantity of sodium benzenethiosulfonate was added and 16 g of lime-treated gelatin with a calcium concentration of 1 ppm were added. Following completion of the addition, 250 mL of an aqueous solution comprising 94.6 g of $AgNO_3$ and a KBr aqueous solution were added over 30 min while maintaining a silver potential of +75 mV. At the time, potassium ferrocyanide was added in a proportion of $2.0\times10^{-5}$ mol per mol of silver and $K_2IrCI_6$ was added in a proportion of $1.5\times10^{-8}$ mol per mol of silver.

Following washing with water, gelatin was added and the mixture was adjusted to pH 5.6 and pAg 8.8 at 40° C. The temperature was then raised to 56° C.; Compound 3 and sensitizing dyes ExS-5, ExS-6, ExS-7, ExS-8, and ExS-9 were added; and potassium thiocyanate, silver chloride, sodium thiosulfate, hexafluorophenyl diphenylphosphine-selenide, Compound F-11, and Compound 16-a were added to optimize chemical sensitization.

Compound F-2 was added when chemical sensitization had been completed.

The emulsion had tabular grains with an average sphere diameter of 1.30 micrometers, an average diameter as circle of 2.74 micrometers, an average thickness of 0.20 micrometer, and an average aspect ratio of 14.0.

When the grains obtained were observed by transmission electron microscopy while being cooled with liquid nitrogen, ten or more dislocation lines were observed per grain in the peripheral portion of the grain constituting 30 percent of the area projected from the outer perimeter of the grain.

Compound 1

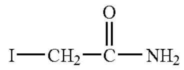

Compound 2

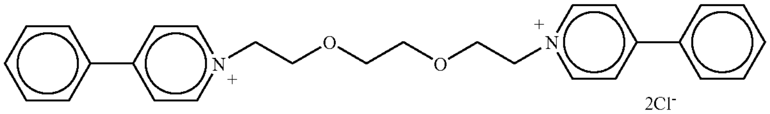

$2Cl^-$

Compound 3

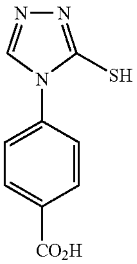

(Preparation of Emulsion Em-B1)

A 1,200 mL quantity of aqueous solution comprising 1.0 g of KBr and 1.0 g of low-molecular-weight gelatin with a molecular weight of 15,000 was vigorously stirred while being maintained at 35° C. A 30 mL quantity of an aqueous solution comprising 1.9 g of $AgNO_3$ and 30 mL of an aqueous solution comprising 1.5 g of KBr and 0.7 g of a low-molecular-weight gelatin having a molecular weight of 15,000 were added over 30 sec by the double jet method to form nuclei. At the time, a constant excess concentration of KBr was maintained. A 5 g quantity of KBr was added and the temperature was increased to 75° C. to age the mixture. Following completion of aging, 35 g of trimellitic-treated gelatin with a trimellitic treatment rate of 98 percent, a molecular weight of 100,000, and a methionine content of 35 micromols per gram was added. The pH was adjusted to 5.5. A 150 mL quantity of aqueous solution comprising 30 g of $AgNO_3$ and an aqueous solution of KBr were added over 16 min by the double jet method. At the time, the silver potential was maintained at −25 mV relative to a saturated calomel electrode. Further, an aqueous solution comprising 110 g of $AgNO_3$ and a KBr aqueous solution were added over 15 min by the double jet method at an accelerating flow rate where the final flow rate was 1.2 times the initial flow rate. At that time, an AgI microparticulate emulsion with a grain size of 0.03 micrometer was simultaneously added at an accelerating flow rate yielding a silver iodide content of 3.8 percent and a silver potential of −25 mV was maintained. A 132 mL quantity of aqueous solution comprising 35 g of $AgNO_3$ and a KBr aqueous solution were added over 7 min by the double jet method. The addition of KBr aqueous solution was adjusted so that the potential at the end of the addition was −20 mV. The temperature was adjusted to 40° C., after which 8 g based on KI of compound 16a, which is recorded below, and 64 mL of 0.8 M of sodium sulfite aqueous solution were added. NaOH aqueous solution was added to raise the pH to 9.0, where it was maintained for 4 min. After iodide ions had been precipitously generated, the pH was returned to 5.5. After adjusting the temperature to 55° C., 1 mg of sodium benzenethiosulfonate was added, and 13 g of lime-treated gelatin with a calcium concentration of 1 ppm were added. Following completion of the additions, 250 mL of an aqueous solution comprising 70 g of $AgNO_3$ and a KBr aqueous solution were added over 20 min while maintaining a potential of 60 mV. At the time, potassium ferrocyanide was added in a proportion of $1.0\times10^{-5}$ mol per mol of silver. After washing with water, 80 g of lime-treated gelatin with a calcium concentration of 1 ppm was added, the pH was adjusted to 5.8, and the pAg was adjusted to 8.7 at 40° C.

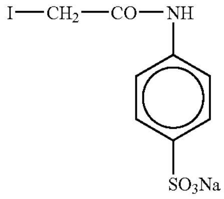

The calcium, magnesium, and strontium contents of the above-described emulsion were measured by ICP emission spectrochemical analysis at 15 ppm, 2 ppm, and 1 ppm, respectively.

The emulsion was heated to 56° C.; Compound 2 and sensitizing dyes ExS-5, ExS-6, ExS-7, ExS-8, and ExS-9 were added; and potassium thiocyanate, auric chloride, sodium thiosulfate, hexafluorophenyl diphenylphosphine selenide, Compound F-11, and Compound 3 were added to optimize chemical sensitization. Compound F-2 was added when chemical sensitization had been completed.

The emulsion had tabular grains with an average sphere diameter of 0.85 micrometers, an average diameter as circle of 1.60 micrometers, an average thickness of 0.14 micrometer, and an average aspect ratio of 11.4.

When emulsions Em-A1 and Em-B1 were observed by transmission electron microscopy while being cooled with liquid nitrogen, ten or more dislocation lines were observed per grain in the peripheral portion of the grain constituting 30 percent of the area projected from the outer perimeter of the grain.

(Preparation of Emulsion Em-K)

A 1.0 g quantity of low-molecular-weight oxidation-treated gelatin having a weight average molecular weight of 15,000 and 1,200 mL of an aqueous solution comprising 0.9 KBr were vigorously stirred while maintaining a temperature of 35° C. A 40 mL quantity of aqueous solution comprising 1.05 g of $AgNO_3$ and 35 mL of an aqueous solution comprising 1.02 g of KBr and 1.2 g of a low-molecular-weight gelatin with a molecular weight of 15,000 were added over 30 sec by the double jet method to form nuclei. Following completion of the addition, 5.4 g of KBr were immediately added and the temperature was increased to 75° C. to age the mixture. Following completion of aging, 35 g of gelatin obtained by chemically modifying with succinic anhydride an alkali-treated gelatin with a mass average molecular weight of 100,000 were added, after which the mixture was adjusted to pH 5.5. A 250 mL quantity of an aqueous solution comprising 36 g of $AgNO_3$ and 282 mL of an aqueous solution comprising 21.2 g of KBr and 2.21 g of KI were added over 25 min by the double jet method while maintaining a silver potential of −10 mV. Subsequently, 650 mL of an aqueous solution comprising 200 g of $AgNO_3$ and 900 mL of an aqueous solution comprising 134.1 g of KBr and 13.9 g of KI were added by the double jet method over 150 min at an accelerating flow rate where the final flow rate was 1.5 times the initial flow rate. At the time, a silver potential of +5 mV was maintained relative to a saturated calomel electrode. After washing with water, gelatin was added to adjust the pH to 5.7, the pAg to 8.8, the silver-converted mass per kilogram of emulsion to 139.0 g, and the gelatin mass to 56 g to obtain a seed emulsion.

A 33 g quantity of lime-treated gelatin with a calcium concentration of 1 ppm and 1,200 mL of an aqueous solution comprising 3.4 g of KBr were vigorously stirred while being maintained at 75° C. An 89 g quantity of the above-described seed emulsion, 0.3 g of denatured silicon[e] oil (product “L7602” made by Japan Unika) were added. $H_2SO_4$ was added to adjust the pH to 5.8. After adding 3 mg of sodium benzenethiosulfonate and 3 mg of thiourea dioxide, 600 mL of an aqueous solution comprising 51.0 g of $AgNO_3$ and 600 mL of an aqueous solution comprising 36.2 g of KBr and 3.49 g of KI were added over 85 min by the double jet method at an accelerating flow rate where the final flow rate was 1.1 times the initial flow rate. At the time, the silver potential was maintained at −35 mV relative to a saturated calomel electrode. A 300 mL quantity of an aqueous solution comprising 44.7 g of $AgNO_3$ and 300 mL of an aqueous solution comprising 30.6 g of KBr and 3.06 g of KI were added over 56 min by the double jet method at an accelerating flow rate where the final flow rate was 1.1 times the initial flow rate. At the time, the silver potential was maintained at −25 mV relative to a saturated calomel electrode. A 180 mL quantity of an aqueous solution comprising 36.9 g of $AgNO_3$ and a KBr aqueous solution was added over 40 min by the double jet method. At the time, the silver potential was maintained at +10 mV relative to a saturated calomel electrode. After adding KBr to adjust the silver potential to −70 mV, a 1.38 g quantity, based on KI mass, of AgI microparticulate emulsion with a grain size of 0.037 micrometer was added. Immediately following completion of the addition, 100 mL of an aqueous solution comprising 17.4 g of $AgNO_3$ were added over 15 min. Following washing with water, gelatin was added to adjust the pH to 5.8 and the pAg to 8.7 at 40° C. After raising the temperature to 60° C., Compound 2 and sensitizing dyes ExS-10 and ExS-13 were added; and potassium thiocyanate, auric chloride, potassium thiosulfate, hexafluorophenyl diphenylphosphine selenide, Compound F-11, and Compound 3 were added to optimize chemical sensitization. Following completion of chemical sensitization, Compound F-3 was added.

The emulsion had tabular grains with an average diameter as shere of 1.90 micrometers, an average diameter as circle of 3.58 micrometers, a variation coefficient in diameter as circle of 20 percent, an average thickness of 0.36 micrometer, and an average aspect ratio of 10.0.

When the grains obtained were observed by transmission electron microscopy while being cooled with liquid nitrogen, about 97 percent of the grains did not exhibit dislocation lines within 80 percent of the area projected from the center of the grain, and ten or more dislocation lines were observed per grain in the peripheral portion of grain constituting 20 percent of the area projected from the outer perimeter of the grain.

(Preparation of Emulsion Em-N)

A 48 g quantity of deionized gelatin and 1,250 mL of an aqueous solution comprising 0.75 g of KBr were vigorously stirred while being maintained at 70° C.

To this solution, 276 mL of an aqueous solution comprising 12.0 g of $AgNO_3$ and a KBr aqueous solution of equimolar concentration were added by the double jet method over 7 min while maintaining a pAg of 7.5. Next, 600 mL of an aqueous solution comprising 108.0 g of $AgNO_3$ and a mixed aqueous solution (2.2 mol percent KI) of equimolar concentrations KBr and KI were added by the double jet method over 28 min 30 sec while maintaining a pAg of 7.30. Five minutes prior to completion of the addition, 24.0 mL of a 0.1 mass percent thiosulfonic acid aqueous solution was added. Desalting and water washing were conducted by the usual deflocculation method, redispersion was conducted, and the pH was adjusted to 6.2 and the pAg to 7.6 at 40° C. After controlling the temperature at 40° C., Compound 2 and sensitizing dyes ExS-10 and ExS-12 were added; potassium thiocyanate, auric chloride, sodium thiosulfate, hexafluorophenyl diphenylphosphine selenide, Compound F-11, and Compound 3 were added; and the temperature was increased to 65° C. to optimize chemical sensitization. Following the completion of chemical sensitization, Compound F-2 was added.

The emulsion had cubic grains with a diameter as shere of 0.19 micrometer and a variation coefficient in diameter as shere of 16 percent.

Emulsions Em-B1, Em-C through J, L, M, and O were prepared by suitably varying the temperature, pH, silver potential, silver nitrate level, KI level, compound quantities, sensitizing dye seeds, seed emulsion quantity, and the like in the preparation of above-described emulsions Em-A1 and Em-K.

Specifics of the emulsions thus prepared are given in Table 2.

TABLE 2

| Emulsion | Average diameter as circle (μm) | Average grain thickness (μm) | Average aspect ratio | Average diameter as sphere (μm) | Average AgI content (mol %) | Iodine content distribution in grains (%) | Average AgI content on the surface (mol %) | Iodine content in the first coating phase (mol %) |
|---|---|---|---|---|---|---|---|---|
| Em-D | 0.46 | 0.17 | 2.7 | 0.38 | 4.0 | 9 | 2.2 | 2.00 |
| Em-C | 0.92 | 0.13 | 7.1 | 0.55 | 4.5 | 8 | 4.2 | 3.00 |
| Em-B1 | 1.60 | 0.14 | 11.4 | 0.85 | 5.0 | 10 | 3.2 | 3.00 |
| Em-A1 | 2.74 | 0.20 | 14.0 | 1.30 | 5.5 | 12 | 2.0 | 8.00 |

TABLE 2-continued

| Emulsion | Average diameter as circle (μm) | Average grain thickness (μm) | Average aspect ratio | Average diameter as sphere (μm) | Average AgI content (mol %) | Iodine content distribution in grains (%) | Average AgI content on the surface (mol %) | Iodine content in the first coating phase (mol %) |
|---|---|---|---|---|---|---|---|---|
| Em-J | 2.10 | 0.15 | 14.3 | 0.99 | 5.5 | 10 | 3.3 | 4.00 |
| Em-H | 0.58 | 0.16 | 3.6 | 0.43 | 3.7 | 11 | 3.8 | 3.30 |
| Em-G | 0.81 | 0.15 | 5.3 | 0.53 | 5.5 | 9 | 3.7 | 4.00 |
| Em-I | 1.75 | 0.13 | 13.0 | 0.85 | 4.0 | 7 | 4.0 | 3.60 |
| Em-F | 1.90 | 0.16 | 12.0 | 0.95 | 4.5 | 10 | 3.8 | 5.00 |
| Em-E | 2.86 | 0.18 | 16.0 | 1.30 | 5.0 | 14 | 1.8 | 8.00 |
| Em-N | — | — | — | 0.19 | 2.0 | 7 | 2.0 | 2.20 |
| Em-M | 0.55 | 0.11 | 5.0 | 0.37 | 4.0 | 13 | 3.7 | 5.00 |
| Em-L | 1.37 | 0.29 | 4.8 | 0.93 | 6.0 | 17 | 5.5 | 6.00 |
| Em-K | 3.58 | 0.36 | 10.0 | 1.90 | 7.0 | 16 | 5.0 | 7.00 |
| Em-O | 2.84 | 0.57 | 5.0 | 1.90 | 8.0 | 14 | 4.5 | 8.00 |

The Grains in Em-N are cubic and the grains in other emulsions are tabular.
In the emulsions except Em-N, it was observed that grains haing 10 or more dislocation lines provides 80% or more of the. total projected area.

(Preparation of Emulsions Em-A2 to A10)

Emulsions Em-A2 to A10 were prepared in the same manner as Emulsion Em-A1 with the exception that 20 mg of a water-soluble polymer was added in the manner indicated in Table 3 below per mol of silver prior to adding compound F-2 at the completion of chemical sensitization.

(Preparation of Emulsions Em-B2 to B10)

Emulsions Em-B2 to B10 were prepared in the same manner as Emulsion Em-B1 with the exception that 20 mg of a water-soluble polymer was added in the manner indicated in Table 3 below per mol of silver prior to adding compound F-2 at the completion of chemical sensitization.

(Preparation of Emulsions Em-A11 and Em-B11)

Emulsion Em-A11 was prepared in the same manner as Emulsion Em-A1 with the exception that 12 mg of water soluble polymer WP-2a were added per mol of silver together with Compound ExA-1 following the completion of chemical sensitization. Emulsion Em-B11 was prepared in the same manner as Emulsion Em-B1 with the exception that 23 mg of water-soluble polymer were added per mol of silver together with Compound ExA-1 at the completion of chemical sensitization.

Example 3

Preparation and Evaluation of Silver Halide Light-Sensitive Materials (Preparation of Sample 101)

Coating liquids having the various compositions recorded below were applied in multiple layers on a triacetic acid cellulose film support having an undercoating to prepare a multilayered color light-sensitive material as Sample 101. Among the materials recorded below, ExC denotes a cyan coupler, ExS denotes a spectral sensitizing dye, UV denotes an ultraviolet absorbing agent, ExM denotes a magenta coupler, HBS denotes a high-boiling-point organic solvent, ExY denotes a yellow coupler, and H denotes a gelatin hardener. The numbers corresponding to the various components indicate coating amounts in units of g/$m^2$. The coating amounts of silver halide are given based on silver. Further, the coating amounts of spectral sensitizing dyes are given in mols per mol of silver halide in the same layer.

| | | |
|---|---|---|
| Layer 1 (First antihalation layer) | | |
| Black colloidal silver | Silver | 0.077 |
| Gelatin | | 0.560 |
| ExM-1 | | 0.048 |
| Cpd-2 | | 0.001 |
| F-8 | | 0.001 |
| HBS-1 | | 0.120 |
| HBS-2 | | 0.015 |
| Layer 2 (Second antihalation layer) | | |
| Black colloidal silver | Silver | 0.088 |
| Gelatin | | 0.830 |
| ExM-1 | | 0.057 |
| ExF-1 | | 0.002 |
| F-8 | | 0.001 |
| HBS-1 | | 0.090 |
| HBS-2 | | 0.010 |
| Layer 3 (Intermediate layer) | | |
| ExC-2 | | 0.010 |
| Cpd-1 | | 0.086 |
| UV-2 | | 0.029 |
| UV-3 | | 0.052 |
| UV-4 | | 0.011 |
| HBS-1 | | 0.100 |
| Gelatin | | 0.580 |
| Layer 4 (Low-sensitivity red-sensitive emulsion layer) | | |
| Em-D | Silver | 0.67 |
| Em-C | Silver | 0.37 |
| ExC-1 | | 0.282 |
| ExC-2 | | 0.012 |
| ExC-3 | | 0.102 |
| ExC-4 | | 0.148 |
| ExC-5 | | 0.005 |
| ExC-6 | | 0.008 |
| ExC-8 | | 0.071 |
| ExC-9 | | 0.010 |
| ExS-1 | | $1.6 \times 10^{-3}$ |
| ExS-2 | | $5.0 \times 10^{-4}$ |
| ExS-3 | | $2.6 \times 10^{-5}$ |
| UV-2 | | 0.036 |
| UV-3 | | 0.067 |
| UV-4 | | 0.014 |
| Cpd-2 | | 0.010 |
| Cpd-4 | | 0.012 |
| HBS-1 | | 0.240 |
| HBS-5 | | 0.010 |
| Gelatin | | 1.630 |

-continued

| | | |
|---|---|---|
| Layer 5 (Intermediate-sensitivity red-sensitive emulsion layer | | |
| Em-B1 | Silver | 0.73 |
| ExC-1 | | 0.111 |
| ExC-2 | | 0.039 |
| ExC-3 | | 0.018 |
| ExC-4 | | 0.074 |
| ExC-5 | | 0.019 |
| ExC-6 | | 0.024 |
| ExC-8 | | 0.010 |
| ExC-9 | | 0.005 |
| ExS-1 | | $6.9 \times 10^{-4}$ |
| ExS-2 | | $2.5 \times 10^{-4}$ |
| ExS-3 | | $9.4 \times 10^{-6}$ |
| Cpd-2 | | 0.020 |
| Cpd-4 | | 0.021 |
| HBS-1 | | 0.129 |
| Gelatin | | 0.900 |
| Layer 6 (High-sensitivity red-sensitive emulsion layer) | | |
| Em-A1 | Silver | 1.37 |
| ExC-1 | | 0.122 |
| ExC-6 | | 0.032 |
| ExC-8 | | 0.110 |
| ExC-9 | | 0.005 |
| ExC-10 | | 0.159 |
| ExS-1 | | $4.7 \times 10^{-4}$ |
| ExS-2 | | $2.5 \times 10^{-4}$ |
| ExS-3 | | $9.9 \times 10^{-6}$ |
| Cpd-2 | | 0.068 |
| Cpd-4 | | 0.015 |
| HBS-1 | | 0.440 |
| Gelatin | | 1.610 |
| Layer 7 (Intermediate layer) | | |
| Cpd-1 | | 0.081 |
| Cpd-6 | | 0.002 |
| Solid dispersion dye ExF-4 | | 0.015 |
| HBS-1 | | 0.049 |
| Polyethyl acrylate latex | | 0.088 |
| Gelatin | | 0.759 |
| Layer 8 (Layer imparting multilayer effect to red-sensitive layer) | | |
| Em-J | Silver | 0.46 |
| Cpd-4 | | 0.010 |
| ExM-2 | | 0.082 |
| ExM-3 | | 0.006 |
| ExM-4 | | 0.026 |
| ExY-1 | | 0.010 |
| ExY-4 | | 0.040 |
| ExC-7 | | 0.007 |
| ExS-4 | | $7.8 \times 10^{-4}$ |
| ExS-5 | | $3.5 \times 10^{-4}$ |
| HBS-1 | | 0.203 |
| HBS-3 | | 0.003 |
| HBS-5 | | 0.010 |
| Gelatin | | 0.570 |
| Layer 9 (Low-sensitivity green-sensitive emulsion layer) | | |
| Em-H | Silver | 0.20 |
| Em-G | Silver | 0.17 |
| Em-I | Silver | 0.30 |
| ExM-2 | | 0.388 |
| ExM-3 | | 0.040 |
| ExY-1 | | 0.003 |
| ExY-3 | | 0.002 |
| ExC-7 | | 0.009 |
| ExS-5 | | $3.4 \times 10^{-4}$ |
| ExS-6 | | $7.4 \times 10^{-5}$ |
| ExS-7 | | $1.1 \times 10^{-4}$ |
| ExS-8 | | $3.5 \times 10^{-4}$ |
| ExS-9 | | $1.0 \times 10^{-4}$ |
| HBS-1 | | 0.337 |
| HBS-3 | | 0.018 |
| HBS-4 | | 0.260 |
| HBS-5 | | 0.110 |
| Cpd-5 | | 0.010 |
| Gelatin | | 0.470 |

-continued

| | | |
|---|---|---|
| Layer 10 (Intermediate-sensitivity green-sensitive emulsion layer) | | |
| Em-F | Silver | 0.40 |
| ExM-2 | | 0.084 |
| ExM-3 | | 0.012 |
| ExM-4 | | 0.005 |
| ExY-3 | | 0.002 |
| ExC-6 | | 0.003 |
| ExC-7 | | 0.007 |
| ExC-8 | | 0.008 |
| ExS-7 | | $1.0 \times 10^{-4}$ |
| ExS-8 | | $6.1 \times 10^{-4}$ |
| ExS-9 | | $1.3 \times 10^{-4}$ |
| HBS-1 | | 0.096 |
| HBS-3 | | 0.002 |
| HBS-5 | | 0.002 |
| Cpd-5 | | 0.004 |
| Gelatin | | 0.382 |
| Layer 11 (High-sensitivity green-sensitive emulsion layers) | | |
| Em-E | Silver | 0.90 |
| ExC-6 | | 0.002 |
| ExC-8 | | 0.010 |
| ExM-1 | | 0.014 |
| ExM-2 | | 0.023 |
| ExM-3 | | 0.023 |
| ExM-4 | | 0.005 |
| ExM-5 | | 0.040 |
| ExY-3 | | 0.003 |
| ExS-7 | | $7.4 \times 10^{-4}$ |
| ExS-8 | | $6.9 \times 10^{-4}$ |
| ExS-9 | | $1.9 \times 10^{-4}$ |
| Cpd-3 | | 0.004 |
| Cpd-4 | | 0.007 |
| Cpd-5 | | 0.010 |
| HBS-1 | | 0.259 |
| HBS-5 | | 0.020 |
| Polyethyl acrylate latex | | 0.099 |
| Gelatin | | 0.781 |
| Layer 12 (Yellow filter layer) | | |
| Cpd-1 | | 0.088 |
| Solid dispersion dye ExF-2 | | 0.051 |
| Solid dispersion dye ExF-8 | | 0.010 |
| HBS-1 | | 0.049 |
| Gelatin | | 0.593 |
| Layer 13 (Low-sensitivity blue-sensitive emulsion layer) | | |
| Em-N | Silver | 0.18 |
| Em-M | Silver | 0.04 |
| Em-L | Silver | 0.60 |
| ExC-1 | | 0.024 |
| ExC-7 | | 0.011 |
| ExY-1 | | 0.002 |
| ExY-2 | | 0.956 |
| ExY-4 | | 0.091 |
| ExS-10 | | $8.5 \times 10^{-5}$ |
| ExS-11 | | $7.4 \times 10^{-4}$ |
| ExS-12 | | $9.5 \times 10^{-5}$ |
| ExS-13 | | $3.0 \times 10^{-4}$ |
| Cpd-2 | | 0.037 |
| Cpd-3 | | 0.004 |
| HBS-1 | | 0.372 |
| HBS-5 | | 0.047 |
| Gelatin | | 2.201 |
| Layer 14 (High-sensitivity blue-sensitive emulsion layer) | | |
| Em-K | Silver | 1.32 |
| ExY-2 | | 0.235 |
| ExY-4 | | 0.018 |
| ExS-10 | | $1.0 \times 10^{-4}$ |
| ExS-13 | | $1.5 \times 10^{-4}$ |
| Cpd-2 | | 0.075 |
| Cpd-3 | | 0.001 |
| HBS-1 | | 0.087 |
| Gelatin | | 1.156 |

-continued

| Layer 15 (First protective layer) | | |
|---|---|---|
| 0.07 micrometer silver iodobromide emulsion | Silver | 0.28 |
| UV-1 | | 0.358 |
| UV-2 | | 0.179 |
| UV-3 | | 0.254 |
| UV-4 | | 0.025 |
| F-11 | | 0.0081 |
| S-1 | | 0.078 |
| ExF-5 | | 0.0024 |
| ExF-6 | | 0.0012 |
| ExF-7 | | 0.0010 |
| HBS-1 | | 0.175 |
| HBS-4 | | 0.050 |
| Gelatin | | 2.231 |
| Layer 16 (Second protective layer) | | |
| H-1 | | 0.400 |
| B-1 (diameter 1.7 micrometers) | | 0.050 |
| B-2 (diameter 1.7 micrometers) | | 0.150 |
| B-3 | | 0.050 |
| S-1 | | 0.200 |
| Gelatin | | 0.711 |

W-1 to W-6, B-4 to B-6, F-1 to F-20, lead salt, platinum salt, iridium salt, and rhodium salt were suitably added to the individual layers to improve storage stability, treatment properties, pressure durability, antifungal and antibacterial properties, antistatic properties, and coating properties.

Above-mentioned solid dispersion dye ExF-2 was obtained by roughly dispersing a slurry having the composition recorded below by stirring with a dissolver followed by dispersion with an LMK-4 agitator mill at a peripheral speed of 10 m/s, a discharge rate of 0.6 kg/min, and a 0.3 mm diameter zirconia bead charging ratio of 80 percent until the relative absorbance of the dispersion reached 0.29. The mean particle size of the dye microparticles was 0.29 micrometers.

Solid dispersion dyes ExF-4 and ExF-8 were similarly obtained. The mean particle sizes of the dye microparticles were 0.28 and 0.49 micrometer, respectively.

| | |
|---|---|
| Wet cake of ExF-2 (containing 17.6 mass percent of water) | 2.800 kg |
| Sodium octylphenyldiethoxymethane sulfonate (31 mass percent aqueous solution) | 0.376 kg |
| F-15 (7 percent aqueous solution) | 0.011 kg |
| Water | 4.020 kg |
| Total (Adjusted to pH = 7.2 with NaOH) | 7.210 kg |

ExS-1

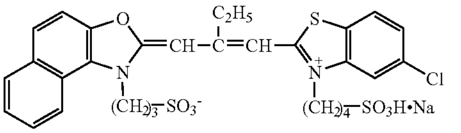

ExS-2

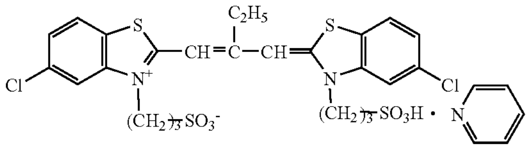

ExS-3

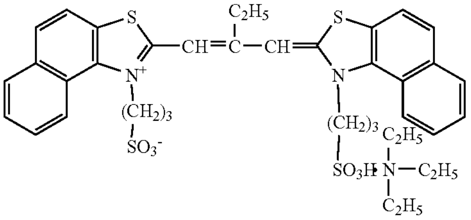

ExS-4

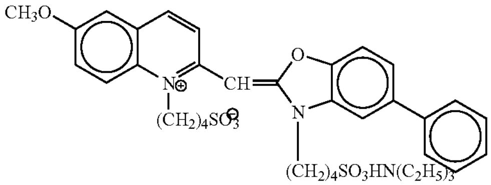

ExS-5

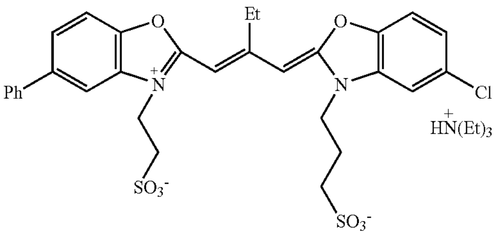

ExS-6

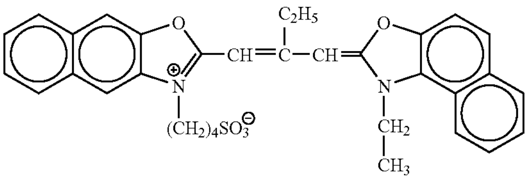

ExS-7

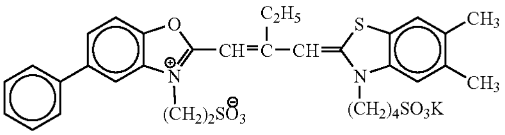

ExS-8

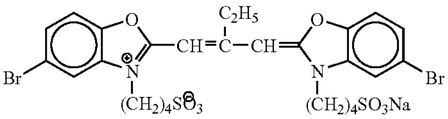

-continued
ExS-9
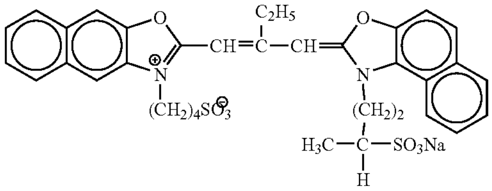
ExS-10
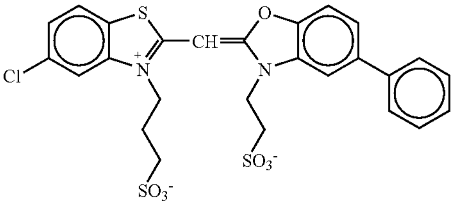
ExS-11
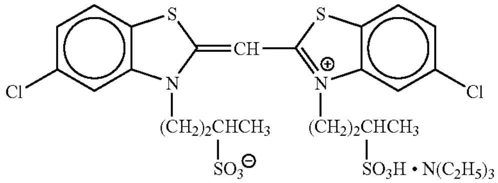
ExS-12
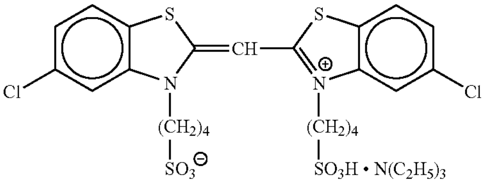
ExS-13
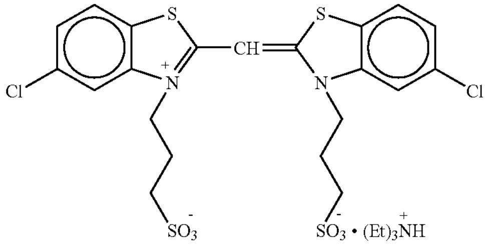
ExC-1
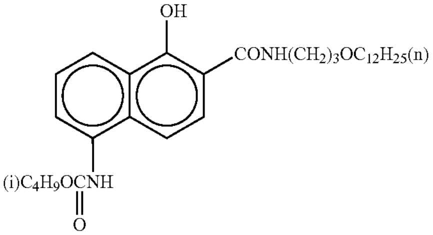
ExC-2
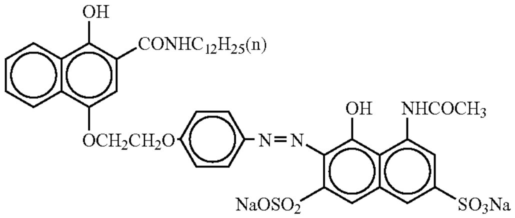
ExC-3
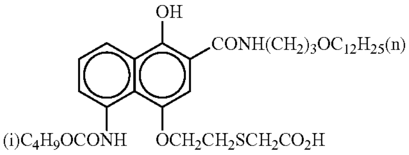
ExC-4
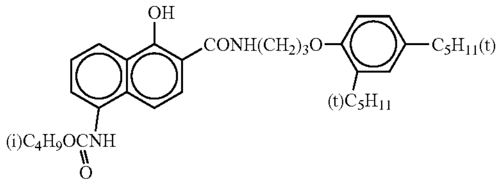
ExC-5
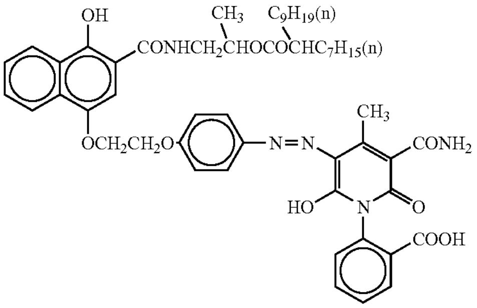
ExC-6
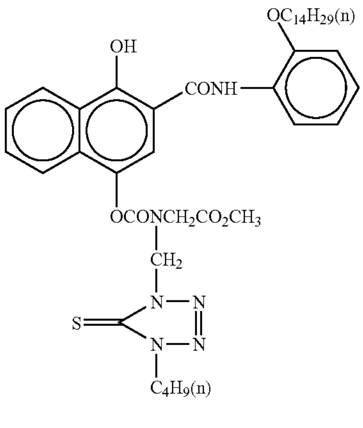
ExC-7
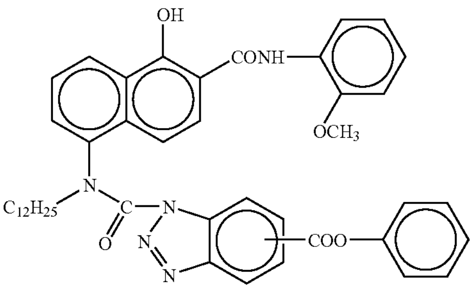

-continued
ExC-8
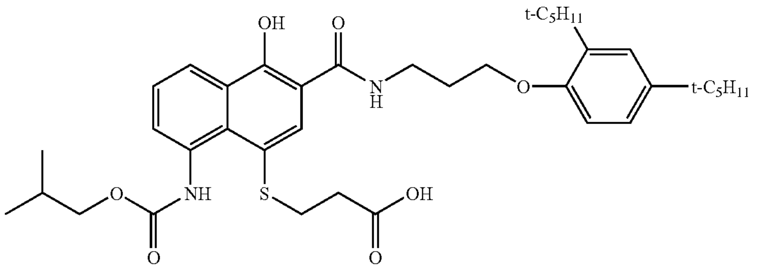
ExC-9
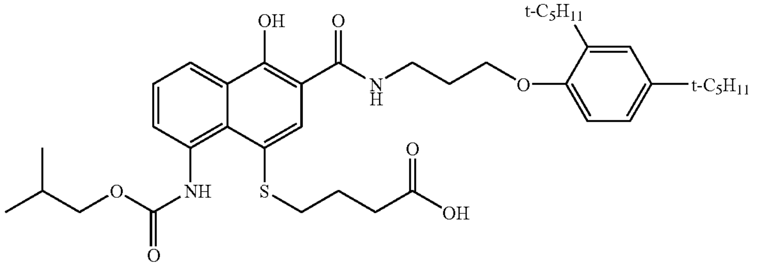
ExC-10
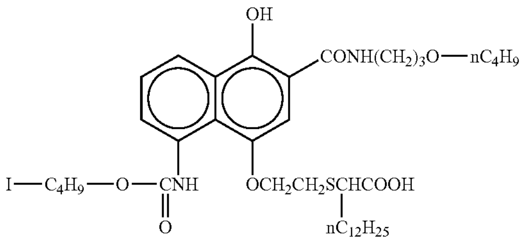
ExM-1
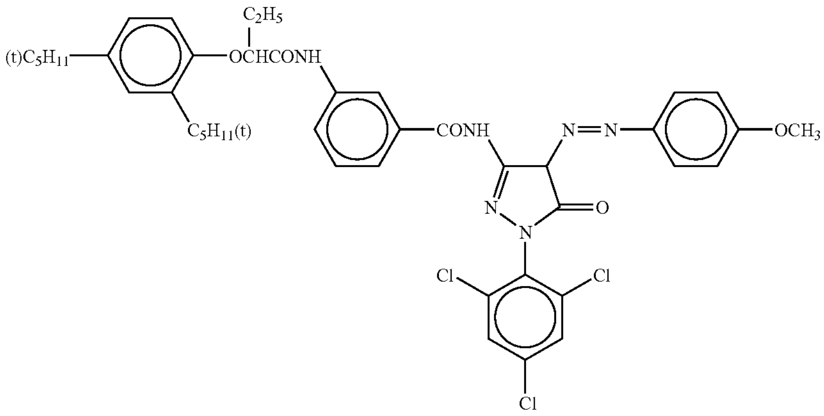
ExM-2
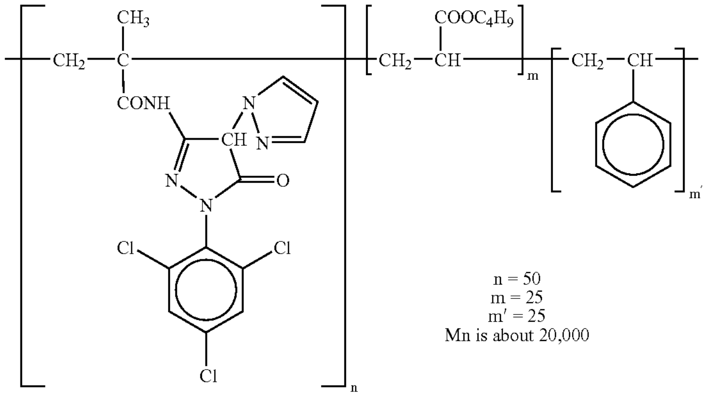
n = 50
m = 25
m′ = 25
Mn is about 20,000

-continued
ExM-3
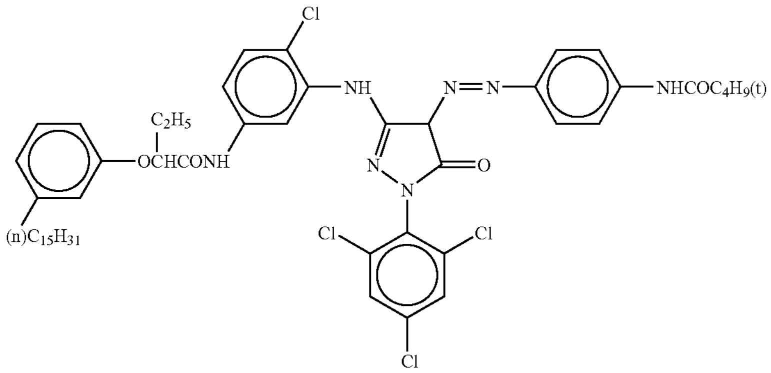
ExM-4
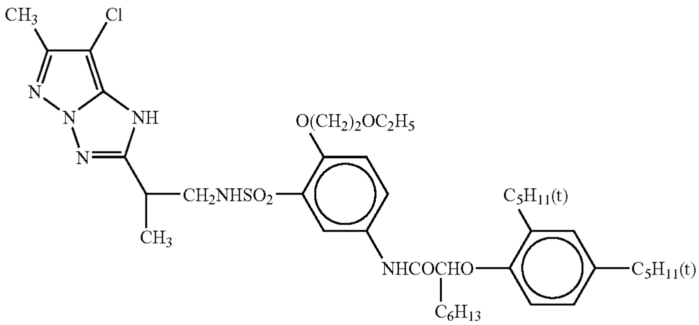
ExM-5
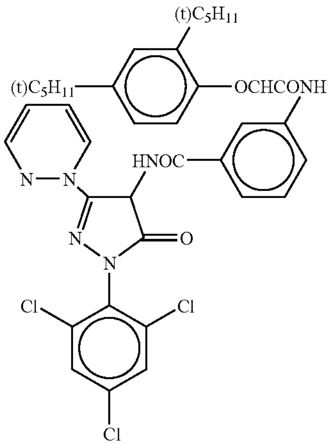
ExY-1
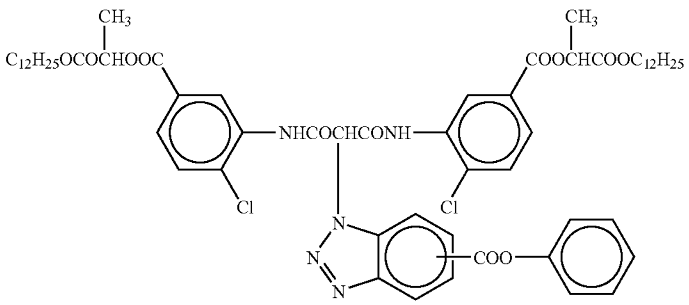

-continued
ExY-2
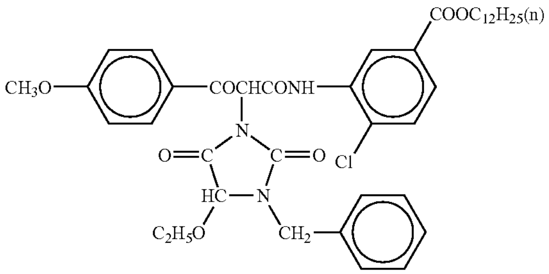
ExY-3
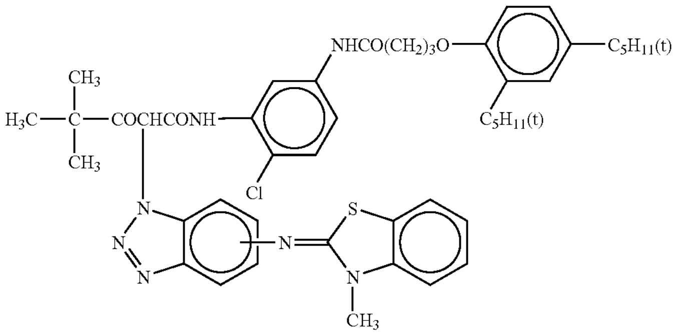
ExY-4
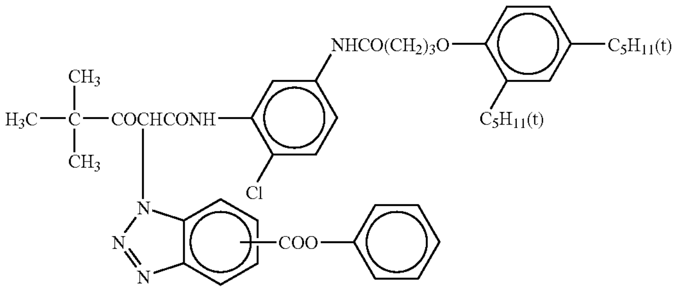
Cpd-1
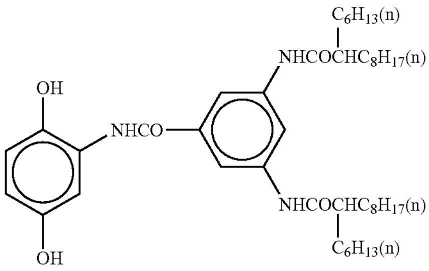
Cpd-2
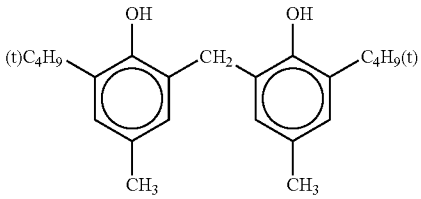
Cpd-3
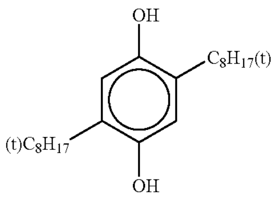
Cpd-4
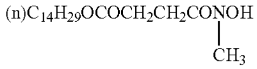
Cpd-5
Cpd-6

-continued
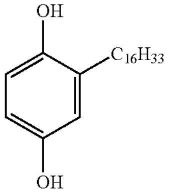
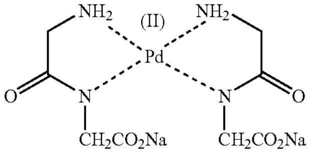
UV-1
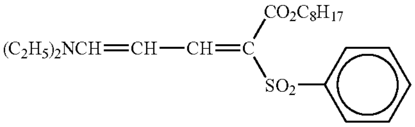
UV-2
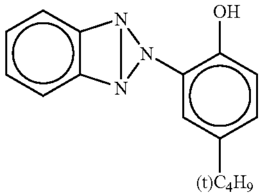
UV-3
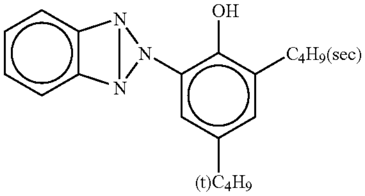
UV-4
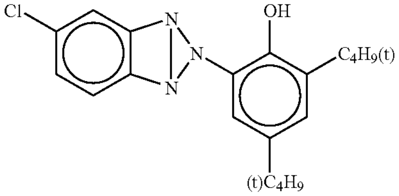
B-1
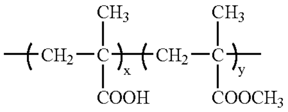
x/y=10/90 (Weight ratio)
Mn is about 35,000
B-2
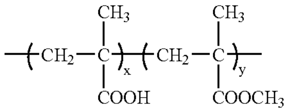
x/y=40/60 (Weight ratio)
Mn is about 20,000
B-3
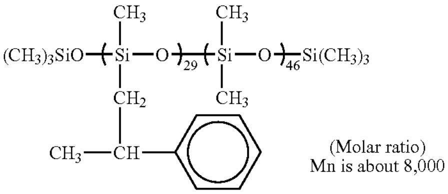
(Molar ratio)
Mn is about 8,000
B-4
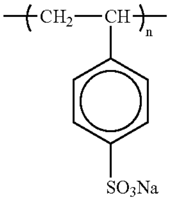
Mn is about 750,000
B-5
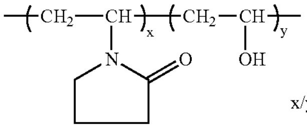
x/y=70/30 (Weight ratio)
Mn is about 17,000
B-6
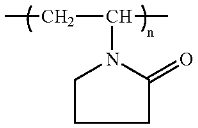
Mn is about 10,000
HSB-1
Tricresyl phosphate
HSB-2
Di-n-butyl phthalate
HSB-3
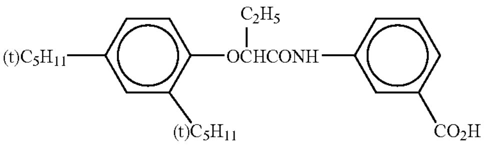
HSB-4
Tri(2-ethylhexyl)phosphate
HSB-5
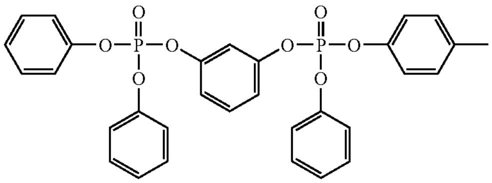
S-1
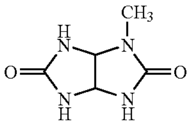

-continued
H-1
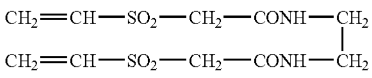
F-1
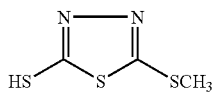
F-2
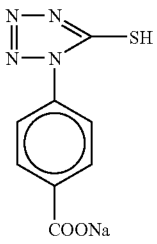
F-3
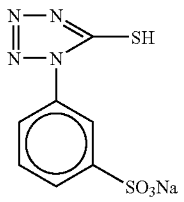
F-4
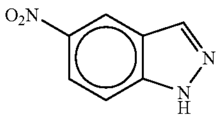
F-5
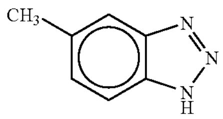
F-6
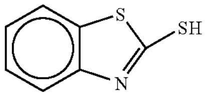
F-7
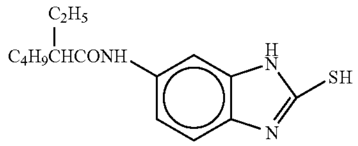
F-8
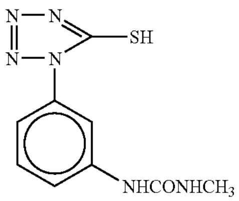
F-9
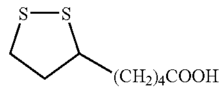
F-10
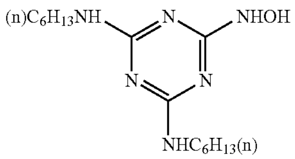
F-11
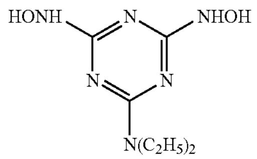
F-12
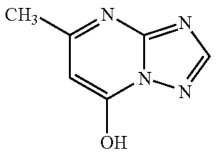
F-13
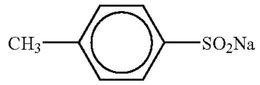
F-14
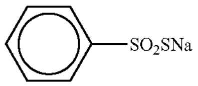
F-15
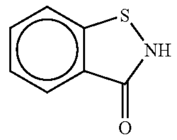
F-16
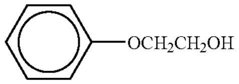
F-17
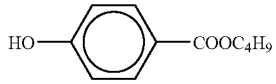

-continued
F-18
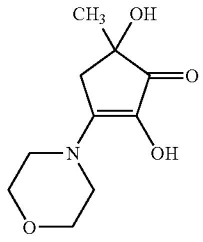
F-19
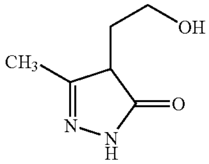
F-20
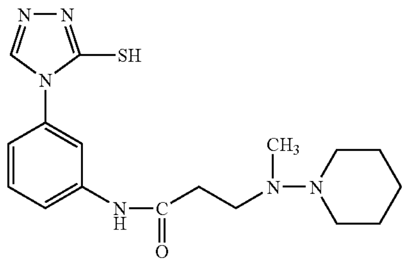
W-1
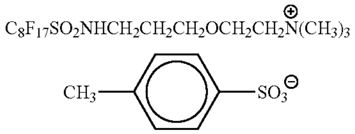
W-2
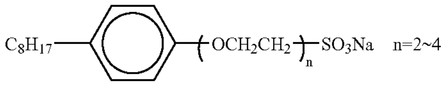
W-3
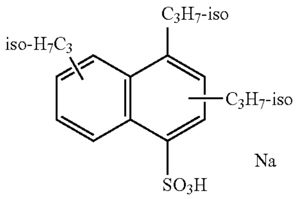
W-4
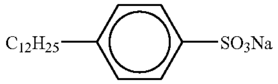
W-5
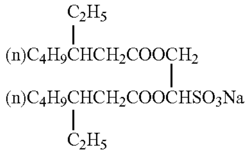
W-6
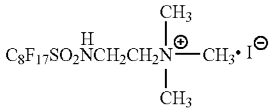
ExF-1
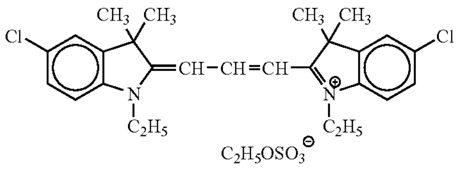
ExF-2
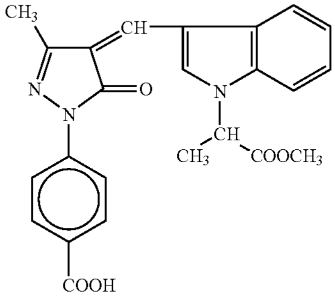
ExF-4
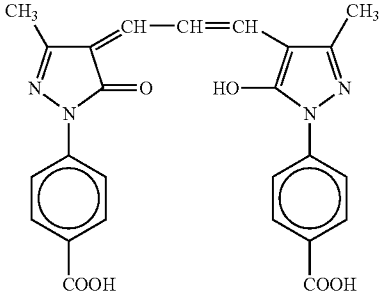

-continued

ExF-5

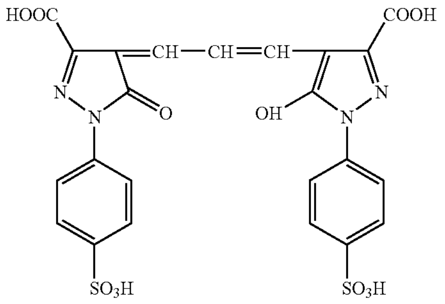

ExF-6

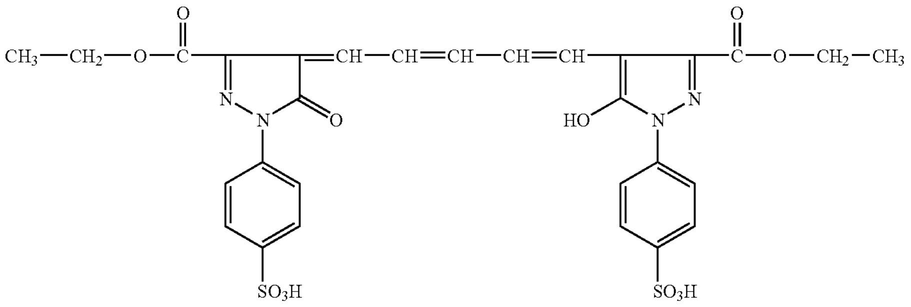

ExF-7

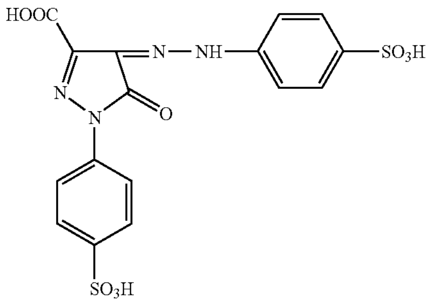

ExF-8

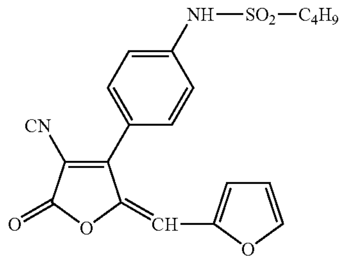

(Preparation of Samples 102 to 110)

Samples 102 to 110 were prepared in the same manner as Sample 101 with the exception that Emulsion Em-A1 in layer 6 of Sample 101 was replaced with Em-A2 to A10 and Emulsion Em-B1 in layer 5 was replaced with Em-B2 to B10 with equal silver quantities as indicated in Table 3 below.

(Preparation of Samples 111 to 120)

The various emulsions of layer 6 in Samples 101 to 110 were dissolved at 40° C., and after 8 hours had elapsed, Samples 111 to 120 were prepared under the same coating conditions as Samples 101-110.

(Preparation of Sample 501)

Sample 501 was prepared by changing the quantities of the components listed below as follows in the formula of Sample 101:

| | | |
|---|---|---|
| Layer 5 | Ex-C2 | 0.040 |
| | ExS-1 | $7.1 \times 10^{-4}$ |
| | ExS-2 | $2.6 \times 10^{-4}$ |
| | ExS-3 | $9.5 \times 10^{-6}$ |
| | Cpd-4 | 0.015 |

-continued

| | | |
|---|---|---|
| Layer 6 | ExS-1 | $4.8 \times 10^{-4}$ |
| | ExS-2 | $2.6 \times 10^{-4}$ |
| | ExS-3 | $1.0 \times 10^{-5}$ |
| | Cpd-4 | 0.011 |
| Layer 11 | ExA-4 (additional) | $4.0 \times 10^{-6}$ |
| Layer 14 | ExA-4 (additional) | $6.0 \times 10^{-6}$ |

(Preparation of Sample 502)

Sample 501 was prepared in the same manner as Sample 502 with the exception that Emulsion Em-A1 in layer 6 of Sample 501 was replaced with Em-A11 and Emulsion Em-B1 with Em-B11 with equal silver quantities.

(Preparation of Samples 511 and 512)

The various emulsions of layers 5 and 6 in Samples 501 and 502 were dissolved at 40° C., and after 8 hours had elapsed, Samples 511 and 512 were prepared under the same coating conditions as Samples 501 and 502.

(Measurement of Specific Photographic Sensitivity)

The international standard of sensitivity, ISO, is generally employed for the sensitivity of photographic light-sensitive materials. In ISO sensitivity, a light-sensitive material is developed on the fifth day following exposure and the development is conducted as specified by the individual company. In the present invention, the time between exposure and development was shortened and a fixed development process was conducted.

The method of determining specific photographic sensitivity was in accordance with JIS K 7614-1981. The difference lay in that development was completed at least 30 minutes after, and not more than six hours after, sensitometric exposure, and in that development processing was conducted based on the Fujicolor Processing Formula CN-16 recorded below. The remainder was essentially identical to the measurement method described in JIS.

The test conditions, exposure, density measurement, and method of determining specific photographic sensitivity described in JP-A-63-226650 were employed in addition to the developing process indicated below.

Developing was conducted based on the description below using a Fuji Photo Film Co. Automatic Developer FP-360B. Modifications were made so that the overflow solution from the bleaching bath did not flow into the rear bath, but was entirely discharged into a waste solution tank. The FP-360B was equipped with the evaporation compensating device described in Journal of Technical Disclosure No. 94-4992 (published by JIII).

The processing steps and processing solution composition are given below.

(Processing Steps)

| Step | Processing time | Processing temp. | Replenishment level* | Tank capacity |
|---|---|---|---|---|
| Color development | 3 min 5 sec | 37.8° C. | 20 mL | 11.5 L |
| Bleaching | 50 sec | 38.0° C. | 5 mL | 5 L |
| Fixing (1) | 50 sec | 38.0° C. | — | 5 L |
| Fixing (2) | 50 sec | 38.0° C. | 8 mL | 5 L |
| Water washing | 30 sec | 38.0° C. | 17 mL | 3 L |
| Stabilizing (1) | 20 sec | 38.0° C. | — | 3 L |
| Stabilizing (2) | 20 sec | 38.0° C. | 15 mL | 3 L |
| Drying | 1 min 30 sec | 60.0° C. | | |

*Replenishment level: Amount of replenishment per 1.1 m of light-sensitive material 35 mm in width (equivalent to one roll of 24 exposure film).

The stabilizing solution and fixing solution flowed back from (2) to (1), and the overflow solution of the water used in washing was all directed into the fixing bath (2). The amounts of developer, bleaching solution and fixer carried over to the bleaching step, fixing step and washing step were 2.5 mL, 2.0 mL and 2.0 mL, respectively, per 1.1 m of light-sensitive material having a width of 35 mm. Each crossover time was 6 seconds, and this time was included in the processing time of each preceding step.

The areas of the openings in the processor were 100 $cm^2$ for the color developer, 120 $cm^2$ for the bleaching solution, and about 100 $cm^2$ for the other processing solutions.

The compositions of the processing solutions are given below:

| | Tank solution (g) | Replenisher (g) |
|---|---|---|
| (Color developer) | | |
| Diethylenetriamine-pentaacetic acid | 3.0 | 3.0 |
| Disodium cathecol-3,5-Disulfonate | 0.3 | 0.3 |

-continued

| | Tank solution (g) | Replenisher (g) |
|---|---|---|
| Sodium sulfite | 3.9 | 5.3 |
| Potassium carbonate | 39.0 | 39.0 |
| Disodium-N,N-bis-(2-sulfonatoethyl)-hydroxylamine | 1.5 | 2.0 |
| Potassium bromide | 1.3 | 0.3 |
| Potassium iodide | 1.3 mg | — |
| 4-Hydroxy-6-methyl-1,3,3a,7-tetrazaindene | 0.05 | — |
| Hydroxylamine sulfate | 2.4 | 3.3 |
| 2-Methyl-4-[N-ethyl-N-(β-hydroxyethyl)amino]-aniline sulfate | 4.5 | 6.5 |
| Water to make | 1.0 L | 1.0 L |
| pH (adjusted with potassium hydroxide and sulfuric acid) | 10.05 | 10.18 |
| (Bleaching solution) | | |
| Ferric ammonium 1,3-diaminopropanetetra-acetate monohydrate | 113 | 170 |
| Ammonium bromide | 70 | 105 |
| Ammonium nitrate | 14 | 21 |
| Succinic acid | 34 | 51 |
| Maleic acid | 28 | 42 |
| Water to make | 1.0 L | 1.0 L |
| pH (adjusted with aqueous ammonia) | 4.6 | 4.0 |

(Fixing (1) tank solution)

5:95 (volume ratio) mixture of the above bleaching tank solution and the following fixing tank solution (pH 6.8)

| (Fixing (2)) | Tank Solution (g) | Replenisher (g) |
|---|---|---|
| Aqueous solution of ammonium thiosulfate (750 g/L) | 240 mL | 720 mL |
| Imidazole | 7 | 21 |
| Ammonium methanethiosulfonate | 5 | 15 |
| Ammonium methane sulfinate | 10 | 30 |
| Ethylenediaminetetraacetic acid | 13 | 39 |
| Water to make | 1.0 L | 1.0 L |
| pH (adjusted with aqueous ammonia and acetic acid) | 7.4 | 7.45 |

(Washing with water)

Tap water was run onto a mixed-bed column packed with an H-type strongly acidic cation exchange resin (Amberlite IR-120B, Rohm & Haas Co.) and an OH-type strongly basic anion exchange resin (Amberlite IR-400) to achieve calcium and magnesium concentrations of 3 mg/L or less. Subsequently, 20 mg/L of sodium dichloroisocyanurate and 150 mg/L of sodium sulfate were added. The pH of the solution was within a range of 6.5-7.5.

(Stabilizing Solution)

This solution was used in common for both the tank solution and the replenisher.

| | (Unit: g) |
|---|---|
| Sodium p-toluene sulfinate | 0.03 |
| Polyoxyethylene p-monononylphenyl ether (average polymerization degree: 10) | 0.2 |
| 1,2-Benzoisothiazolin-3-one sodium | 0.10 |

-continued

| | (Unit: g) |
|---|---|
| Disodium ethylenediamine tetraacetate | 0.05 |
| 1,2,4-Triazole | 1.3 |
| 1,4-Bis(1,2,4-triazol-1-ylmethyl)-piperazine | 0.75 |
| Water to make | 1.0 L |
| pH | 8.5 |

Further, the relative sensitivity of the individual color-sensitive layers was calculated by the above-described specific photographic sensitivity measurement methods.

Fogging was defined as the minimum value of yellow density, magenta density, and cyan density (DYmin, DMmin, DCmin). The sensitivity of each color-sensitive layer was defined as the log of the reciprocal of the exposure level producing a density 0.15 higher than DYmin, DMmin, and DCmin. The sensitivity of the red-sensitive layer of each sample was given as a value relative to Samples 101 and 501.

The same process was employed as when measuring specific photographic sensitivity and the conventional root mean square (RMS) method was employed to measure granularity. In this process, exposure was 0.005 Lux·sec, and measurement was conducted by RMS with an aperture 48 micrometers in diameter.

(Evaluation of Pressure Durability)

To evaluate the pressure durability of the samples, the following test was conducted. The samples were adjusted to a temperature of 25° C. at a humidity of 55 percent. After scratching the emulsion surface in a certain direction with a fine needle of 0.05 mm to which was applied a load of 4 g, the above-described methods were employed for exposure, development, and density measurement. The difference in density (ΔD) between scratched portions and unscratched portions was calculated at an exposure level yielding a density 0.25 higher than the DYmin, DMmin, and DCmin calculated by the above-described exposure, development, and density measurement of an unscratched sample. The smaller the ΔD, the better the pressure durability. The sum of the ΔDs of the individual color-sensitive layers was used as an evaluation value indicating pressure durability.

(Evaluation of Deterioration in Photographic Capacity due to Grain Aggregation During Coating)

The individual samples were placed for 14 hours under conditions of a temperature of 40° C. and a relative humidity of 70 percent, exposed for 1/100th sec through a continuous wedge identical to that described above, and color developed. The density of the processed samples was measured with a red filter, and the sensitivity was denoted as the relative value (the sensitivity of Samples 101 and 501 was adopted as 100) of the log of the reciprocal of the exposure level denoted in Lux sec yielding a cyan density 0.15 greater than the fogging density. RMS granularity was measured as the density 0.15 greater than the fogging density of each sample.

The relative value when the RMS granularity of Samples 101 and 501 was made 100 was adopted as the granularity evaluation value. The smaller the number, the better the granularity.

The performance of each of the samples is given below.

TABLE 3

| Sample No. | Emulsion in Layer 6 | Emulsion in Layer 5 | Polymer | Sensitivity | Presure durability | Granularity (RMS × 1000) | Note |
|---|---|---|---|---|---|---|---|
| 101 | Em-A1 | Em-B | — | 100 | 0.1 | 100 | Comparative |
| 102 | Em-A2 | Em-B2 | WP-1a | 100 | 0.06 | 100 | Invention |
| 103 | Em-A3 | Em-B3 | WP-1b | 100 | 0.08 | 102 | Invention |
| 104 | Em-A4 | Em-B4 | WP-1c | 100 | 0.08 | 104 | Invention |
| 105 | Em-A5 | Em-B5 | WP-1e | 100 | 0.09 | 104 | Invention |
| 106 | Em-A6 | Em-B6 | WP-2a | 100 | 0.05 | 100 | Invention |
| 107 | Em-A7 | Em-B7 | WP-2b | 100 | 0.07 | 102 | Invention |
| 108 | Em-A8 | Em-B8 | WP-3c | 100 | 0.05 | 100 | Invention |
| 109 | Em-A9 | Em-B9 | WP-3d | 100 | 0.07 | 102 | Invention |
| 110 | Em-A10 | Em-B10 | polyacrylamide (Mn: 100,000) | 100 | 0.1 | 100 | Comparative |
| 111 | Em-A1 | Em-B1 | — | 91 | — | 125 | Comatrative |
| 112 | Em-A2 | Em-B2 | WP-1a | 98 | — | 104 | Invention |
| 113 | Em-A3 | Em-B3 | WP-1b | 95 | — | 110 | Invention |
| 114 | Em-A4 | Em-B4 | WP-1c | 93 | — | 112 | Invention |
| 115 | Em-A5 | Em-B5 | WP-1e | 93 | — | 115 | Invention |
| 116 | Em-A6 | Em-B6 | WP-2a | 100 | — | 102 | Invention |
| 117 | Em-A7 | Em-B7 | WP-2b | 97 | — | 108 | Invention |
| 118 | Em-A8 | Em-B8 | WP-3c | 100 | — | 100 | Invention |
| 119 | Em-A9 | Em-B9 | WP-3d | 97 | — | 105 | Invention |
| 120 | Em-A10 | Em-B10 | polyacrylamide (Mn: 100,000) | 91 | — | 126 | Comparative |

Sample Nos. 111-120: after dissolution and passage of time

TABLE 4

| Sample No. | Emulsion in Layer 6 | Emulsion in Layer 5 | Polymer | Sensitivity | Pressure durability | Granularity (RMS × 1000) | Note |
|---|---|---|---|---|---|---|---|
| 501 | Em-A1 | Em-B1 | — | 100 | 0.12 | 100 | Comparative |
| 502 | Em-A2 | Em-B2 | WP-2a | 100 | 0.05 | 100 | Invention |
| 511 | Em-A1 | Em-B1 | — | 91 | — | 127 | After |
| 512 | Em-A2 | Em-B2 | WP-2a | 100 | — | 102 | dissolution and passage of time |

The samples obtained by addition of the polymers of the present invention were found to afford an increase in pressure durability without a decrease in sensitivity. In particular, the samples of the present invention were found to exhibit improvement in the deterioration of photographic performance such as decreased sensitivity and deterioration in granularity during coating after time had elapsed following dissolution of the emulsions, and to exhibit good suitability to manufacturing. Even in the presence of other adsorptive additives, the polymers of the present invention tended not to desorb from silver halide grains and were presumed to improve pressure durability by enhancing the properties of the protective colloids. Further, in coating after time had elapsed following dissolution of the emulsions, the higher the number average molecular weight of the water-soluble synthetic polymer of the present invention, the greater the improvement in the deterioration of photographic performance such as reduced sensitivity and deterioration of granularity. Further, in coating after time had elapsed following dissolution of the emulsions, improvement in the deterioration of photographic performance such as reduced sensitivity and deterioration of granularity was found to occur with the introduction of nitrogenous hetero rings comprising mercapto groups as a partial structure of the polymer.

Example 4

The Preparation and Evaluation of Silver Halide Photographic Light-Sensitive Materials (Preparation of Sample 701)

In Sample 101, following water washing of emulsions Em-A1 and Em-B1, after the addition of Compound 2 and before the addition of the sensitizing dye, 20 mg per mol of silver of polymer WP-3a of the present invention were added and Sample 701 was prepared in the same manner as a multilayered color light-sensitive material.

(Preparation of Sample 702)

In Sample 101, prior to the addition of the potassium ferrocyanide in the grain-forming step of emulsions Em-A1 and Em-B1, 20 mg per mol of silver of polymer WP-3a of the present invention were added and Sample 702 was prepared in the same manner as a multilayered color light-sensitive material.

(Preparation of Sample 703)

In Sample 101, during the preparation of the coating solutions of layers 5 and 6, 20 mg per mol of silver of polymer WP-3a of the present invention were added and Sample 703 was prepared in the same manner as a multilayered color light-sensitive material.

(Evaluation)

When Samples 701, 702, and 703 were evaluated in the same manner as in Example 3, they were each found to have high pressure durability and to prevent deterioration of photographic performance during coating in the same manner as the samples of the invention in Example 3.

Example 5

Preparation and Evaluation of Emulsions

The present example gives the results of the first implementation mode of the emulsion of the present invention.

Gelatins 1 to 4 that were employed as dispersion media in the preparation of emulsions below had the following characteristics.

Gelatin 1: An ordinary alkali-treated ossein gelatin obtained from starting materials in the form of cattle bones. No chemical modification of —$NH_2$ groups in the gelatin.

Gelatin 2: Phthalic anhydride was added under conditions of a temperature of 50° C. and a pH of 9.0 to an aqueous solution of Gelatin 1, a chemical reaction was conducted, the residual phthalic acid was removed, and the product was dried to obtain gelatin. The proportion of the number of —$NH_2$ groups in the gelatin that were chemically modified was 95 percent.

Gelatin 3: Mellitic anhydride was added under conditions of a temperature of 50° C. and a pH of 9.0 to an aqueous solution of Gelatin 1, a chemical reaction was conducted, the residual mellitic acid was removed, and the product was dried to obtain gelatin. The proportion of the number of —$NH_2$ groups in the gelatin that were chemically modified was 95 percent.

Gelatin 4: Gelatin 1 was subjected to the action of an enzyme to lower the molecular weight. Once an average molecular weight of 15,000 had been reached, the enzyme was deactivated and the product was dried to obtain gelatin. There was no chemical modification of the —$NH_2$ groups in the gelatin.

Above-described Gelatins 1 to 4 were all deionized and adjusted to pH 6.0 in a 5 percent aqueous solution at 35° C.

(Preparation of Emulsion A-1)

A 1,300 mL quantity of an aqueous solution comprising 1.1 g of above-described Gelatin 4 and 1.0 g of KBr was maintained at 35° C. with stirring (preparation of Solution 1). A 38 mL quantity of Ag-1 aqueous solution (comprising 4.9 g of $AgNO_3$ in 100 mL), 29 mL of X-1 aqueous solution (comprising 5.2 g of KBr in 100 mL), and 8.5 mL of G-1 aqueous solution (comprising 8.0 g of Gelatin 4 in 100 mL) were added by the triple jet method at a constant flow rate over 30 sec (addition 1). Subsequently, 6.5 g of KBr were added and the temperature was raised to 75° C. After an aging step conducted for 12 min following the increase in temperature, 300 mLofG-2 aqueous solution (12.7 gof Gelatin 1 in 100 mL) were added, followed by 4.2 g of disodium 4,5-dihydroxy-1,3-benzenedisulfonate dihydrate.

Next, 157 mL of Ag-2 aqueous solution (comprising 22.1 g of $AgNO_3$ in 100 mL) and X-2 aqueous solution (comprising 15.5 g of KBr in 100 mL) were added by the double jet method over 28 min. At the time, the addition of the Ag-2 aqueous solution was conducted at an accelerating flow rate where the final flow rate was 3.4 times that of the initial flow rate, and the addition of the X-2 aqueous solution was conducted such that the pAg of the bulk emulsion solution in the reaction vessel was maintained at 7.52 (addition 2). Next, 329 mL of Ag-3 aqueous solution (32.0 g of $AgNO_3$ in 100 mL) and X-3 aqueous solution (comprising 21.5 g of KBr and 1.2 g of KI in 100 mL) were added by the double jet method over 53 min. At the time, the addition of the Ag-3 aqueous solution was conducted at an accelerating flow rate such that the final flow rate was 1.6 times the initial flow rate and the addition of the X-3 was conducted such that the pAg of the bulk emulsion solution in the reaction vessel was maintained at 7.52 (addition 3). Further, 156 mL of Ag-4 aqueous solution (comprising 32.0 g of $AgNO_3$ in 100 mL) and X-4 aqueous solution (comprising 22.4 g of KBr in 100 mL) were added over 17 min by the double jet method. At the time, the addition of the Ag-4 aqueous solution was conducted at a constant flow rate and the addition of the X-3 aqueous solution was conducted by maintaining a pAg of the bulk emulsion solution in the reaction vessel of 7.52 (addition 4).

Subsequently, 0.0025 g of sodium benzenethiosulfonate and 125 mL of G-3 aqueous solution (comprising 12.0 g of Gelatin 1 in 100 mL) were sequentially added at intervals of 1 min. Next, 43.7 g of KBr were added, the pAg of the bulk emulsion solution in the reaction vessel was adjusted to 9.00, and 73.9 g of AgI microparticulate emulsion (comprising 13.0 g of microparticulate AgI with an average grain size of 0.047 micrometer in 100 g) were added. After the addition of those two components, 249 mL of Ag-4 aqueous solution and X-4 aqueous solution were added by the double jet method.

At the time, the Ag-4 aqueous solution was added over 9 min at a constant flow rate. The X-4 aqueous solution was added such that a pAg of 9.00 was maintained in the bulk emulsion solution in the reaction vessel for only the initial 3.3 min, there being no addition during the remaining 5.7 min, such that the pAg of the bulk emulsion solution in the reaction vessel reached a final level of 8.4 (addition 5). Subsequently, the usual flocculation method was employed for desalting. Water, NaOH, and Gelatin 1 were added with stirring, and preparation was completed to yield a pH of 6.4 and a pAg of 8.6 at 56° C.

The emulsion obtained comprised tabular silver halide grains with a diameter as shere of 0.99 micrometer, an average aspect ratio of 3.1, and an aspect ratio of 2.5 to 4.5 over 60 percent of the total projected area of the grain. The average AgI content was 3.94 mol percent in the form of silver iodobromide. The parallel main face was the (111) face. The AgI content of the silver halide grain surface as measured by XPS was 2.1 mol percent. The AgCl content was 0 mol percent.

Next, sensitizing dye Exs-1, described below, potassium thiocyanate, auric chloride, sodium thiosulfate, N,N-dimethylselenourea, and Compound RS-1, described below, were sequentially added to optimize chemical sensitivity. Water-soluble mercapto compounds ExA-1 and ExA-2 were added in a ratio of 4:1 in a total of $3.6\times10^{-4}$ mol per mole of silver halide to stop chemical sensitization. Emulsion A-1 was optimally chemically sensitized when Exs-1 was added in a quantity of $3.65\times10^{-4}$ mol per mol of silver halide.

Sensitizing dye ExS-1

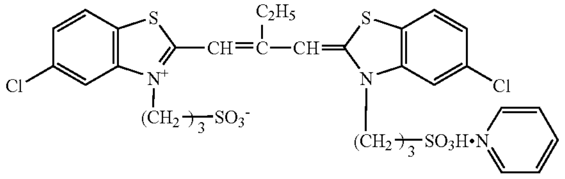

Compound RS-1

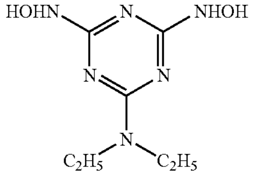

ExA-1

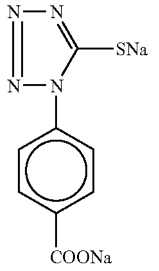

ExA-2

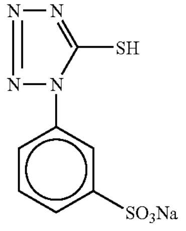

(Preparation of Emulsion A-2)

Emulsion A-2 was prepared by making the following changes to the preparation conditions of emulsion A-1:

(I) The gelatin in G-2 aqueous solution added following the 12 mL aging step at 75° C. was changed from Gelatin 1 to Gelatin 2.

(II) The flow rate of the addition of the Ag-2 aqueous solution of (addition 2) was changed so that the same addition solution amount of 157 mL was added over 22.4 mL. The flow rate acceleration was such that the final flow rate was 3.4 times that of the initial flow rate. Further, the addition of the X-2 aqueous solution was conducted so that the pAg of the bulk emulsion solution in the reaction vessel was maintained at 7.83. (III) The flow rate of the addition of the Ag-3 aqueous solution of (addition 3) was changed so that the same addition solution amount of 329 mL was added in 42.4 min. The flow rate acceleration was such that the final flow rate was 1.6 times that of the initial flow rate. Further, the addition of the X-3 aqueous solution was conducted so that the pAg of the bulk emulsion solution in the reaction vessel was maintained at 7.83.

The emulsion obtained comprised tabular silver halide grains with a diameter as shere of 0.99 micrometer, an average aspect ratio of 5.9, and an aspect ratio of 5.0 to 8.0 over 60 percent of the total projected area of the grain. The average AgI content was 3.94 mol percent. The parallel main face was the (111) face. The AgI content of the silver halide grain surface as measured by XPS was 2.4 mol percent. The AgCl content was 0 mol percent. Emulsion A-2 was optimally chemically sensitized when sensitizing dye Exs-1 was added in a quantity of $4.60\times10^{-4}$ mol per mol of silver halide.

(Preparation of Emulsion A-3)

Emulsion A-3 was prepared by making the following changes to the preparation conditions of emulsion A-1:

(I) The gelatin in G-2 aqueous solution added following the 12 min aging step at 75° C. was changed from Gelatin 1 to Gelatin 3.

(II) The flow rate of the addition of the Ag-2 aqueous solution of (addition 2) was changed so that the same addition solution amount of 157 mL was added in 14 min. The flow rate acceleration was such that the final flow rate was 3.4 times that of the initial flow rate. Further, the addition of the X-2 aqueous solution was conducted so that the pAg of the bulk emulsion solution in the reaction vessel was maintained at 8.30.

(III) The flow rate of the addition of the Ag-3 aqueous solution of (addition 3) was changed so that the same addition solution amount of 329 mL was added in 27 min. The flow rate acceleration was such that the final flow rate was 1.6 times that of the initial flow rate. Further, the addition of the X-3 aqueous solution was conducted so that the pAg of the bulk emulsion solution in the reaction vessel was maintained at 8.30.

The emulsion obtained comprised tabular silver halide grains with a diameter as shere of 0.99 micrometer, an average aspect ratio of 12.5, and an aspect ratio of 9.0 to 15.0 over 60 percent of the total projected area of the grain. The average AgI content was 3.94 mol percent. The parallel main face was the (111) face. The AgI content of the silver halide grain surface as measured by XPS was 2.6 mol percent. The AgCl content was 0 mol percent.

In Emulsion A-3, the quantity of sensitizing dye Exs-1 added was $6.42\times10^{-4}$ mol per mol of silver halide.

Observation by 400 kV transmission electron microscopy of Emulsions A-1 to A-3 revealed the presence of at least 10 dislocation lines in the fringe portions of the tabular grains of all three emulsions.

Further, reduction sensitization was conducted in Emulsions A-1 to A-3 by adding disodium 4,5-dihydroxy-1,3-benzenesulfonate monohydrate immediately prior to the above-described emulsion preparation step (addition 2).

(Preparation of Emulsions A-4 to A-6)

Emulsions A-4 to A-6 were prepared in the same manner as Emulsions A-1 to A-3 with the exception that 20 mg of Polymer WP-1a of the present invention shown in Table 5 below were added per mol of silver halide together with ExA-1 and ExA-2 at the end of chemical sensitization.

(Preparation of Emulsions A-7 to A-13)

Each of emulsions A-7 to A-13 was prepared in the same manner as Emulsion A-3 with the exception that 20 mg of the polymer of the present invention shown in Table 5 below were added per mol of silver halide together with ExA-1 and ExA-2 at the end of chemical sensitization.

(Preparation of Emulsion A-14)

A-14 was prepared in the same manner as Emulsion A-3 with the exception that 20 mg of Polymer WP-1a of the present invention were added per mol of silver halide prior to the addition of sensitizing dye ExS-1.

(Preparation of Emulsion A-15)

A-15 was prepared in the same manner as Emulsion A-3 with the exception that 20 mg of Polymer WP-1a of the present invention were added per mol of silver halide during addition 5 of grain formation.

(Preparation of Emulsion A-16)

Emulsion A-16 was prepared in the same manner as Emulsion A-3 with the exception that 20 mg of the acrylamide-acrylic acid copolymer (employed as Comparative Polymer b) obtained in the first step of the synthesis of polymer WP-2a in Example 1 were added together with ExA-1 and ExA-2 at the end of chemical sensitization.

(Preparation of Emulsion A-17)

Emulsion A-17 was prepared in the same manner as Emulsion A-3 with the exception that a molar quantity equal to the number of mols of Polymer WP-2a contained in Emulsion A-10 of 4-(5-mercapto-1-tetrazolyl)benzoic acid (employed as Comparative Compound a) and 20 mg of Comparative Polymer b were added together with ExA-1 and ExA-2 at the end of chemical sensitization.

(Preparation of Emulsion A-18)

Emulsion A-18 was prepared in the same manner as Emulsion A-3 with the exception that 20 mg of Example 3 disclosed in Synthesis Example 2 of JP-A-3-37643 was added as a modified gelatin in which Comparative Compound a was bonded, together with ExA-1 and ExA-2 at the end of chemical sensitization.

Emulsions A-1 to A-18 were coated under the following conditions on a triacetic acid cellulose film support with an undercoating layer. The coated samples were denoted as Samples 151-168 in Table 5.

(Emulsion Coating Conditions)

For silver halides, the coating quantities given are based on silver.

| | | | |
|---|---|---|---|
| 1) | Emulsion layer | | |
| | Various emulsions | Silver | 1.76 $g/m^2$ |
| | Magenta dye forming coupler (M-1) | | 1.58 $g/m^2$ |
| | Tricresyl phosphate | | 1.32 $g/m^2$ |
| | Gelatin | | 3.24 $g/m^2$ |

-continued

| | | |
|---|---|---|
| 2) | Protective layer | |
| | 4-Dichloro-6-hydroxy-s-triazine sodium salt | 0.08 $g/m^2$ |
| | Gelatin | 1.80 $g/m^2$ |

Surfactants were also suitably incorporated to improve coating properties.

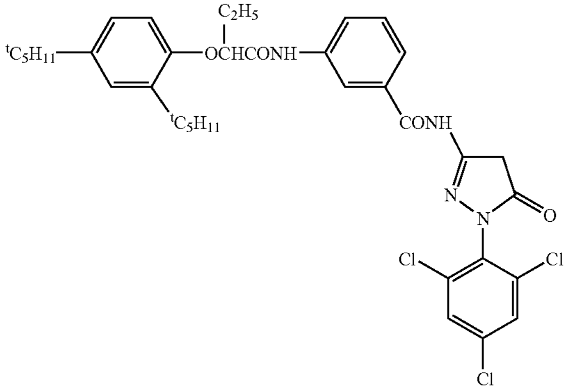

These samples were cured for 14 hours under conditions of 40° C. and 70 percent relative humidity. They were then exposed for 1/100th sec through an SC-50 gelatin filter (a long wavelength photo extinction filter with a cutoff wavelength of 500 nm), made by Fuji Film Co., Ltd., and a continuous wedge. The samples were developed by the process described below, after which photographic performance was evaluated by density measurement with a green filter. Sensitivity was denoted as the relative value (the sensitivity of Sample 151 was made 100) of the log of the reciprocal of the exposure level denoted in Lux sec yielding a magenta density 0.2 greater than the fogging density. The sensitivity is given in Table 5 below.

A negative processor FP-350 made by Fuji Photo Film Co., Ltd. was employed in development by the method recorded below (until the accumulated level of replenishment solution reached triple the volume of the base solution tank).

(Processing Method)

| Step | Processing time | Processing Temperature | Replenishment Level |
|---|---|---|---|
| Color development | 2 min 45 sec | 38° C. | 45 mL |
| Bleaching | 1 min 00 sec | 38° C. | 20 mL All bleaching solution overflow directed into bleaching and fixing tank |
| Bleaching and fixing | 3 min 15 sec | 38° C. | 30 mL |
| Water washing (1) | 40 sec | 35° C. | (2)-(1) Backflow pipe |
| Water washing (2) | 1 min 00 sec | 35° C. | 30 mL |
| Stabilizing | 40 sec | 38° C. | 20 mL |
| Drying | 1 min 15 sec | 55° C. | |

* The replenishment level is given per 1.1 m length of 35 mm width (corresponding to 1 roll of 24 exposures).

The processing solution compositions are given below.

| (Color developer) | Tank solution (g) | Replenishing solution (g) |
|---|---|---|
| Diethylenetriamine pentaacetic acid | 1.0 | 1.1 |
| 1-Hydroxyethylidene-1,1-diphosphonic acid | 2.0 | 2.0 |
| Sodium sulfite | 4.0 | 4.4 |
| Potassium carbonate | 30.0 | 37.0 |
| Potassium bromide | 1. 4 | 0.7 |
| Potassium iodide | 1.5 mg | — |
| Hydroxylamine sulfate | 2.4 | 2.8 |
| 4-[N-ethyl-N-(hydroxyethyl)amino]-2-methylaniline sulfate | 4.5 | 5.5 |
| Water to make | 1.0 L | 1.0 L |
| pH (adjusted with potassium hydroxide and sulfuric acid) | 10.05 | 10.10 |

| (Bleaching solution) | Common tank solution and replenishment solution (unit g) |
|---|---|
| Ferric ammonium ethylenediamine tetraacetate dehydrate | 120.0 |
| Disodium ethylenediamine tetracetate | 10.0 |
| Ammonium bromide | 100.0 |
| Ammonium nitride | 10.0 |
| Bleaching promoter $(CH_3)_2N—CH_2—CH_2—S—S—CH_2—CH_2—N(CH_3)_2•2HCl$ | 0.005 mol |
| Aqueous ammonia (27 percent) | 15.0 mL |
| Water to make | 1.0 L |
| pH (adjusted with aqueous ammonia and nitric acid) | 6.3 |

| (Bleaching and fixing solution) | Tank solution (g) | Replenishing solution (g) |
|---|---|---|
| Ferric ammonium ethylenediamine tetracetate dihydrate | 50.0 | — |
| Disodium ethylenediamine tetraacetate | 5.0 | 2.0 |
| Sodium sulfite | 12.0 | 20.0 |
| Ammonium thiosulfate aqueous solution (700 g/L) | 240.0 mL | 400.0 mL |
| Aqueous ammonia (27 percent) | 6.0 mL | — |
| Water to make | 1.0 L | 1.0 L |
| pH (adjusted with aqueous ammonia and acetic acid) | 7.2 | 7.3 |

(Water Washing Solution) Common tank Solution and Replenishment Solution

Tap water was run onto a mixed-bed column packed with an H-type strongly acidic cation exchange resin (Amberlite IR-120B, Rohm & Haas Co.) and an OH-type strongly basic anion exchange resin (Amberlite IR-400) to achieve calcium and magnesium concentrations of 3 mg/L or less. Subsequently, 20 mg/L of sodium dichloroisocyanurate and 0.15 g/L of sodium sulfate were added. The pH of the solution was within a range of 6.5-7.5.

(Stabilizing Solution)

This solution was used in common for both the tank solution and the replenisher.

| | (Unit: g) |
|---|---|
| Sodium p-toluene sulfinate | 0.03 |
| Polyoxyethylene p-monononylphenyl ether (average polymerization degree: 10) | 0.2 |
| Disodium ethylenediamine tetraacetate | 0.05 |
| 1,2,4-Triazole | 1.3 |

-continued

| | (Unit: g) |
|---|---|
| 1,4-Bis(1,2,4-triazol-1-ylmethyl)piperazine | 0.75 |
| Water to make | 1.0 L |
| pH | 8.5 |

(Evaluation of Pressure Durability)

The following test was conducted to evaluate the pressure durability of the samples. The samples were adjusted to a temperature of 25° C. at a humidity of 55 percent. After scratching the emulsion surface in a certain direction with a 0.1 mm fine needle to which was applied a load of 5 g, the above-described methods were employed for exposure, development, and density measurement. The difference in density (ΔD) between scratched portions and unscratched portions was calculated at an exposure level yielding a density 0.25 higher than the minimum magenta density (DMmin) calculated by the above-described exposure, development, and density measurement of an unscratched sample. The smaller the ΔD, the better the pressure durability. The ΔDs of the individual color-sensitive layers were used as evaluation values indicating pressure durability.

(Evaluation of Deterioration in Photographic Capacity due to Grain Aggregation During Coating)

The various emulsions in Samples 151 to 168 were dissolved at 40° C. and left standing for 8 hours. Samples 251-268 were then prepared under the same coating conditions as Samples 151-168.

Samples 151 and 251-268 were placed for 14 hours under conditions of a temperature of 40° C. and a relative humidity of 70 percent, and developed by the same method as that set forth above. The RMS granularity of the processed samples was measured at a density 0.2 higher than the fogging density of each sample. When grains aggregate, granularity deteriorates and the RMS granularity value increases. Granularity was given as a relative value following dissolution and the passage of time, with the value of Sample 151 being made 100.

The photographic performance is given in the table below.

Example 6

Emulsion Preparation and Evaluation

The present example gives the results of a second mode of implementing the emulsion of the present invention.

Host silver halide emulsion B was prepared by the following manufacturing method.

(Preparation of Seed Emulsion A)

A 0.017 g quantity of KBr and 1,164 mL of an aqueous solution comprising 0.4 g of an oxidation-treated gelatin with an average molecular weight of 20,000 were maintained at 30° C. and stirred. An $AgNO_3$ (1.6 g) aqueous solution, a KBr aqueous solution, and an oxidation-treated gelatin (2.1 g) aqueous solution with an average molecular weight of 20,000 were added by the triple jet method over 30 sec. The concentration of the $AgNO_3$ solution was 0.2 mol/L. At the time, the silver potential was maintained at 15 mV relative to a saturated calomel electrode. After adding a KBr aqueous solution to adjust the silver potential to −60 mV, the temperature was raised to 75° C. A 21 g quantity of succinated gelatin with an average molecular weight of 100,000 was added. An $AgNO_3$ (206.3 g) aqueous solution and a KBr aqueous solution were added over 61 min by the double jet method while accelerating the flow rate. At the time, the silver potential was maintained at −40 mV relative to a saturated calomel electrode. After desalting, a succinated gelatin with an average molecular weight of 100,000 was added, the pH was adjusted to 5.8, and the pAg was adjusted to 8.8 at 40° C. to prepare a seed emulsion. The seed emulsion had tabular grains comprising one mol of Ag and 80 g of gelatin per kilogram of emulsion, an average diameter as circle of 1.60 micrometer, a variation coefficient of diameter as circle of 22 percent, an average thickness of 0.043 micrometer, and an average aspect ratio of 37.

(Preparation of Host Tabular Particulate Emulsion B)

A 1,200 mL quantity of aqueous solution comprising 134 g of Seed Emulsion a, 1.9 g of KBr, and 22 g of succinated gelatin having an average molecular weight of 100,000 was

TABLE 5

| Sample No. | Emulsion | Aspect ratio | Polymer of the present invention (or comparative compound) | Time of addition | Sensitivity | Pressure durability | Sample No. (after dissolution and passage of time) | Granularity after dissolution and passage of time | Note |
|---|---|---|---|---|---|---|---|---|---|
| 151 | A-1 | 3.1 | No | — | 100 | 0.10 | 251 | 100 | Comparative |
| 152 | A-2 | 6.9 | No | — | 122 | 0.15 | 252 | 124 | Comparative |
| 153 | A-3 | 12.5 | No | — | 161 | 0.24 | 253 | 144 | Comparative |
| 154 | A-4 | 3.1 | WP-1a | after sensitization | 100 | 0.05 | 254 | 90 | Invention |
| 155 | A-5 | 6.9 | WP-1a | after sensitization | 122 | 0.07 | 255 | 100 | Invention |
| 156 | A-6 | 12.5 | WP-1a | after sensitization | 161 | 0.10 | 256 | 105 | Invention |
| 157 | A-7 | 12.5 | WP-1b | after sensitization | 160 | 0.13 | 257 | 122 | Invention |
| 158 | A-8 | 12.5 | WP-1c | after sensitization | 160 | 0.16 | 258 | 131 | Invention |
| 159 | A-9 | 12.5 | WP-1d | after sensitization | 160 | 0.18 | 259 | 138 | Invention |
| 160 | A-10 | 12.5 | WP-2a | after sensitization | 160 | 0.08 | 260 | 103 | Invention |
| 161 | A-11 | 12.5 | WP-2b | after sensitization | 160 | 0.14 | 261 | 124 | Invention |
| 162 | A-12 | 12.5 | WP-3a | after sensitization | 160 | 0.09 | 262 | 104 | Invention |
| 163 | A-13 | 12.5 | WP-3b | after sensitization | 160 | 0.13 | 263 | 120 | Invention |
| 164 | A-14 | 12.5 | WP-2a | before sensitization | 161 | 0.09 | 264 | 105 | Invention |
| 165 | A-15 | 12.5 | WP-2a | during grain formation | 159 | 0.09 | 265 | 106 | Invention |
| 166 | A = 16 | 12.5 | Comparative polymer b | after sensitization | 160 | 0.24 | 266 | 144 | Comparative |
| 167 | A-17 | 12.5 | Comparative compound a<br>Comparative polymer b | after sensitization | 160 | 0.23 | 267 | 143 | Comparative |
| 168 | A-18 | 12.5 | Modified gelatin c | after sensitization | 142 | 0.25 | 268 | 155 | Comparative |

As shown in Table 5, Emulsions A-1 to A-3 exhibited deterioration in "RMS granularity after dissolution and the passage of time" due to an increase in the aspect ratio and the tendency of the grains to aggregate. The use of the above-described mercapto group-containing polymer inhibited the aggregation of grains so that unaggregated grains exhibited their original granularity. Not just grains with granularity, but grains with both high "pressure durability" and a high aspect ratio are more effective. In water-soluble polymers having simple mercapto groups and not having heterocyclic groups, and when only a mercapto compound is added, no effect was exhibited in Emulsions A-16 and A-17 on "RMS granularity after dissolution and the passage of time" and "pressure durability". Conversely, aggregation deteriorated in Emulsion A-18 employing the modified gelatin c described in an example in JP-A-3-37643. A mercapto group-comprising polymer affords good photographic performance in sensitivity, granularity, and photographic change over time.

maintained at 75° C. and stirred. An aqueous solution of $AgNO_3$ (137.5 g), a KBr aqueous solution, and an oxidation-treated gelatin aqueous solution with a molecular weight of 20,000 were mixed immediately prior to addition in a separate chamber having the magnetic coupling induction type stirrer described in JP-A-10-43570 and then added over 25 min. At the time, the silver potential was maintained at −40 mV relative to a saturated calomel electrode. Subsequently, an $AgNO_3$ (30.0 g) aqueous solution, KBr aqueous solution, and preprepared AgI ultramicroparticulate emulsion were added at a constant flow rate over 30 min by the triple jet method. The quantity of AgI ultramicroparticulate emulsion added was adjusted to yield a silver iodide content of 15 molar percent. The AgI ultramicroparticulate emulsion employed was obtained from a dispersion gelatin in the form of trimellitic-treated gelatin with a diameter as circle of 0.03 micrometer and a variation coefficient in diameter as circle of 17 percent. Partway through, potassium iridium hexachloride and sodium benzenethiosulfonate were added. At the time, the silver potential was maintained at −20 mV relative to a saturated calomel electrode. Subsequently, an $AgNO_3$ aqueous solution (36.4 g), KBr aqueous solution, and the preprepared AgI ultramicroparticulate emulsion were added at a constant flow rate over 40 min. The quantity of AgI ultramicroparticulate emulsion added was adjusted to yield a silver iodide content of 15 molar percent. At the time, the silver potential was maintained at +80 mV relative to a saturated calomel electrode. The usual water washing was conducted, a high-molecular-weight gelatin with a molecular weight of 150,000 was added, the pH was adjusted to 5.8 and the pBr was adjusted to 4.0 at 40° C. This emulsion was denoted as Emulsion B-1. Emulsion B-1 had tabular grains with an average diameter as circle of 4.2 micrometers, a variation coefficient in diameter as circle of 19 percent, an average thickness of 0.062 micrometer, and an average aspect ratio of 68. At least 90 percent of the total projected area had a diameter as circle of 3.0 micrometers and a thickness of less than or equal to 0.07 micrometer. Further, at least 90 percent of the total projected area consisted of hexagonal tabular grains with a ratio of 1.4 or less of the length of the longest side to the length of the shortest side. Observation by transmission electron microscopy at low temperature revealed a total absence of dislocation lines in 90 percent or more of the total projected area of the grains. The (111) face rate in the side face was 68 percent.

(Epitaxial Deposition and Chemical Sensitization)

Host tabular particulate emulsion B was subjected to the epitaxial deposition of (I) to (III) below and Emulsions B-1 to B-3 were prepared.

(I) Host tabular particulate emulsion B was dissolved at 40° C. and a KI aqueous solution was added in a proportion of $3\times10^{-3}$ mol per mol of silver in the host tabular grains. Sensitizing dyes I, II, and III were added at a ratio of 70 percent of the saturation coating level in a ratio of 6:3:1. The sensitizing dye was employed in the form of a solid microdispersion prepared by the method described in JP-A-11-52507. That is, 0.8 weight parts of sodium nitrate and 3.2 weight parts of sodium sulfate were dissolved in 43 parts of ion-exchange water, 13 weight parts of sensitizing dye were added, dispersion was conducted for 20 min at 2,000 rpm with dissolver blades at 60° C. to obtain a solid dispersion of sensitizing dye. Potassium hexacyanoruthenate (II) was added in a proportion of $3.1\times10^{-6}$ mol (per mol of silver in the host tabular grains hereinafter), after which $1.5\times10^{-2}$ mol of KBr aqueous solution was added. Subsequently, $3.0\times10^{-2}$ mol of 1 mol/L silver nitrate aqueous solution and $2.7\times10^{-2}$ mol of NaCl aqueous solution were added at a constant flow rate over 10 min by the double jet method. Following completion of the addition, the silver potential was +85 mV relative to a saturated calomel electrode. A $2\times10^{-5}$ mol quantity of the antifogging agent ExA-3 and $5\times10^{-5}$ mol of the antifogging agent ExA-4 were added, after which the temperature was raised to 50° C. and potassium thiocyanate, auric chloride, sodium thiosulfate, and N,N-dimethylselenourea were added to optimize chemical sensitization. A $5\times10^{-4}$ mol quantity of the above-described mercapto compound ExA-1 was added to end chemical sensitization.

Sensitizing dyes I, II, and III, as well as antifogging agents ExA-3 and ExA-4 are described below.

Sensitizing dye I

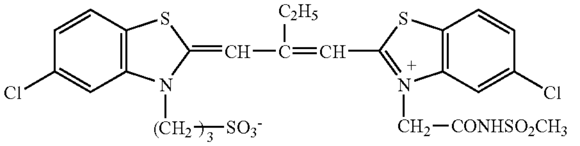

Sensitizing dye II

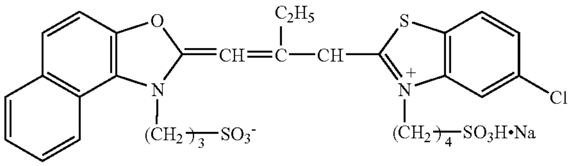

Sensitizing dye III

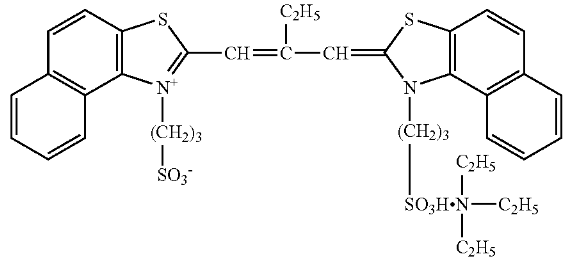

ExA-3

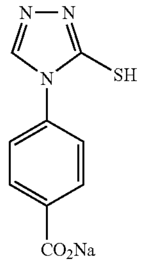

E x A-4

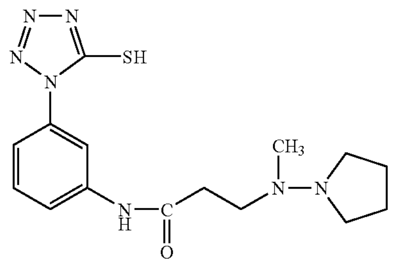

(II) The host tabular particulate emulsion was dissolved at 40° C. and the above-described AgI ultramicroparticulate emulsion was added in a proportion of $3\times10^{-3}$ mol per mol of silver in the host tabular grains. Sensitizing dyes I, II, and III were added at a ratio of 70 percent of the saturation coating level in a ratio of 6:3:1. The sensitizing dyes were employed in the form of a solid microdispersion prepared by the method described in JP-A-11-52507. That is, 0.8 weight parts of sodium nitrate and 3.2 weight parts of sodium sulfate were dissolved in 43 parts of ion-exchange water, 13 weight parts of sensitizing dye were added, and dispersion was conducted for 20 min at 2,000 rpm with dissolver vanes at 60° C. to obtain a solid dispersion of sensitizing dye. Potassium hexacyanoruthenate (II) was added in a proportion of $3.1\times10^{-6}$ mol (per mol of silver in the host tabular grains hereinafter), after which $1.5\times10^{-2}$ mol of KBr aqueous solution was added. Subsequently, $2.7\times10^{-2}$ mol of NaCl aqueous solution were added, after which $3.0\times10^{-2}$ mol of 1 mol/L silver nitrate aqueous solution was added at a constant flow rate over 1 min. Following completion of the addition, the silver potential was +85 mV relative to a saturated calomel electrode. A $2\times10^{-5}$ mol quantity of the antifogging agent ExA-3 and $5\times10^{-5}$ mol of the antifogging agent ExA-4 were added, after which the temperature was raised to 50° C. and potassium thiocyanate, auric chloride, sodium thiosulfate, and N,N-dimethylselenourea were added to optimize chemical sensitization. A $5\times10^{-4}$ mol quantity of compound ExA-1 was added to end chemical sensitization. (III) The host tabular particulate emulsion was dissolved at 40° C. and the above-described AgI ultramicroparticulate emulsion was added in a proportion of $3\times10^{-3}$ mol per mol of silver in the host tabular grains. Sensitizing dyes I, II, and III were added at a ratio of 70 percent of the saturation coating level in a ratio of 6:3:1. The sensitizing dyes were employed in the form of a solid microdispersion prepared by the method described in JP-A-11-52507. That is, 0.8 weight parts of sodium nitrate and 3.2 weight parts of sodium sulfate were dissolved in 43 parts of ion-exchange water, 13 weight parts of sensitizing dye were added, and dispersion was conducted for 20 min at 2,000 rpm with dissolver vanes at 60° C. to obtain a solid dispersion of sensitizing dye. Potassium hexacyanoruthenate (II) was added in a proportion of $3.1\times10^{-6}$ mol (per mol of silver in the host tabular grains hereinafter), after which $1.5\times10^{-2}$ mol of KBr aqueous solution was added. Subsequently, $3.0\times10^{-2}$ mol of 0.1 mol/L silver nitrate aqueous solution and $2.7\times10^{-2}$ mol of NaCl aqueous solution were added by the double jet method over 2 min at a constant flow rate. Following completion of the addition, the silver potential was +85 mV relative to a saturated calomel electrode. A $2\times10^{-5}$ mol quantity of the antifogging agent ExA-3 and $5\times10^{-5}$ mol of the antifogging agent ExA-4 were added, after which a KBr aqueous solution was added to adjust the silver potential to +20 mV relative to a saturated calomel electrode. The temperature of the emulsion was raised to 50° C. and potassium thiocyanate, auric chloride, sodium thiosulfate, and N,N-dimethylselenourea were added to optimize chemical sensitization. A $5\times10^{-4}$ mol quantity of compound ExA1 was added to end chemical sensitization.

EPMA was used to measure the distribution of the silver iodide and silver chloride contents of grains for Emulsions B-1 to B-3 prepared by combining the above-described epitaxial deposition with the host tabular grain emulsion. The state of epitaxial deposition was observed by electron microscopy in a replica. Table 6 gives the collective results of emulsions B-1 to B-3. These emulsions had tabular silver halide grains comprised of silver iodobromide with a silver chloride content of 1.2 molar percent, a silver iodide content of 4.5 molar percent.

TABLE 6

| Emulsion No. | Epitaxial deposition | Ratio of hexagonal tabular grains (%) | Ratio of (111) face in the side face (%) | Complete epitaxial emulsion ratio (%) |
|---|---|---|---|---|
| B-1 | (i) | 95 | 68 | 85 |
| B-2 | (ii) | 95 | 68 | 90 |
| B-3 | (iii) | 95 | 68 | 95 |

(Preparation of Emulsions B-4 to B-9)

Emulsions B-4 to B-9 were prepared in the same manner as Emulsions B-1 to B-3 with the exceptions that a mercapto group-comprising polymer such as that shown in Table 7 below was added in a proportion of 20 mg per mol of silver halide together with ExA-1 at the end of chemical sensitization.

Nine types of coatings were prepared with the above-described emulsions in the same manner as in Example 5. The coated samples were denoted as Samples 301 to 309. The same exposure and developing were conducted as in Example 5 and sensitivity was tested, with the sensitivity of Sample 301 as 100. Pressure durability evaluation was conducted in the same manner as in Example 5 using Samples 301 to 309.

The above 9 types of emulsions were dissolved at 40° C. and left standing for 8 hours, after which they were coated to prepare Samples 311 to 319 under the same conditions as Samples 301 to 309. Sensitivity and RMS granularity were compared to those of Samples 301 to 309 in the same manner as in Example 5, and the deterioration of granularity due to grain aggregation during coating was evaluated (relative values where the granularity of Sample 301 was made 100).

The results are presented in Table 7.

TABLE 7

| Sample No. | Emulsion | Epitaxial deposition | Polymer of the present invention | Sensitivity | Pressure durability | Granularity | Note |
|---|---|---|---|---|---|---|---|
| 301 | B-1 | (i) | No | 100 | 0.33 | 100 | Comparative |
| 302 | B-2 | (ii) | No | 105 | 0.33 | 100 | Comparative |
| 303 | B-3 | (iii) | No | 108 | 0.34 | 100 | Comparative |
| 304 | B-4 | (i) | WP-1a | 100 | 0.11 | 100 | Invention |
| 305 | B-5 | (ii) | WP-1a | 105 | 0.11 | 100 | Invention |
| 306 | B-6 | (iii) | WP-1a | 108 | 0.11 | 100 | Invention |
| 307 | B-7 | (i) | WP-2a | 100 | 0.12 | 100 | Invention |
| 308 | B-8 | (ii) | WP-2a | 105 | 0.12 | 100 | Invention |
| 309 | B-9 | (iii) | WP-2a | 108 | 0.12 | 100 | Invention |
| 311 | B-1 | (i) | No | 91 | — | 128 | After |
| 312 | B-2 | (ii) | No | 92 | — | 129 | dissolution and |
| 313 | B-3 | (iii) | No | 94 | — | 128 | passage of time |

TABLE 7-continued

| Sample No. | Emulsion | Epitaxial deposition | Polymer of the present invention | Sensi-tivity | Pressure durability | Granu-larity | Note |
|---|---|---|---|---|---|---|---|
| 314 | B-4 | (i) | WP-1a | 99 | — | 107 | |
| 315 | B-5 | (ii) | WP-1a | 105 | — | 107 | |
| 316 | B-6 | (iii) | WP-1a | 108 | — | 107 | |
| 317 | B-7 | (i) | WP-2a | 100 | — | 106 | |
| 318 | B-8 | (ii) | WP-2a | 105 | — | 106 | |
| 319 | B-9 | (iii) | WP-2a | 108 | — | 106 | |

As indicated in Table 7, the emulsions of the second implementation mode afforded good granularity making it possible to prevent grain aggregation during coating without loss of sensitivity by employing a mercapto group-comprising polymer. It was also possible to improve pressure durability.

Example 7

Emulsion Preparation and Evaluation

The present example gives the results of a first implementation mode of the emulsion of the present invention.

(Preparation of Emulsion C-1)

(Preparation of First Solution)

A 1,300 mL quantity of aqueous solution comprising 0.6 g of KBr and 1.1 g of the Gelatin 4 were maintained at 35° C. and stirred.

(Addition 1)

A 24 mL quantity of Ag-1 aqueous solution (comprising 4.9 g of $AgNO_3$ in 100 mL), 24 mL of X-1 aqueous solution (comprising 4.1 g of KBr in 100 mL), and 24 mL of G-1 aqueous solution (comprising 1.8 g of Gelatin 4 of Example 5 in 100 mL) were added over 30 sec at a constant flow rate.

Subsequently, 1.3 g of KBr were added and the temperature was raised to 75° C. After aging for 12 min following the increase in temperature, 300 mL of G-2 aqueous solution (comprising 12.7 g of Gelatin 3 in 100 mL) were added. Next, 8.4 g of disodium 4,5-dihydroxy-1,3-benzenedisulfonate monohydrate and 0.002 g of thiourea dioxide were sequentially added at intervals of 1 min each.

(Addition 2)

Next, 157 mL of Ag-2 aqueous solution (comprising 22.1 g of $AgNO_3$ in 100 mL) and X-2 aqueous solution (comprising 15.5 g of KBr in 100 mL) were added over 14 min by the double jet method. At the time, the addition of the Ag-2 aqueous solution was conducted at an accelerating flow rate so that the final flow rate was 3.4 times the initial flow rate, and the addition of the X-2 aqueous solution was conducted while maintaining a pAg of 8.3 in the bulk emulsion solution in the reaction vessel.

(Addition 3)

Next, 329 mL of Ag-3 aqueous solution (comprising 32.0 g of $AgNO_3$ in 100 mL) and X-3 aqueous solution (comprising 21.5 g of KBr and 1.6 g of KI in 100 mL) were added over 27 min by the double jet method. The addition of the Ag-3 aqueous solution was conducted at an accelerating flow rate so that the final flow rate was 1.6 times the initial flow rate, and the X-3 aqueous solution was conducted while maintaining a pAg of 8.3 in the bulk emulsion solution in the reaction vessel.

(Addition 4)

A 156 mL quantity of Ag-4 aqueous solution (comprising 32.0 g of $AgNO_3$ in 100 mL) and X-4 aqueous solution (comprising 22.4 g of KBr in 100 mL) were added over 17 min by the double jet method. The Ag-4 aqueous solution was added at a constant flow rate and the X-3 aqueous solution was added while maintaining a pAg of 8.3 in the bulk emulsion solution in the reaction vessel.

Subsequently, 0.0025 g of sodium benzenethiosulfonate and 125 mL of G-3 aqueous solution (comprising 12.0 g of Gelatin 1 in 100 mL) were sequentially added at intervals of 1 min each.

Next, 43.7 g of KBr were added to adjust the pAg of the bulk emulsion solution in the reaction vessel to 9.00, after which 73.9 g of AgI microparticulate emulsion (comprising 13.0 g of AgI micrograms with a mean grain size of 0.047 m per 100 g) were added.

(Addition 5)

Beginning two minutes later, 249 mL of Ag-4 aqueous solution and X-4 aqueous solution were added by the double jet method. The Ag-4 aqueous solution was added over 16 min at a constant flow rate and the X-4 aqueous solution was added while maintaining a pAg of 9.10.

(Addition 6)

During the first five minutes, a potassium ferrocyanide aqueous solution was quantitatively added to achieve a $5\times10^{-6}$ mol/mol Ag relative to the total silver. Addition was conducted over 10 min so that the pAg in the bulk emulsion solution of the reaction vessel become 7.5.

Subsequently, desalting was conducted by the usual flocculation method. Water, NaOH, and Gelatin 1 were then added with stirring and the pH was adjusted to 5.8 and the pAg to 8.9 at 56° C.

The grains obtained were tabular silver halide grains with a diameter as circle of 1.2 micrometers, a grain thickness of 0.20 micrometer, an average aspect ratio of 6.0, an average AgI content of 3.94 molar percent, and the (111) face as the parallel main face. the AgI content of the silver halide grain surface as measured by XPS was 2.1 mol percent. The variation coefficient in the diameter as circle of all grains was 24 percent. The AgCl content was 0 molar percent.

Further, observation by transmission electron microscopy revealed that there were at least 10 dislocation lines per grain in the flange portions of the tabular grains.

(Spectral and Chemical Sensitization)

Compound ExA-4, Compound ExA-5 recorded below, sensitizing dye ExS-1, sensitizing dye II, sensitizing dye III, potassium thiocyanate, auric chloride, sodium thiosulfate, and N,N-dimethylselenourea were sequentially added to optimize chemical sensitization, after which water-soluble mercapto compound ExA-1 and compound ExA-3 were added in a total proportion of $3.6\times10^{-4}$ mol per mol of silver halide in a ratio of 4:1 to end chemical sensitization.

Compound Ex A-5

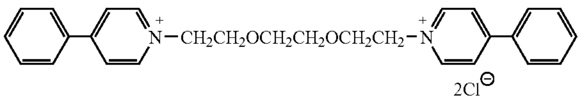

(Preparation of C-2 and C-3)

The grain growing conditions of Emulsion C-1 were suitably altered to prepare tabular emulsions of differing grain thickness. The grain thickness was 0.10 micrometer for C-2 and 0.07 micrometer for C-3. The grain thickness aside, the diameter as circle and AgI content were both identical to those of Emulsion C-1. In both C-2 and C-3, observation by transmission electron microscopy revealed at least 10 dislocation lines per grain in the fringe portion of the tabular grains.

(Preparation of C-4 to C-6)

Emulsions C-4 to C-6 were prepared in the same manner as Emulsions C-1 to C-3 with the exceptions that a mercapto group-comprising polymer such as that shown in Table 8 below was added in a proportion of 20 mg per mol of silver halide together with above-described ExA-1 and ExA-3 at the end of chemical sensitization.

Six types of emulsions were coated in the same manner as in Example 5. The coated samples were denoted as Samples 401 to 406. The same exposure and developing were conducted as in Example 5 and sensitivity was tested, with the sensitivity of Sample 401 as 100. Pressure durability evaluation was conducted in the same manner as in Example 5 using Samples 401 to 406.

Further, the above 6 types of emulsions were dissolved at 40° C. and left standing for 8 hours, after which they were coated to prepare Samples 411 to 416 under the same conditions as Samples 401 to 406. Sensitivity and RMS granularity were compared to those of Samples 401 to 406 in the same manner as in Example 5, and the deterioration of granularity due to grain aggregation during coating was evaluated (relative values where the granularity of Sample 401 was made 100).

Table 8 gives the results.

As shown in Table 8, the emulsions of the first implementation mode afforded good granularity making it possible to prevent grain aggregation during coating without loss of sensitivity by employing a mercapto group-comprising polymer. It was also possible to improve pressure durability.

Example 8

Emulsion Preparation and Evaluation

The present example gives the results of a fourth implementation mode of the emulsion of the present invention.

(Preparation of Emulsion A: <{100} Silver Halide Tabular Grains Cub=0.500 Micrometer [AgCl]>)

To a reaction vessel were charged 1.7 L of $H_2O$, 35.5 g of Gelatin 1 of Example 5 (with a methionine content of about 40 micromols/g), 1.4 g of sodium chloride, and 6.4 mL of 1 N solution of nitric acid (pH 4.5) and the mixture was maintained at a constant temperature of 29° C. A silver nitrate aqueous solution (A-1 Solution: silver nitrate 0.2 g/mL) and a sodium chloride aqueous solution (M-1 Solution: sodium chloride 0.069 g/mL) were added over 45 sec at a rate of 68.2 mL/min with vigorous stirring. Two minutes later, P-2 Solution (potassium bromide: KBr 0.021 g/mL) was added over 14 sec at 186 mL/min. Three minutes later, A-2 Solution (silver nitrate 0.4 g/mL) and M-3 Solution (sodium chloride: 0.15 g/mL) were admixed over 135 sec at 34 mL/min. As an aging step, one minute later, gelatin aqueous solution G-1 (120 mL of $H_2O$, 20 g of Gelatin 1, 7 mL of 1 N solution of NaOH, and 1.7 g of NaCl) was added. The temperature was raised to 75° C. over 15 min, and aging was conducted for 10 min. Next, as a growth process, 466 mL of A-3 Solution (silver nitrate 0.4 g/mL) was added at a flow rate increasing linearly from 5.0 mL/min to 9.5 mL/min. At the time, M-4 Solution (sodium chloride: 0.15 g/mL) was added while maintaining a silver potential of 120 mV. Further, 142 mL of A-4 Solution (silver nitrate 0.4 g/mL) was added at a flow rate increasing linearly from 5.0 mL/min to 7.4 mL/min, and M-5 Solution (sodium chloride: 0.14 g/mL) was simultaneously added such that the silver potential decreased linearly from 120 mV to 100 mV.

Subsequently, desalting was conducted at 40° C. by precipitation and water washing. A 130 g quantity of Gelatin 1 was added, the emulsion was redispersed, the pH was adjusted to 6.0, and the pAg was adjusted to 7.0.

A portion of the emulsion was collected and a replica of the grains was observed by transmission electron microscope

TABLE 8

| Sample No. | Emulsion | Grain thickness (μm) | Polymer of the present invention | Sensitivity | Pressure durability | Granularity | Note |
|---|---|---|---|---|---|---|---|
| 401 | C-1 | 0.20 | No | 100 | 0.28 | 100 | Comparative |
| 402 | C-2 | 0.10 | No | 100 | 0.31 | 88 | Comparative |
| 403 | C-3 | 0.07 | No | 105 | 0.35 | 77 | Comparative |
| 404 | C-4 | 0.20 | WP-1a | 100 | 0.10 | 100 | Invention |
| 405 | C-5 | 0.10 | WP-1a | 100 | 0.11 | 88 | Invention |
| 406 | C-6 | 0.07 | WP-1a | 105 | 0.11 | 77 | Invention |
| 411 | C-1 | 0.20 | No | 85 | — | 137 | After dissolution and passage of time |
| 412 | C-2 | 0.10 | No | 83 | — | 142 | |
| 413 | C-3 | 0.07 | No | 87 | — | 174 | |
| 414 | C-4 | 0.20 | WP-1a | 99 | — | 102 | |
| 415 | C-5 | 0.10 | WP-1a | 99 | — | 102 | |
| 416 | C-6 | 0.07 | WP-1a | 103 | — | 105 | |

photographic image (TEM image). This revealed that 95.1 percent of the total projected area measured for the silver halide grains consisted of tabular grains in which the principal faces were the {100} faces, and that grains A with an average grain size of 0.94 [micrometers], an average grain thickness of 0.180 micrometer, an average aspect ratio of 5.1, an average adjacent edge ratio of 1.15, and a cubic conversion edge length of 0.500 micrometer had been obtained.

(Preparation of Emulsion B: <{100} Silver Halide Tabular Grains Cub=0.505 Micrometer [$AgCl_{98.6}Br_1I_{0.4}$]>)

In the preparation of Emulsion A, 459 mL of A-3 Solution was added while increasing the flow rate of from 5.0 mL/min to 9.5 mL/min in linear fashion. During this period, M-4 Solution was simultaneously added to maintain a silver potential of 120 mV. Subsequently, 142 mL each of A-4 Solution and P-7 Solution were added while linearly increasing the flow rate from 5.0 mL/min to 7.4 mL/min. M-5 Solution was simultaneously added to linearly increase the silver potential from 120 mV to 100 mV. Subsequently, A-5 Solution (0.08 g/mL of silver nitrate) and P-8 Solution (0.056 g/mL of potassium bromide) were added over 1 min at a rate of 35.5 mL/min. All other aspects were identical to the method of preparing Emulsion A. In the grains B obtained in this manner, 95.2 percent of the total projected area measured for the silver halide grains consisted of tabular grains in which the principal faces were the {100} faces. The average grain size was 0.94 micrometer, the average grain thickness was 0.185 micrometer, the average aspect ratio was 5.1, the average adjacent edge ratio was 1.14, and the cubic conversion edge length was 0.505 micrometer.

(Preparation of Emulsion C: <{111} Silver Halide Tabular Grains Cub=0.450 Micrometer [AgCl]>)

To a reaction vessel were charged 1.2 L of $H_{20}$, 1.0 g of sodium chloride, and 2.5 g of Gelatin 1. While maintaining the vessel at 30° C. and with vigorous stirring, a silver nitrate aqueous solution (B-1 Solution: silver nitrate 0.24 g/mL) and a sodium chloride aqueous solution (N-1 Solution: a mixture of sodium chloride 0.083 g/mL and inactive gelatin 0.01 g/mL) were added over 1 min at 75 mL/min. One minute after completion of the addition, 20 mL of an aqueous solution (K-1) comprising 0.9 mmol of crystal phase controlling agent (3) of the present invention were added. One minute later, 340 mL of a 10 percent aqueous solution (HG-1) of Gelatin 2 of Example 5 and 2.0 g of sodium chloride were added. Over the next 25 min, the temperature of the reaction vessel was raised to 55° C. and aging was conducted for 30 min at 55° C. As a growth step, 524 mL of B-2 Solution (0.4 g/mL of silver nitrate) and 451 mL of N-2 Solution (0.17 g/mL of sodium chloride) were added at an accelerating flow rate over 27 min. During this period, 285 mL of an aqueous solution (K-2) comprising 2.1 mmol of crystal phase controlling agent 1 were simultaneously added at the accelerated flow rate (in proportion to the quantity of silver nitrate being added). Further, 142 mL of B-3 Solution (0.4 g/mL of silver nitrate) was added while linearly increasing the flow rate from 10.0 mL/min to 15 mL/min. N-3 Solution (sodium chloride 0.14 g/mL) was simultaneously added to linearly decrease the silver potential from 100 mV to 85 mV.

Subsequently, precipitation and water washing were conducted at 30° C. and desalting was performed. A 130 g quantity of Gelatin 1 was then added and the pH was adjusted to 6.3 and the pAg to 7.2. In Emulsion C obtained in this manner, 98.2 percent of the total projected area consisted of tabular grains in which the principal faces were the{111} faces with an average aspect ratio of 2 or more. The average grain size was 0.97 micrometer, the average grain thickness was 0.123 micrometer, the average aspect ratio was 7.2, and the cubic conversion edge length was 0.450 micrometer.

(Preparation of Emulsion D: <{111} Silver Halide Tabular Grains Cub=0.452 Micrometer [$AgCl_{98.6}Br_1I_{0.4}$]>)

In the preparation of Emulsion D, 516 mL of B-2 Solution and 445 mL of N-2 Solution were added at an accelerating flow rate over 27 min. During this period, 280 mL of K-2 Solution were simultaneously added at the accelerated flow rate (in proportion to the quantity of silver nitrate added). Further, 142 mL of B-3 Solution and P-7 Solution were added while linearly increasing the flow rate from 10.0 mL/min to 15 mL/min. Simultaneously, N-3 Solution was added so that the silver potential decreased linearly from 100 mVto 85 mV. Subsequently, B-4 Solution (silver nitrate 0.08 g/mL) and P-8 Solution were added over 1 min at 35.5 mL/min. All other aspects were identical to the method of preparing Emulsion G. In the grains D obtained in this manner, 97.6 percent of the total projected area measured for the silver halide grains consisted of tabular grains in which the principal faces were the {111} faces. The average grain size was 0.92 micrometer, the average grain thickness was 0.139 micrometer, the average aspect ratio was 6.7, and the cubic conversion edge length was 0.452 micrometer.

The chemical and spectral sensitization of Emulsions A to D will be described. All of these emulsions were prepared by adding $9.6\times10^{-5}$ mol/mol Ag of a gold sensitizing agent (colloidal gold sulfide) and a total of $1.7\times10^{-4}$ mol/mol Ag of red-sensitive spectral sensitizing dyes G and H, optimizing chemical and spectral sensitization at 60° C., and adding 5.9 $\times10^{-4}$ mol/mol Ag of 1-(3-methyl-ureidophenyl)-5-mercapto-tetrazole (referred to hereinafter as "Compound 4").

Sensitizing dye G

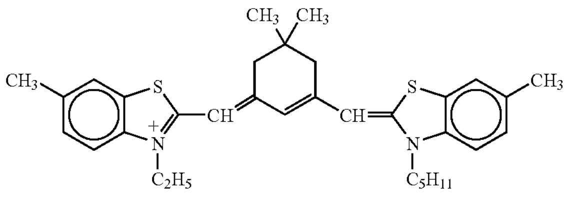

I''

Sensitizing dye H

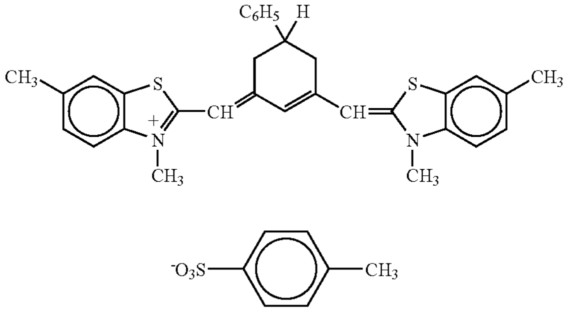

The surface of a support obtained by coating paper on both sides with polyethylene resin was treated by corona discharge, a gelatin undercoating layer comprising sodium dodecylbenzene sulfonate was provided, and photographic structural layers 1 to 7 were sequentially coated to prepare Sample 801 in the form of a silver-halide color photography light-sensitive material with the layer structure indicated below. The coating solutions of each of the photographic structural layers were prepared as follows.

Preparation of Layer 1 Coating Solution

A 57 g quantity of yellow coupler (ExY), 7 g of color stabilizer (Cpd-1), 4 g of color stabilizer (Cpd-2), 7 g of color stabilizer (Cpd-3), and 2 g of color stabilizer (Cpd-8) were dissolved in 21 g of solvent (SolV-1) and 80 mL of ethyl acetate. This solution was emulsified and dispersed with a high-speed stirring emulsifier (Dissolver) in 220 g of 23.5 weight percent gelatin aqueous solution comprising 4 g of sodium dodecylbenzene sulfonate, and water was added to prepare 900 g of emulsified dispersion A.

Additionally, emulsified dispersion A and emulsion Awere mixed and dissolved and a layer 1 coating solution of the composition given below was prepared. The emulsion coating amount is given as a coating amount based on silver.

The coating solutions for layers 2 to 7 were prepared by the same method as the layer 1 coating solution. The gelatin hardeners employed in the various layers were: 1-oxy-3,5-dichloro-s-triazine sodium salts (Ha-1), (Ha-2), and (Ha-3). (Ab-1), (Ab-2), (Ab-3) and (Ab-4) were added in total quantities of 15.0 mg/m$^2$, 60.0 mg/m$^2$, 5.0 mg/m$^2$, and 10.0 mg/m$^2$.

Ha-1

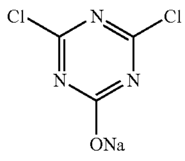

1.4 weight % based on the weight of the gelatin

Ha-2

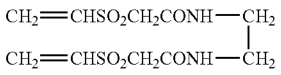

Ha-3

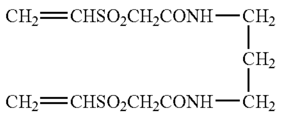

Ab-1

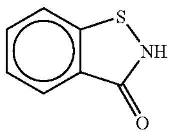

Ab-2

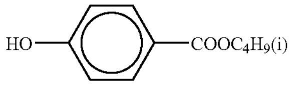

Ab-3

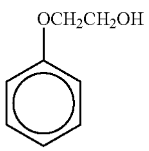

-continued

Ab-4

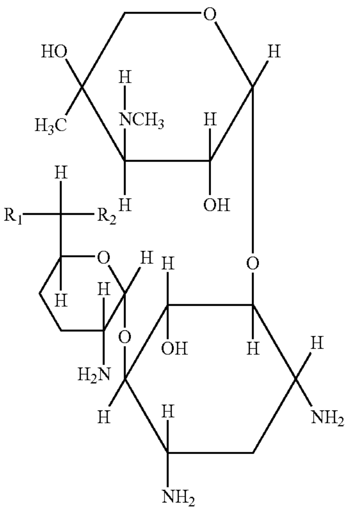

a, b, c, d = 1:1:1:1 (molar ratio)

| | $R^1$ | $R^2$ |
|---|---|---|
| a | —$CH_3$ | —$NHCH_3$ |
| b | —$CH_3$ | —$NH_2$ |
| c | —H | —$NH_2$ |
| d | —H | —$NHCH_3$ |

The various spectral sensitizing dyes given below were employed in the silver iodobromide emulsions of the various light-sensitive emulsion layers.

The Blue-Sensitive Emulsion Layer

Sensitizing dye A

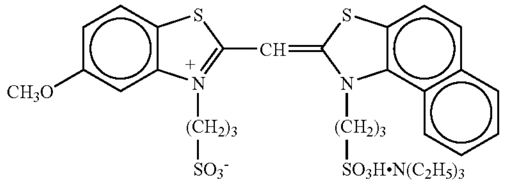

Sensitizing dye B

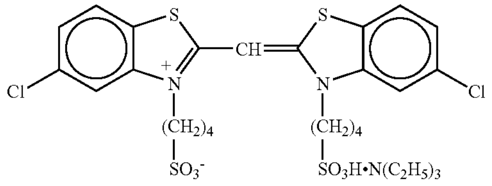

Sensitizing dye C

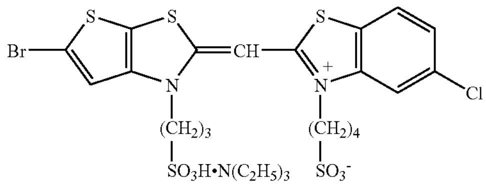

-continued

Crystal habit

Controlling agent 1

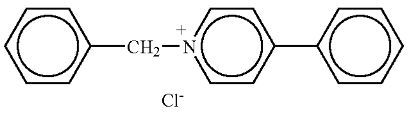

(Sensitizing dyes A and C were added in a proportion of 0.42 $\times 10^{-4}$ mol per mol of silver halide. Further, sensitizing dye B was added in a proportion of $3.4\times10^{-4}$ mol per mol of silver halide.)

The Green-Sensitive Emulsion Layer

Sensitizing dye D

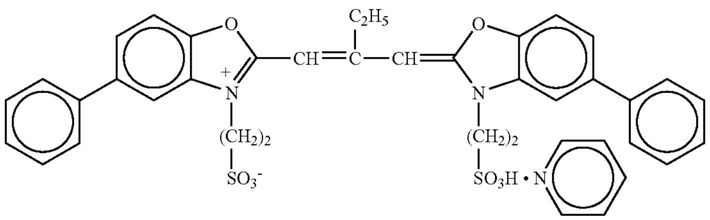

Sensitizing dye E

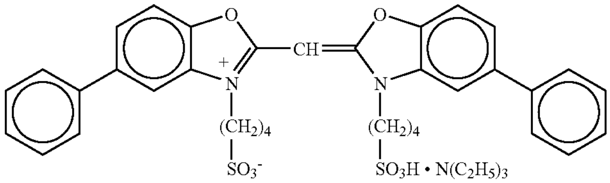

Sensitizing dye F

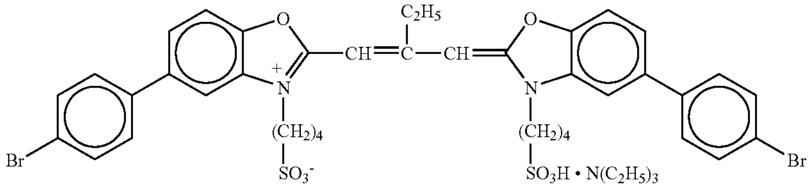

(Sensitizing dye D was added, per mol of silver halide, in a proportion of $3.0\times10^{-4}$ mol to large-size Emulsion F and in a proportion of $3.6\times10^{-4}$ mol to small-size Emulsion G. Sensitizing dye E was added, per mol of silver halide, in a proportion of $4.0\times10^{-5}$ mol to large-sized emulsions and in a proportion of $7.0\times10^{-5}$ mol to small-sized emulsions. Sensitizing dye F was added, per mol of silver halide, in a proportion of $2.0\times10^{-4}$ mol to large-sized emulsions and in a proportion of $2.8\times10^{-4}$ mol to small-sized emulsions.)

The Red-Sensitive Emulsion Layer (Sensitizing dyes G and H were added in a proportion of 1.1 $\times10^{-4}$ mol per mol of silver halide to small-sized Emulsion H.)

(Further, Compound 1 below was added in a proportion of $3.0\times10^{-3}$ mol per mol of silver halide to red-sensitive emulsion layers.)

Compound I

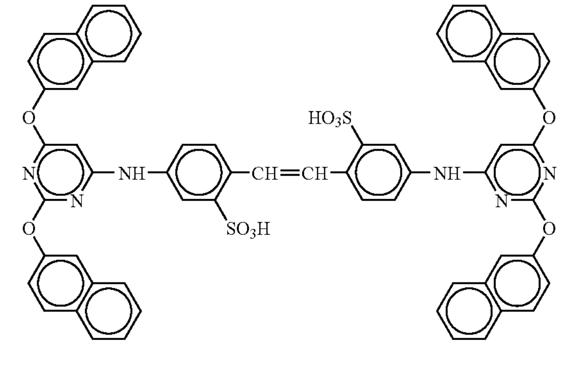

Further, 1-(3-methylureidophenyl)-5-mercaptotetrazole was added in proportions of $3.3\times10^{-4}$ mol, $1.0\times10^{-3}$ mol, and $5.9\times10^{-4}$ mol per mol of silver halide to blue-sensitive emulsion layers, green-sensitive emulsion layers, and red-sensitive emulsion layers, respectively.

Additions of 0.2 mg/$m^2$, 0.2 mg/$m^2$, 0.6 mg/$m^2$, and 0.1 mg/$m^2$ were made to layers 2, 4, 6, and 7.

Further, 4-hydroxy-6-methyol-1,3,3a,7-tetrazaindene was added in proportions of $1\times10^{-4}$ mol and $2\times10^{-4}$ mol per mol of silver halide to blue-sensitive emulsion layers and green-sensitive emulsion layers.

Further, 0.05 g/$m^2$ of a copolymer latex of methacrylic acid and methyl acrylate (weight ratio 1:1, average molecular weight 200,000 to 400,000) was added to red-sensitive emulsion layers.

Disodium catechol-3,5-disulfonate was added in proportions of 6 mg/$m^2$, 6 mg/$m^2$, and 18 mg/$m^2$ to layers 2, 4, and 6, respectively.

The following dyes were added to prevent irradiation (numbers in parentheses denote coating amounts).

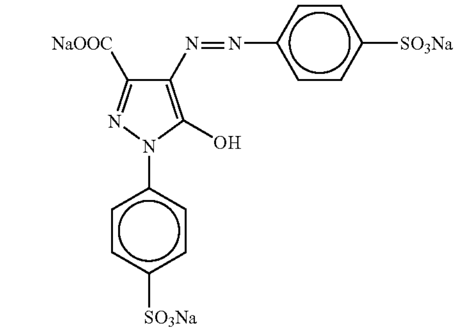

($2 mg/m^2$)

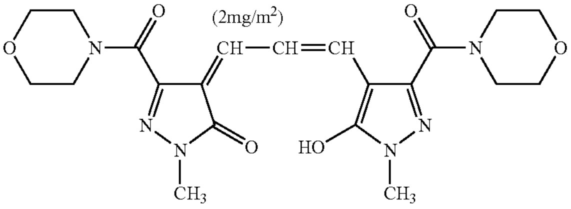

($2 mg/m^2$)

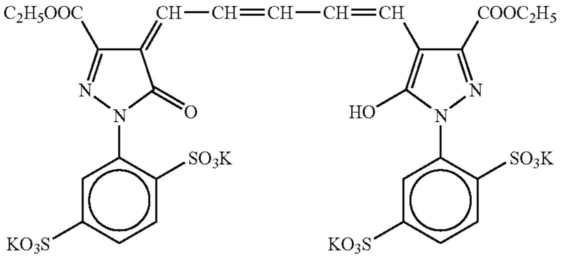

($3 mg/m^2$)

-continued

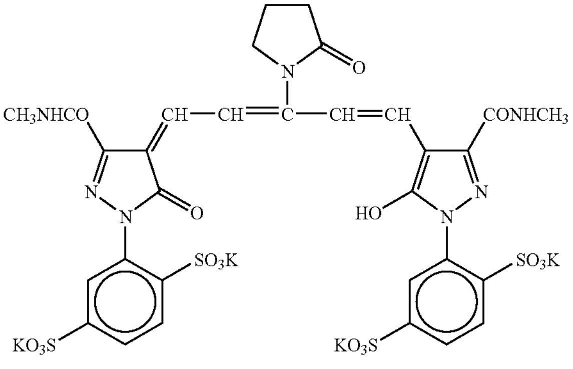

($7 mg/m^2$)

(The Layer Structure)

The configuration of the various layers is given below. Numbers denote coating amounts ($g/m^2$). Silver halide emulsion coating amounts are based on silver.

Support

Polyethylene Resin Laminate Paper comprising on the layer 1 side white dyes (a $TiO_2$ content of 16 weight percent and a ZnO content of 4 weight percent), a fluorescent whitener (4,4'-bis (5-methylbenzooxazolyl) stilbene content of 0.03 weight percent), and a blue dye (ultramarine)

| | |
|---|---|
| Layer 1 (Green-sensitive emulsion layer) | |
| Silver iodobromide emulsion E (cubic, average grain size 0.74 micrometer, variation coefficient in grain size distribution 0.08; an emulsion in which 0.3 molar percent of silver bromide is locally incorporated on a portion of the grain surface serving as the substrate of the silver chloride) | 0.24 |
| Gelatin | 1.25 |
| Yellow coupler (ExY) | 0.57 |
| Color stabilizer (Cpd-1) | 0.07 |
| Color stabilizer (Cpd-2) | 0.04 |
| Color stabilizer (Cpd-3) | 0.07 |
| Color stabilizer (Cpd-8) | 0.02 |
| Solvent (SolV-1) | 0.21 |
| Layer 2 (Color mixture preventing layer) | |
| Gelatin | 0.99 |
| Color mixture blocking agent (Cpd-4) | 0.09 |
| Color stabilizer (Cpd-5) | 0.018 |
| Color stabilizer (Cpd-6) | 0.13 |
| Color stabilizer (Cpd-7) | 0.01 |
| Solvent (SolV-1) | 0.06 |
| Solvent (SolV-2) | 0.22 |
| Layer 3 (Green-sensitive emulsion layer) | |
| Silver chloroiodobromide emulsion (Gold sulfide sensitized cube, 1:3 | 0.14 |

-continued

| | |
|---|---|
| mixture (silver mole ratio) of large-sized Emulsion F with average grain size of 0.45 micrometer, small-sized Emulsion G with average grain size of 0.35 micrometer. Coefficients of variation in grain size distribution are 0.10 and 0.08, respectively. Both sizes of emulsion contain 0.15 molar percent of silver iodide in the vicinity of the grain surface and 0.4 molar percent of silver bromide locally on the grain surface.) | |
| Gelatin | 1.36 |
| Magenta coupler (ExM) | 0.15 |
| Ultraviolet absorbant (UV-A) | 0.14 |
| Color stabilizer (Cpd-2) | 0.02 |
| Color stabilizer (Cpd-4) | 0.002 |
| Color stabilizer (Cpd-6) | 0.09 |
| Color stabilizer (Cpd-8) | 0.02 |
| Color stabilizer (Cpd-9) | 0.03 |
| Color stabilizer (Cpd-10) | 0.01 |
| Color stabilizer (Cpd-11) | 0.0001 |
| Solvent (SolV-3) | 0.11 |
| Solvent (SolV-4) | 0.22 |
| Solvent (SolV-5) | 0.20 |
| Layer 4 (Color mixture preventing layer) | |
| Gelatin | 0.71 |
| Color mixture blocking agent (Cpd-4) | 0.06 |
| Color stabilizer (Cpd-5) | 0.013 |
| Color stabilizer (Cpd-6) | 0.10 |
| Color stabilizer (Cpd-7) | 0.007 |
| Solvent (SolV-1) | 0.04 |
| Solvent (SolV-2) | 0.16 |
| Layer 5 (Red-sensitive emulsion layer) | |
| Chloroiodobromide emulsion (A 5:5 mixture (molar ratio) of Emulsion A and small-sized Emulsion H with an average grain size of 0.30 micrometer in the form of a gold sulfide sensitized cube. The coefficients of variation in grain size distribution were 0.09 and 0.11, respectively. Emulsion H contained 0.1 molar percent of silver iodide in the vicinity of the grain surface and 0.8 molar percent of silver bromide locally on the grain surface.) | 0.12 |
| Gelatin | 1.11 |
| Cyano coupler (ExC-2) | 0.13 |
| Cyan coupler (ExC-3) | 0.03 |
| Color stabilizer (Cpd-1) | 0.05 |
| Color stabilizer (Cpd-6) | 0.06 |
| Color stabilizer (Cpd-7) | 0.02 |
| Color stabilizer (Cpd-9) | 0.04 |
| Color stabilizer (Cpd-10) | 0.01 |
| Color stabilizer (Cpd-14) | 0.01 |
| Color stabilizer (Cpd-15) | 0.12 |
| Color stabilizer (Cpd-16) | 0.03 |
| Color stabilizer (Cpd-17) | 0.09 |
| Color stabilizer (Cpd-18) | 0.07 |
| Solvent (SolV-5) | 0.15 |
| Solvent (SolV-8) | 0.05 |
| Layer 6 (Ultraviolet absorbing layer) | |
| Gelatin | 0.46 |
| Ultraviolet absorbant (UV-B) | 0.45 |
| Compound (S1-4) | 0.0015 |
| Solvent (SolV-7) | 0.25 |
| Layer 7 (Protective layer) | |
| Gelatin | 1.00 |
| Acrylic modified copolymer of polyvinyl alcohol (modification degree 17 percent) | 0.04 |
| Liquid paraffin | 0.02 |
| Surfactant (Cpd-13) | 0.01 |

-continued
(ExY)
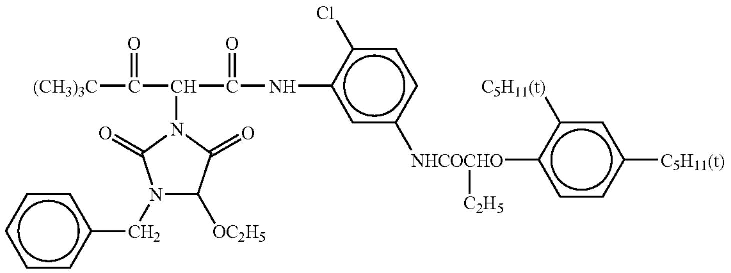
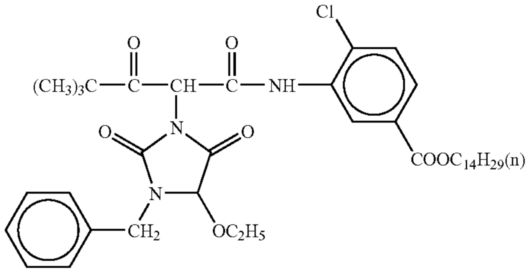
70:30 mixture (molar ratio)
(ExM)
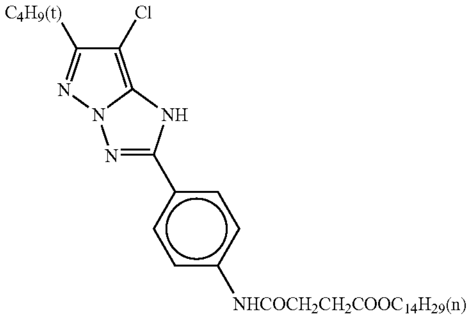
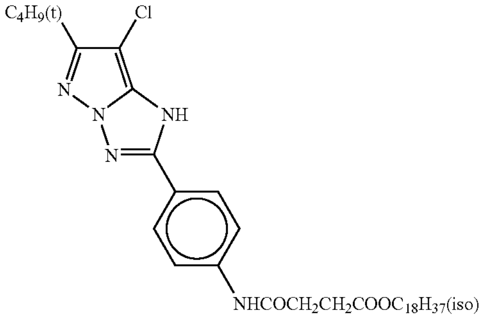
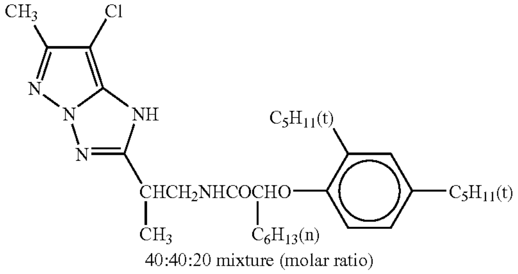
40:40:20 mixture (molar ratio)

-continued
ExC-a
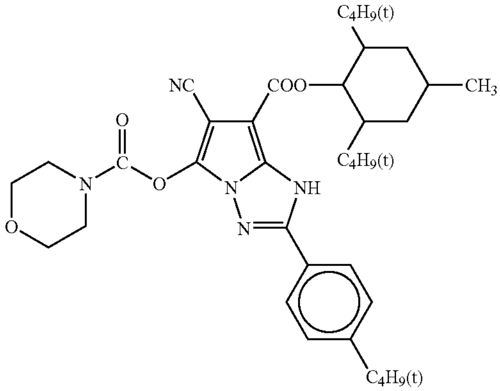
ExC-b
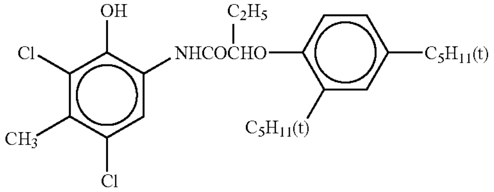
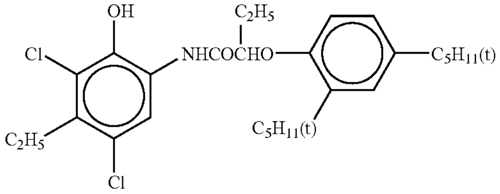
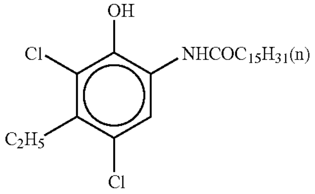
50:25:25 mixture (molar ratio)
(Cpe-1)
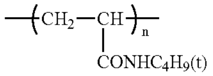
Mn = 60,000
(Cpe-2)
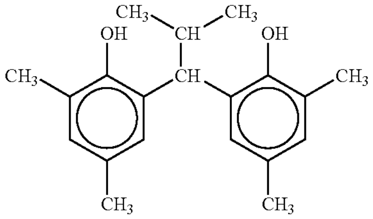
(Cpe-3)
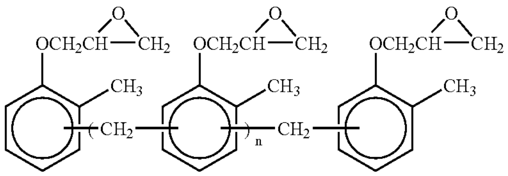
n = 7~8 (average)

-continued
(Cpe-4)
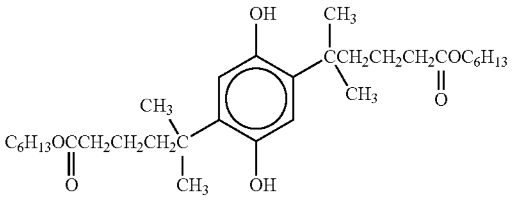
(Cpe-5)
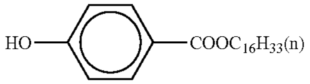
(Cpe-6)
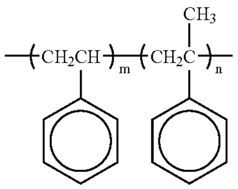
Mn = 600
m/n = 10/90
(Cpe-7)
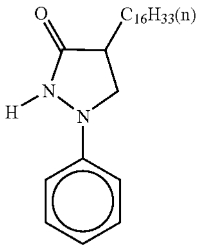
(Cpe-8)
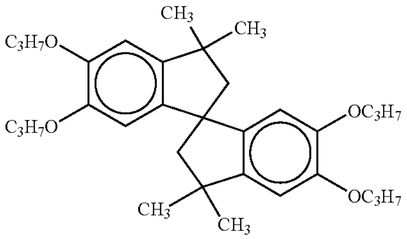
(Cpe-9)
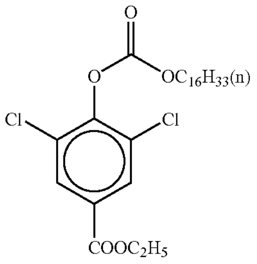
(Cpe-10)
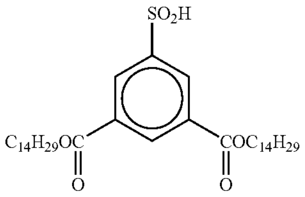

-continued
(Cpe-11)
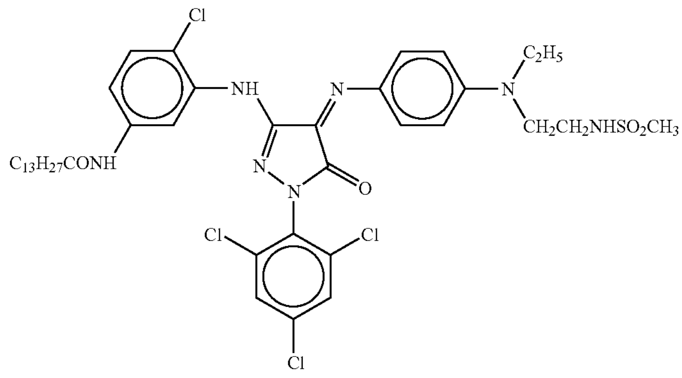
(Cpe-13)
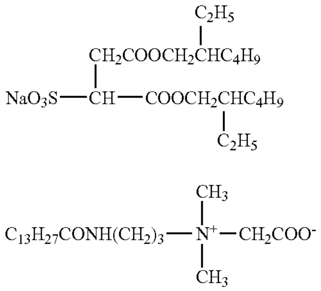
7:3 mixture (molar ratio)
(Cpe-14)
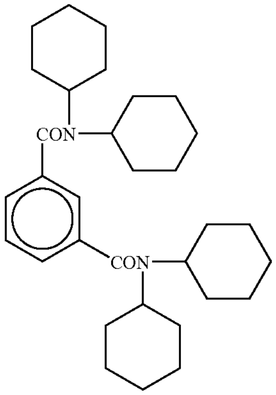
(Cpe-15)
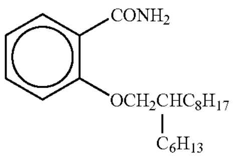
(Cpe-16)
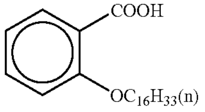
(Cpe-17)
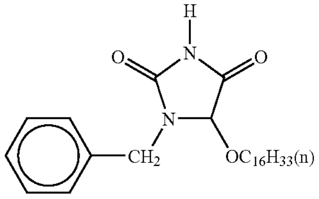

-continued
(Cpe-18)
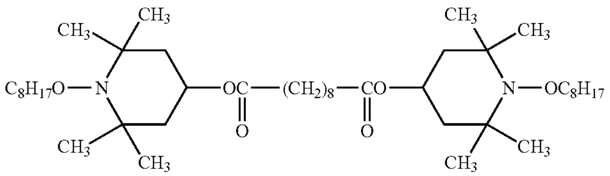
(Cpe-19)
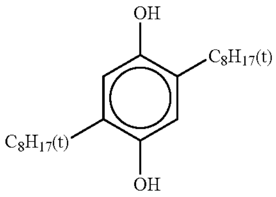
(UVa-1)
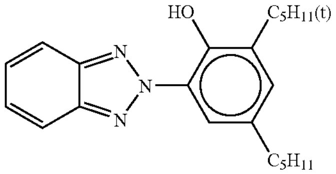
(UVa-2)
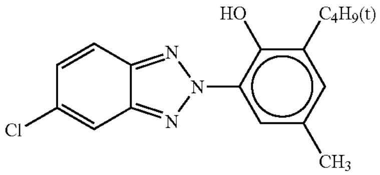
(UVa-3)
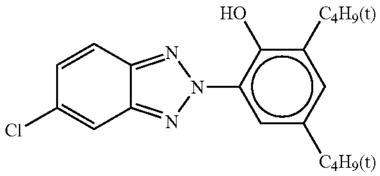
(UVa-4)
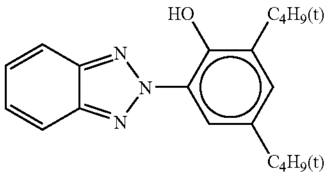
(UVa-5)
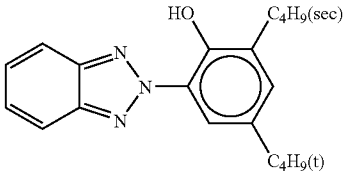
(UVa-6)
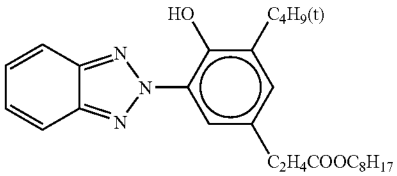

-continued (UVa-7)

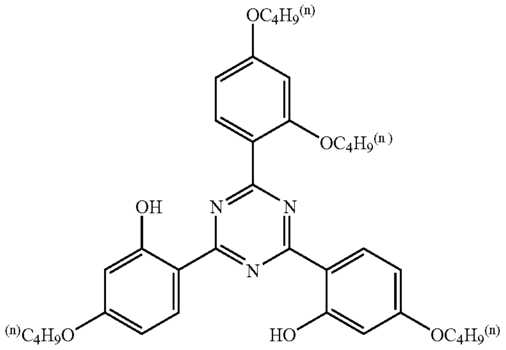

(Solv-1)

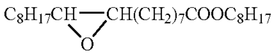

(Solv-2)

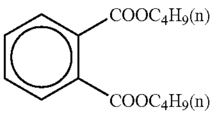

(Solv-3)

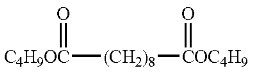

(Solv-4)

$O{=}P{-}(OC_6H_{13}(n))_3$ (Solv-5)

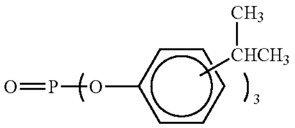

(S1-4)

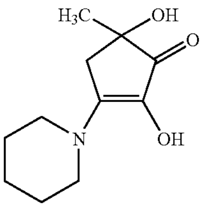

(Solv-7)

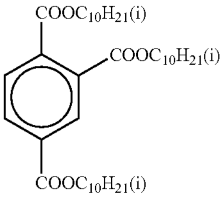

(Solv-8)

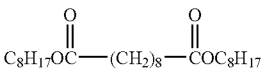

(Preparation of Samples 602 to 604)

Similarly, Emulsions B to D were modified to achieve silver contents identical to that of Emulsion A in Sample 601 and Samples 602 to 604 were prepared.

Samples 601 to 604 were processed into rolls 127 mm in width and a sensitometric gradient exposure was conducted using a Minilab Printer Processor PP1258AR made by Fuji Photo Film Co., Ltd. An SP-1 filter was installed and five-second exposure was conducted. Color development was conducted using the processing steps and solution described in Example 5 of JP-A-2001-42481.

Evaluation of Granularity Deterioration Due to Grain Aggregation During Coating (Preparation of Samples 611 to 614)

The various emulsions of layer 5 in Samples 601 to 604 were dissolved at 40° C., and after 8 hours had elapsed, Samples 611 and 614 were prepared under identical coating conditions.

(Preparation of Samples 621 to 624)

Emulsions A' to D' were prepared in the same manner as Emulsions A to D with the exception that 17 mg of mercapto group-comprising Polymer WP-3a was added with above-described Compound 4 at the end of chemical sensitization. Coating samples were prepared from Emulsions A' to D' as recorded above and from the emulsions following dissolution and the passage of time. The emulsions were changed to Emulsions A' to D' such that the same quantities of silver were present as in Emulsion A of Sample 801, and the emulsions were dissolved at 40° C. and left for 8 hours, after which Samples 621 to 624 were prepared.

The aggregation-preventing effect of the tabular grains will be described.

The cross-sections of the multilayer light-sensitive materials of Samples 611 to 614 and Samples 621 to 624 were photographed by scanning electron microscopy, and the dispersion properties of the tabular grains in layer 5 were observed and evaluated. The above-mentioned cross-sectional photographs were taken at a magnification of 300 times and the average number of aggregates per visual field was calculated from the cross-sectional photographs of five or more visual fields. Here, the term aggregate is used to mean a state where three or more tabular grains adhered together by their principal surfaces.

Observation revealed that the number of aggregates of Samples 621 to 624 employing the mercapto group-comprising polymer was clearly lower than that of Samples 611 to 614 in which the mercapto group-containing polymer was not employed.

Example 9

Emulsion Preparation and Evaluation (Gelatin Preparation)

Gelatins 1 to 4 below that were employed as dispersion media in emulsion preparation had the following characteristics.

Gelatin 1: An ordinary alkali-treated ossein gelatin obtained from starting materials in the form of cattle bones. No chemical modification of $-NH_2$ groups in the gelatin.

Gelatin 2: Succinic anhydride was added under conditions of a temperature of 50° C. and a pH of 9.0 to an aqueous solution of Gelatin 1, a chemical reaction was conducted, the residual succinic acid was removed, and the product was dried to obtain gelatin. The proportion of the number of $-NH_2$ groups in the gelatin that were chemically modified was 95 percent.

Gelatin 3: Trimellitic anhydride was added under conditions of a temperature of 50° C. and a pH of 9.0 to an aqueous solution of Gelatin 1, a chemical reaction was conducted, the residual trimellitic acid was removed, and the product was dried to obtain gelatin. The proportion of the number of $-NH_2$ groups in the gelatin that were chemically modified was 95 percent.

Gelatin 4: Gelatin 1 was subjected to the action of an enzyme to lower the molecular weight. Once an average molecular weight of 15,000 had been reached, the enzyme was deactivated and the product was dried to obtain gelatin. There was no chemical modification of the $-NH_2$ groups in the gelatin.

Above-described Gelatins 1 to 4 were all deionized and adjusted to pH 6.0 in a 5 percent aqueous solution at 35° C.

Emulsion Em-K1 was prepared by the following method.

(Preparation of Seed Emulsion 1)

A 1,164 mL quantity of an aqueous solution comprising 0.017 g of KBr and 0.4 g of Gelatin 4 was maintained at 30° C. with stirring. An $AgNO_3$ (1.6 g) aqueous solution, a KBr aqueous solution, and Gelatin 4 (2.1 g) aqueous solution were added over 30 sec by the triple jet method. The concentration of the $AgNO_3$ solution was 0.2 mol/L. At the time, the silver potential was maintained at 15 mV relative to a saturated calomel electrode. A KBr aqueous solution was added, the silver potential was adjusted to −60 mV, and the temperature was raised to 75° C. A 21 g quantity of Gelatin 2 was added. An $AgNO_3$ (206.3 g) aqueous solution and a KBr aqueous solution were added over 61 min at an accelerating flow rate by the double jet method. At the time, the silver potential was maintained at −40 mV relative to a saturated calomel electrode. After desalting, Gelatin 2 was added and the mixture was adjusted to pH 5.8 at 40° C. and pAg 8.8 to prepare Seed Emulsion 1. The emulsion comprised tabular grains with an average diameter as circle of 1.60 micrometers, a variation coefficient in diameter as circle of 22 percent, and an average thickness of 0.043 micrometer.

(Preparation of Host Tabular Particulate Emulsion 2)

A 1,200 mL quantity of an aqueous solution comprising 134 g of Seed Emulsion 1, 1.9 g of KBr, and 22 g of Gelatin 2 was maintained at 75° C. with stirring. An $AgNO_3$ (137.5 g) aqueous solution, a KBr aqueous solution, and an oxidation-treated gelatin aqueous solution with a molecular weight of 20,000 were mixed immediately prior to addition in a separate chamber of the magnetic coupling induction stirrer described in JP-A-10-43570 and then added over 25 min. At the time, the silver potential was maintained at −40 mV relative to a saturated calomel electrode. Subsequently, an $AgNO_3$ (30.0 g) aqueous solution, a KBr aqueous solution, and a preprepared AgI ultramicroparticulate emulsion were added at a constant flow rate over 30 min by the triple jet method. The quantity of AgI ultramicroparticulate emulsion added was adjusted to have a silver iodide content of 15 molar percent. The AgI ultramicroparticulate emulsion had a diameter as circle of 0.03 micrometer and a variation coefficient in diameter as circle of 17 percent. A dispersion gelatin employing Gelatin 3 was used. At the time, the silver potential was maintained at −20 mV relative to a saturated calomel electrode. Subsequently, an $AgNO_3$ aqueous solution (36.4 g), a KBr aqueous solution, and the above-described preprepared AgI ultramicroparticulate emulsion were added at a constant flow rate over 40 min. The quantity of AgI ultramicroparticulate emulsion added was adjusted to achieve a silver iodide content of 15 molar percent. At the time, the silver potential was maintained at +80 mV relative to a saturated calomel electrode. The usual water washing was conducted, Gelatin 1 was added, the pH was adjusted to 5.8 at 40° C., and the pBr was adjusted to 4.0. This emulsion was denoted as host tabular particulate emulsion 2. In Emulsion 2, more than 90 percent of the total projected area of the grains had a diameter as circle of 3.0 micrometers and a thickness of 0.07 micrometer or less. Observation at low temperature by transmission electron microscopy revealed the complete absence of dislocation lines in at least 90 percent of the total projected area of the grains.

(Epitaxial Part Formation and Chemical Sensitization)

Host tabular particulate Emulsion 2 was dissolved at 40° C. and an epitaxial part was formed by the method described in JP-A-2001-235821. When growing the epitaxial part, sensitizing dyes were added at a ratio of 80 percent of the quantity of saturated coating at a molar ratio of 6:3:1 of Sensitizing Dyes ExS'-9, 10, and 11, described below, prior to the formation of the epitaxial part. The sensitizing dyes were employed in the form of the solid microdispersions prepared by the method described in JP-A-11-52507. The emulsion was heated to 50° C. and potassium thiocyanate, auric chloride, sodium thiosulfate, and N,N-dimethylselenourea were added to optimize chemical sensitization. Antifogging agent ExA'-1 and ExA'-2 were added in proportions of $2\times10^{-5}$ mole and $6\times10^{-6}$ mol, after which Compound ExA'-3 was added in a proportion of $5\times10^{-4}$ mol to end chemical sensitization.

ExA'-1

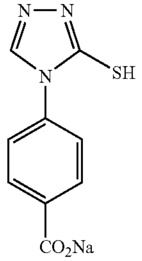

-continued

ExA'-2

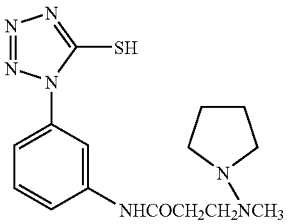

ExA'-3

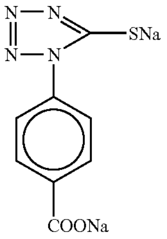

The table below gives the grain characteristics of Emulsion Em-K1 and Emulsions Em-A to O employed in other multilayer color light-sensitive material emulsions.

TABLE 9

| Emulsion | Layer to be added | Shape of the grain | Average diameter as sphere (μm) | Average diameter as sphere (μm) Variation coefficient (%) | Average thickness (μm) Variation coefficient (%) | Average aspect ratio | Percentage of total grain projected area that is constituted by the tabular grains (%) |
|---|---|---|---|---|---|---|---|
| Em-A | High-sensitivity blue-sensitive layer | (111) main face average grain | 1.6 | 5.2<br>26 | 0.101<br>29 | 51 | 97 |
| Em-B | Low-sensitivity blue-sensitive layer | (111) main face average grain | 0.9 | 2.3<br>19 | 0.092<br>23 | 25 | 99 |
| Em-C | Low-sensitivity blue-sensitive layer | (111) main face average grain | 0.5 | 0.9<br>18 | 0.103<br>19 | 8.7 | 99 |
| Em-D | Low-sensitivity blue-sensitive layer | (100) main face cubic grains | 9 | 0.2<br>7 | 0.2<br>7 | 1 | 0 |
| Em-E | Layer imparting multilayer effect to red-sensitive layer | (111) main face average grain | 1.1 | 3.0<br>18 | 0.099<br>16 | 30 | 96 |
| Em-F | High-sensitivity green-sensitive layer | (111) main face average grain | 1.2 | 6.0<br>18 | 0.032<br>16 | 188 | 99 |
| Em-G | Intermediate-seisitivity green-sensitive layer | (111) main face average grain | 0.9 | 3.8<br>23 | 0.034<br>17 | 112 | 99 |
| Em-H | Low and Intermediate-seisitivity green-sensitive layer | (111) main face average grain | 0.6 | 1.8<br>20 | 0.044<br>13 | 41 | 99 |
| Em-I | Low-sensitivity green-sensitive layer | (111) main face average grain | 0.5 | 1.2<br>21 | 0.058<br>13 | 21 | 97 |
| Em-J | Low-sensitivity green-sensitive layer | (111) main face average grain | 0.4 | 1.0<br>17 | 0.043<br>12 | 23 | 96 |
| Em-K | High-sensitivity red-sensitive layer | (111) main face average grain | 1.2 | 4.3<br>18 | 0.057<br>15 | 75 | 99 |
| Em-L | Intermediate-seisitivity red-sensitive layer | (111) main face average grain | 0.9 | 3.6<br>23 | 0.038<br>16 | 95 | 99 |
| Em-M | Low and Intermediate-seisitivity red-sensitive layer | (111) main face average grain | 0.6 | 1.5<br>20 | 0.064<br>12 | 23 | 97 |
| Em-N | Low-sensitivity red-sensitive layer | (111) main face average grain | 0.4 | 0.9<br>17 | 0.053<br>11 | 17 | 96 |
| Em-O | Low-sensitivity red-sensitive layer | (111) main face average grain | 0.3 | 0.7<br>18 | 0.037<br>10 | 19 | 96 |

TABLE 10

| Emulsion | Feature of grains constituting 70% or more of the total projected area | Grain composition from center to surface (Ag content (%)) Epitaxial joint portion is shown in <> |
|---|---|---|
| Em-A | Dislocation lines densely present in fringe portion | (1%)AgBr/(10%)$AgBr_{90}I_{10}$/(60%)$AgBr_{85}I_{15}$/(12%)AgBr/(4%)AgI/(13%)AgBr |
| Em-B | Dislocation lines densely present in fringe portion | (1%)AgBr/(40%)$AgBr_{90}I_{10}$/(50%)$AgBr_{85}I_{15}$/(6%)AgBr/(3%)AgI/(19%)AgBr |
| Em-C | Dislocation lines densely present in fringe portion and main face | (15%)AgBr/(40%)$AgBr_{97}I_3$/(10%)AgBr/(2%)AgI/(33%)AgBr |
| Em-D | No dislocation lines present | (35%)AgBr/(25%)$AgBr_{90}I_{10}$/(1%)AgI/(39%)AgBr |
| Em-E | Dislocation lines densely present in fringe portion | (8%)AgBr/(35%)$AgBr_{97}I_3$/(15%)AgBr/(4%)AgI/(38%)AgBr |
| Em-F | Complete epitaxial joint of hexagonal tabular with six vertices presents | (7%)AgBr/(66%)$AgBr_{97}I_3$/(25%)$AgBr_{86}I_{14}$/(2%)<$AgBr_{60}Cl_{30}I_{10}$> |
| Em-G | Complete epitaxial joint of hexagonal tabular shape with six corners presents | (15%)AgBr/(67%)$AgBr_{97}I_3$/(15%)$AgBr_{93}I_7$/(3%)<$AgBr_{70}Cl_{25}I_5$> |
| Em-H | Complete epitaxial joint of hexagonal tabular shape with six corners presents | (15%)AgBr/(65%)$AgBr_{99}I_1$/(15%)$AgBr_{95}I_5$/(5%)<$AgBr_{80}Cl_{20}$> |
| Em-I | Complete epitaxial joint of hexagonal tabular shape with six corners presents | (82%)AgBr/(10%)$AgBr_{95}I_5$/(8%)<$AgBr_{75}Cl_{20}I_5$> |
| Em-J | Complete epitaxial joint of hexagonal tabular shape with a corner presents | (78%)AgBr/(10%)$AgBr_{95}I_5$/(12%)<$AgBr_{75}Cl_{20}I_5$> |
| Em-K | Complete epitaxial joint of hexagonal tabular shape with six corners presents | (7%)AgBr/(66%)$AgBr_{97}I_3$/(25%)$AgBr_{86}I_{14}$/(2%)<$AgBr_{60}Cl_{30}I_{10}$> |
| Em-L | Complete epitaxial joint of hexagonal tabular shape with six corners presents | (15%)AgBr/(67%)$AgBr_{97}I_3$/(15%)$AgBr_{93}I_7$/(3%)<$AgBr_{90}Cl_{25}I_5$> |
| Em-M | Complete epitaxial joint of hexagonal tabular shape with six corners presents | (15%)AgBr/(65%)$AgBr_{99}I_1$/(15%)$AgBr_{95}I_5$/(5%)<$AgBr_{80}Cl_{20}$> |
| Em-N | Complete epitaxial joint of hexagonal tabular shape with a corner presents | (78%)AgBr/(10%)$AgBr_{95}I_5$/(12%)<$AgBr_{75}Cl_{20}I_5$> |
| Em-O | Complete epitaxial joint of hexagonal tabular shape with a corner presents | (78%)AgBr/(10%)$AgBr_{95}I_5$/(12%)<$AgBr_{70}Cl_{20}I_{10}$> |

TABLE 11

| Emulsion | Average iodine content (mol %) Variation coefficient in grains (%) | Surface iodine content (mol %) | Average Cl content (mol %) Variation coefficient in grains (%) | Surface Cl content (mol %) | spacing of the two twin faces (μm) Variation coefficient (%) | Ratio of (100) face in the side face (%) |
|---|---|---|---|---|---|---|
| Em-A | 14<br>17 | 8 | 0 | 0 | 0.013<br>25 | 21 |
| Em-B | 12.5<br>22 | 7 | 0 | 0 | 0.011<br>18 | 32 |
| Em-C | 3.2<br>15 | 2 | 0 | 0 | 0.011<br>22 | 18 |
| Em-D | 3.5<br>8 | 0.9 | 0 | 0 | — | — |
| Em-E | 5.1<br>9 | 3.5 | 0 | 0 | 0.010<br>22 | 3 |
| Em-F | 5.7<br>9 | 12 | 0.6<br><10 | 2 | 0.008<br>18 | 8 |
| Em-G | 3.2<br>7 | 6 | 0.8<br><10 | 2 | 0.008<br>18 | 10 |
| Em-H | 1.4<br>7 | 4 | 1<br>10 | 3 | 0.008<br>18 | 12 |
| Em-I | 0.9<br>8 | 4 | 1.6<br><10 | 5 | 0.008<br>18 | 25 |
| Em-J | 1.1<br>8 | 4 | 2.4<br>8 | 7 | 0.008<br>18 | 17 |
| Em-K | 5.7<br>9 | 12 | 0.6<br><10 | 2 | 0.008<br>18 | 8 |
| Em-L | 3.2<br>7 | 6 | 0.8<br><10 | 2 | 0.008<br>18 | 10 |
| Em-M | 1.4<br>7 | 4 | 1<br><10 | 3 | 0.008<br>18 | 12 |
| Em-N | 1.1<br>8 | 4 | 2.4<br>8 | 7 | 0.008<br>18 | 17 |
| Em-O | 1.7<br>8 | 4 | 2.4<br>8 | 7 | 0.008<br>18 | 22 |

TABLE 12

| Emulsion | Sensitizing dye | Dopant |
|---|---|---|
| Em-A | ExS'-1,2 | $K_2IrCl_6$ |
| Em-B | ExS'-1,2 | $K_2IrCl_6$ |
| Em-C | ExS'-1,2 | $K_2RhCl_6$,$K_2InCl_6$ |
| Em-D | ExS'-1,2 | $K_2IrCl_6$ |
| Em-E | ExS'-3,4 | $K_2IrCl_6$,$K_2IrCl_5(H_2O)$,$K_4Fe(CN)_6$ |
| Em-F | ExS'-3,5,6,7,8 | $K_2IrCl_6$,$K_2IrCl_5(H_2O)$,$K_4Ru(CN)_6$ |
| Em-G | ExS'-3,5,6,7,8 | $K_2IrCl_6$,$K_2IrCl_5(H_2O)$,$K_4Ru(CN)_6$ |
| Em-H | ExS'-3,5,6,7,8 | $K_2IrCl_6$,$K_2IrCl_5(H_2O)$,$K_4Ru(CN)_6$ |
| Em-I | ExS'-3,5,6,7,8 | $K_2IrCl_6$,$K_2IrCl_5(H_2O)$,$K_4Ru(CN)_6$ |
| Em-J | ExS'-3,5,6,7,8 | $K_2IrCl_6$,$K_2IrCl_5(H_2O)$,$K_4Ru(CN)_6$ |
| Em-K | ExS'-9,10,11 | $K_2IrCl_6$$K_2IrCl_5(H_2O)$,$K_4Ru(CN)_6$ |
| Em-L | ExS'-9,10,11 | $K_2IrCl_6$,$K_2IrCl_5(H_2O)$,$K_4Ru(CN)_6$ |
| Em-M | ExS'-9,10,11 | $K_2IrCl_6$,$K_2IrCl_5(H_2O)$,$K_4Ru(CN)_6$ |
| Em-N | ExS'-9,10,11 | $K_2IrCl_6$,$K_2IrCl_5(H_2O)$,$K_4Ru(CN)_6$ |
| Em-O | ExS'-9,10,11 | $K_2IrCl_6$,$K_2IrCl_5(H_2O)$,$K_4Ru(CN)_6$ |

The emulsions shown in the tables above can be prepared by suitably selecting, combining, and/or varying the contents described in the main text and/or examples of the patents cited below. The details of the method of chemically sensitizing the various samples, as well as the chemical sensitizing agents, antifogging agents, and the like employed are omitted herein. However, preparation was conducted by suitable selection, combination, and/or variation based on the contents described in the main text and/or examples of the patents cited below.

The structure, chemical sensitization, and spectral sensitization of the emulsions were selected based on the contents described in the publications or specifications of EP573649B1; Japanese Patent No. 2912768; JP-A-11-249249, JP-A-11-295832, JP-A-11-72860; U.S. Pat. Nos. 5,985,534, 5,965,343; Japanese Patent Nos. 3002715, 3045624 and 3045623; JP-A-2000-275771; U.S. Pat. No. 6,172,110; JP-A-2000-321702, JP-A-2000-321700, JP-A-2000-321698; U.S. Pat. No. 6,153,370; JP-A-2001-92065; JP-A-2001-92064, JP-A-2000-92059, JP-A-2001-147501; U.S. Patent No. 2001/0006768A1; JP-A-2001-228572, JP-A-2001-255613, JP-A-2001-264911; U.S. Pat. No. 6,280,920B1; JP-A-2001-264912, JP-A-2001-281778; U.S. Pat. Nos. 6,287,753B1, 2002/0,006,590A1, 5,919,611, 2001/0,031,434A1, and the like.

The methods of manufacturing emulsions described in the various publications and specifications of: Japanese Patent No. 2878903; JP-A-11-143002, JP-A-11-143003, JP-A-11-174612; U.S. Pat. Nos. 5,925,508, 5,955,253; JP-A-11-327072; U.S. Pat. No. 5,989,800; Japanese Patent Nos. 3005382, 3014235; EP No. 0431585B1; U.S. Pat. No. 6,040,127A; Japanese Patent Nos. 3049647, 3045622, 3066692; EP No. 0563708B1; Japanese Patent No. 3091041; JP-A-2000-338620, JP-A-2001-83651, JP-A-2001-75213, JP-A-2001-100343; U.S. Pat. No. 6,251,577B1; EP No. 0563701B1; JP-A-2001-281780; and U.S. Patent No. 2001/0,036,606A1.

Example 10

Preparation and Evaluation of Silver Halide Photographic Light-Sensitive Material (Preparation of Sample 201)

1) The Support

The support employed in the present example was prepared by the following method:

One hundred weight parts of polyethylene-2,6-naphthalate polymer and 2 weight parts of ultraviolet absorbant in the form of Tinuvin P. 326 (made by Chiba-Geigy Co.) were dried, melted at 300° C., extruded from a T-shaped die, and longitudinally drawn by a factor of 3.3 at 140° C. The product was then laterally drawn by a factor of 3.3 at 130° C. and thermally hardened for 6 sec at 250° C., yielding a polyethylene naphthalate film 90 micrometers thick. Suitable quantities of blue dye, magenta dye, and yellow dye (Technology Disclosure Law: I-1, I-4, I-6, I-24, I-26, I-27, and II-5 described in Journal of Technical Disclosure No. 94-6023) were added to the film. It was then wound onto a stainless-steel spool 20 cm in diameter and subjected to a thermal history of 110° C. for 48 hours to obtain a support tending not to be scratched by winding.

2) Coating of the Underlayer

Both surfaces of the support were subjected to corona discharge processing, UV discharge processing, and glow discharge processing, after which an underlayer solution was coated (10 mL/$m^2$, using a bar coater) on both surfaces of the support in the proportions of 0.1 g/$m^2$ of gelatin, 0.01 g/$m^2$ of sodium α-sulfodi-2-ethylhexyl succinate, 0.04 g/$m^2$ of salicylic acid, 0.2 g/$m^2$ of p-chlorophenol, 0.012 g/$m^2$ of $(CH_2{=}CHSO_2CH_2CH_2NHCO)_2CH_2$, and 0.02 g/$m^2$ of polyamide-epichlorohydrin polycondensate to provide an underlayer on the high-temperature side during drawing. Drying was conducted for 6 min at 115° C. (the rollers and conveyor device in the drying zone were all at 115° C.).

3) Coating of the Backing

An antistatic layer, magnetic recording layer, and lubricating layer of the compositions given below were coated on one side of the support following the underlayer as a backing.

3-1) Coating of the Antistatic Layer

A dispersion of microparticulate powder in the form of tin oxide-antimony oxide complex with an average grain size of 0.005 micrometer and a resistivity of 5 Ohms·cm (and a secondary aggregate grain size of 0.08 micrometers) was applied to 0.2 g/$m^2$, gelatin was applied to 0.05 g/$m^2$, $(CH_2{=}CHSO_2CH_2CH_2NHCO)_2CH_2$ was applied to 0.02 g/$m^2$, poly(polymerization degree of 10)oxyethylene-p-nonylphenol was applied 0.005 g/$m^2$, and Resorcinol was applied.

3-2) Coating of Magnetic Recording Layer

Cobalt-γ-iron oxide (specific surface area 43 $m^2$/g, major axis 0.14 micrometer, single axis 0.03 micrometer, saturation magnetization 89 emu/g, $Fe^{+2}/Fe^{+3}$=6/94, surface treated with 2 weight percent of iron oxide quantity of aluminum oxide silicon oxide) that had been coated with 3-poly(polymerization degree of 15) oxyethylene-propyloxytrimethoxysilane (15 weight percent) was applied to 0.06 g/$m^2$, diacetyl cellulose was applied to 1.2 g/$m^2$ (the dispersion of the iron oxide was conducted with an open kneader and a sand mill), and hardener in the form of $C_2H_5C(CH_2OCONH—C_6H_3(CH_3)NCO)_3$ was applied to 0.3 g/$m^2$ using solvents in the form of acetone, methyl ethyl ketone, and cyclohexanone with a bar coater to obtain a magnetic recording layer with a film thickness of 1.2 micrometers. An abrasive in the form of aluminum oxide (0.15 micrometer) coated with 3-poly(polymerization degree of 15)oxyethylene-propyloxytrimethoxysilane (15 weight percent) and silica grains were each added as matting agents in a proportion of 10 mg/$m^2$. Drying was conducted for 6 min at 115° C. (the rollers and conveyor device in the drying zone were all at 115° C.). The DB color density added component of the magnetic recording layer with an X-lite blue filter was about 0.1. The magnetic recording layer had a saturation magnetization moment of 4.2 emu/g, a coercivity of $7.3\times10^4$ A/m, and a squareness of 65 percent.

3-3) Preparation of Lubricating Layer

Diacetyl cellulose (25 mg/$m^2$) and a mixture of $C_6H_{13}CH(OH)C_{10}H_{20}COOC_{40}H_{81}$ (Compound a, 6 mg/$m^2$) and $C_{50}H_{101}O(CH_2CH_2O)_{16}H$ (Compound b, 9 mg/$m^2$) were applied. The mixture was added after dissolution in xylene/propylene monomethyl ether (1/1) at 105° C., dispersion by pouring into ordinary temperature propylene monomethyl ether (a 10-fold quantity), and formation of a dispersion in acetone (average grain size 0.01 micrometer). Matting agents in the form of silica grains (0.3 micrometer) and an abrasive in the form of aluminum oxide (0.15 micrometer) coated with 3-poly(polymerization degree of 15) oxyethylene-propyloxytrimethoxysilane (15 weight percent) were each added to 15 mg/$m^2$. Drying was conducted for 6 min at 115° C. (the rollers and conveyor device in the drying zone were all at 115° C.). The lubricating layer had a coefficient of dynamic friction of 0.06 (stainless steel balls 5 mm in diameter, load of 100 g, speed of 6 cm/min) and a coefficient of static friction of 0.07 (clip method). Good characteristics were also achieved in that the coefficients of dynamic friction of the emulsion surface and lubricating surface were both 0.12.

4) Coating of the Light-Sensitive Layers

Next, various layers of the compositions given below were multilayer coated on the side opposite from the backing applied as set forth above to prepare a sample of a color negative light-sensitive material.

(Composition of Light-Sensitive Layers)

The numbers corresponding to the individual components denote the quantity applied in units of g/$m^2$. The quantities of silver halides coated are given based on silver.

| | | |
|---|---|---|
| Layer 1 (First antihalation layer) | | |
| Black colloidal silver | Silver | 0.010 |
| Gelatin | | 0.66 |
| ExM-1 | | 0.048 |
| Cpd-2 | | 0.001 |
| F-8 | | 0.001 |
| HBS-1 | | 0.090 |
| HBS-2 | | 0.010 |
| Layer 2 (Second antihalation layer) | | |
| Black colloidal silver | Silver | 0.010 |
| Gelatin | | 0.80 |
| ExM-1 | | 0.057 |
| ExF-1 | | 0.002 |
| F-8 | | 0.001 |
| HBS-1 | | 0.090 |
| HBS-2 | | 0.010 |
| Layer 3 (Intermediate layer) | | |
| ExC-2 | | 0.010 |
| Cpd-1 | | 0.086 |
| UV-2 | | 0.029 |
| UV-3 | | 0.052 |
| UV-4 | | 0.011 |
| HBS-1 | | 0.100 |
| Gelatin | | 0.580 |
| Layer 4 (Low-sensitivity red-sensitive emulsion layer) | | |
| Em-M | Silver | 0.42 |
| Em-N | Silver | 0.52 |
| Em-O | Silver | 0.10 |
| ExC-1 | | 0.222 |
| ExC-2 | | 0.012 |
| ExC-3 | | 0.72 |
| ExC-4 | | 0.148 |
| ExC-5 | | 0.005 |
| ExC-6 | | 0.008 |
| ExC-8 | | 0.071 |
| ExC-9 | | 0.010 |
| UV-2 | | 0.036 |
| UV-3 | | 0.067 |

-continued

| | | |
|---|---|---|
| UV-4 | | 0.014 |
| Cpd-2 | | 0.010 |
| Cpd-4 | | 0.012 |
| HBS-1 | | 0.240 |
| HBS-5 | | 0.010 |
| Gelatin | | 1.50 |
| Layer 5 (Intermediate-sensitivity red-sensitive emulsion layer | | |
| Em-L | Silver | 0.38 |
| Em-M | Silver | 0.28 |
| ExC-1 | | 0.110 |
| ExC-2 | | 0.040 |
| ExC-3 | | 0.018 |
| ExC-4 | | 0.074 |
| ExC-5 | | 0.019 |
| ExC-6 | | 0.024 |
| ExC-8 | | 0.010 |
| ExC-9 | | 0.021 |
| Cpd-2 | | 0.020 |
| Cpd-4 | | 0.021 |
| HBS-1 | | 0.129 |
| Gelatin | | 0.90 |
| Layer 6 (High-sensitivity red-sensitive emulsion layer) | | |
| Em-K1 | Silver | 1.40 |
| ExC-1 | | 0.122 |
| ExC-6 | | 0.032 |
| ExC-8 | | 0.110 |
| ExC-9 | | 0.005 |
| ExC-10 | | 0.159 |
| Cpd-2 | | 0.068 |
| Cpd-4 | | 0.011 |
| HBS-1 | | 0.440 |
| Gelatin | | 1.510 |
| Layer 7 (Intermediate layer) | | |
| Cpd-1 | | 0.081 |
| Cpd-6 | | 0.002 |
| Solid dispersion dye ExF-4 | | 0.015 |
| HBS-1 | | 0.049 |
| Polyethyl acrylate latex | | 0.088 |
| Gelatin | | 0.759 |
| Layer 8 (Layer imparting multilayer effect to red-sensitive layer) | | |
| Em-E | Silver | 0.40 |
| Cpd-4 | | 0.010 |
| ExM-2 | | 0.082 |
| ExM-3 | | 0.006 |
| ExM-4 | | 0.026 |
| ExY-1 | | 0.010 |
| ExY-4 | | 0.040 |
| ExC-7 | | 0.007 |
| HBS-1 | | 0.203 |
| HBS-3 | | 0.003 |
| HBS-5 | | 0.010 |
| Gelatin | | 0.520 |
| Layer 9 (Low-sensitivity green-sensitive emulsion layer) | | |
| Em-H | Silver | 0.15 |
| Em-I | Silver | 0.23 |
| Em-J | Silver | 0.26 |
| ExM-2 | | 0.388 |
| ExM-3 | | 0.040 |
| ExY-1 | | 0.003 |
| ExY-3 | | 0.002 |
| ExC-7 | | 0.009 |
| HBS-1 | | 0.337 |
| HBS-3 | | 0.018 |
| HBS-4 | | 0.260 |
| HBS-5 | | 0.110 |
| Cpd-5 | | 0.010 |
| Gelatin | | 0.470 |
| Layer 10 (Intermediate-sensitivity green-sensitive emulsion layer) | | |
| Em-G | Silver | 0.30 |
| Em-H | Silver | 0.12 |
| ExM-2 | | 0.084 |
| ExM-3 | | 0.012 |
| ExM-4 | | 0.005 |

-continued

| | | |
|---|---|---|
| ExY-3 | | 0.002 |
| ExC-6 | | 0.003 |
| ExC-7 | | 0.007 |
| ExC-8 | | 0.008 |
| HBS-1 | | 0.096 |
| HBS-3 | | 0.002 |
| HBS-5 | | 0.002 |
| Cpd-5 | | 0.004 |
| Gelatin | | 0.42 |
| Layer 11 (High-sensitivity green-sensitive emulsion layers) | | |
| Em-F | Silver | 1.20 |
| ExC-6 | | 0.002 |
| ExC-8 | | 0.010 |
| ExM-1 | | 0.014 |
| ExM-2 | | 0.023 |
| ExM-3 | | 0.023 |
| ExM-4 | | 0.005 |
| ExM-5 | | 0.040 |
| ExY-3 | | 0.003 |
| ExA'-2 | | $2.0 \times 10^{-5}$ |
| Cpd-3 | | 0.004 |
| Cpd-5 | | 0.010 |
| HBS-1 | | 0.259 |
| HBS-5 | | 0.020 |
| Polyethyl acrylate latex | | 0.099 |
| Gelatin | | 1.11 |
| Layer 12 (Yellow filter layer) | | |
| Cpd-1 | | 0.088 |
| Solid dispersion dye ExF-2 | | 0.051 |
| Solid dispersion dye ExF-8 | | 0.010 |
| HBS-1 | | 0.049 |
| Gelatin | | 0.54 |
| Layer 13 (Low-sensitivity blue-sensitive emulsion layer) | | |
| Em-B | Silver | 0.50 |
| Em-C | Silver | 0.15 |
| Em-D | Silver | 0.10 |
| ExC-1 | | 0.024 |
| ExC-7 | | 0.011 |
| ExY-1 | | 0.002 |
| ExY-2 | | 0.956 |
| ExY-4 | | 0.091 |
| Cpd-2 | | 0.037 |
| Cpd-3 | | 0.004 |
| HBS-1 | | 0.372 |
| HBS-5 | | 0.047 |
| Gelatin | | 2.01 |
| Layer 14 (High-sensitivity blue-sensitive emulsion layer) | | |
| Em-A | Silver | 1.22 |
| ExY-2 | | 0.235 |
| ExY-4 | | 0.018 |
| ExA'-2 | | $2.4 \times 10^{-5}$ |
| Cpd-2 | | 0.075 |
| Cpd-3 | | 0.001 |
| HBS-1 | | 0.087 |
| Gelatin | | 1.30 |
| Layer 15 (First protective layer) | | |
| 0.07 micrometer silver iodobromide emulsion | Silver | 0.25 |
| UV-1 | | 0.358 |
| UV-2 | | 0.179 |
| UV-3 | | 0.254 |
| UV-4 | | 0.025 |
| F-11 | | 0.0081 |
| S-1 | | 0.078 |
| ExF-5 | | 0.0024 |
| ExF-6 | | 0.0012 |
| ExF-7 | | 0.0010 |
| HBS-1 | | 0.175 |
| HBS-4 | | 0.050 |
| Gelatin | | 1.81 |
| Layer 16 (Second protective layer) | | |
| H-1 | | 0.400 |
| B-1 (diameter 1.7 micrometers) | | 0.050 |
| B-2 (diameter 1.7 micrometers) | | 0.150 |

-continued

| | |
|---|---|
| B-3 | 0.050 |
| S-1 | 0.200 |
| Gelatin | 0.75 |

W-1 to W-6, B-4 to B-6, F-1 to F-17, lead salt, platinum salt, iridium salt, and rhodium salt were suitably added to the individual layers to improve storage stability, treatment properties, pressure durability, antifungal and antibacterial properties, antistatic properties, and coating properties.

(Preparation of Emulsions Em-K2 to K10)

Emulsions K2 to K7 were prepared in the same manner as Emulsion Em-K1 with the exception that only 25 mg per mol of silver halide of a prescribed polymer was added at the end of chemical sensitization, as indicated in Table 13 below.

Emulsions K8 to K10 were prepared in the same manner, with the exception that just the quantities of the polymers of the comparative examples shown in Table 13 were added per mol of silver halide at the end of chemical sensitization.

(Preparation of Samples 202 to 210) Multilayer color light-sensitive materials were prepared in the same manner as Sample 201 with the exception that Emulsion Em-K1 in Layer 6 of Sample 201 was replaced with Emulsions Em-K2 to Em-K10 in such a manner that the amount of silver remained constant.

(Measurement of Specific Photographic Sensitivity)

The international standard of sensitivity, ISO, is generally employed for the sensitivity of photographic light-sensitive materials. In ISO sensitivity, a light-sensitive material is developed on the fifth day following exposure and the development is conducted as specified by the individual company. In the present invention, the time between exposure and development was shortened and a fixed development process was conducted.

The method of determining specific photographic sensitivity was in accordance with JIS K 7614-1981. The difference lay in that development was completed at least 30 minutes after, and not more than six hours after, sensitometric exposure, and in that development processing was conducted based on the Fujicolor Processing Formula CN-16 recorded below. The remainder was essentially identical to the measurement method described in JIS.

The test conditions, exposure, density measurement, and method of determining specific photographic sensitivity described in JP-A-63-226650 were employed in addition to the developing process indicated below.

Developing was conducted based on the description below using a Fuji Photo Film Co. Automatic Developer FP-360B. Modifications were made so that the overflow solution from the bleaching bath did not flow into the rear bath, but was entirely discharged into a waste solution tank. The FP-360B was equipped with the evaporation compensating device described in Journal of Technical Disclosure No. 94-4992 (published by JIII). The processing steps and processing solution composition employed are described in Example 11 of JP-A-2002-55412.

The relative sensitivity of each of the color-sensitive layers was calculated based on the above-described method of measuring specific photographic sensitivity.

Fogging was defined as the minimum value of yellow density, magenta density, and cyan density ($D_{Ymin}$, $D_{Mmin}$, $D_{Cmin}$), and the sensitivity of each color-sensitive layer was defined as the log of the reciprocal of the exposure level giving a density 0.15 higher than $D_{Ymin}$, $D_{Mmin}$, $D_{Cmin}$. The sensitivity value of the red-sensitive layer of each sample was denoted as a value relative to Sample 201.

(Measurement of Granularity)

The same process was employed as when measuring specific photographic sensitivity and the conventional root mean square (RMS) method was employed to measure granularity. In this process, exposure was 0.005 Lux·sec, and measurement was conducted by RMS with an aperture 48 micrometers in diameter.

(Measurement of Granularity Following Dissolution and the Passage of Time)

The various emulsions in layer 6 of Samples 201 to 210 were dissolved at 40° C. and left standing for 8 hours, after which samples were prepared under the same coating conditions as for Samples 201 to 212. These samples subjected to the same processing as in the measurement of specific photographic sensitivity to measure the above-described granularity (the granularity of Sample 201 was made 100). The emulsion of the present invention was found to afford improvement in the deterioration of granularity during coating following dissolution and the passage of time, as well as good suitability to manufacturing.

(Evaluation of Pressure Durability)

The following test was conducted to evaluate the pressure durability of the samples.

The samples were adjusted to a temperature of 25° C. at a humidity of 55 percent. After scratching the emulsion surface in a certain direction with a 0.05 mm fine needle to which was applied a load of 4 g, the above-described methods were employed for exposure, development, and density measurement. The difference in density (ΔD) between scratched portions and unscratched portions was calculated at an exposure level yielding a density 0.15 higher than the $D_{Ymin}$, $D_{Mmin}$, and $D_{Cmin}$ calculated by the above-described exposure, development, and density measurement of an unscratched sample. The smaller the ΔD, the better the pressure durability. The sum of the ΔDs of the individual color-sensitive layers was used as an evaluation value indicating pressure durability.

The test results are given in Table 13.

TABLE 13

| Sample No. | Emulsion | Added polymer (mg/2 mol of AgX) | Sensitivity | Granularity | Granularity after passage of time | Pressure durability | Note |
|---|---|---|---|---|---|---|---|
| 201 | Em-K1 | No | 100 | 100 | 130 | 0.11 | Comparative |
| 202 | Em-K2 | WP'-1 (25) | 100 | 98 | 101 | 0.04 | Invention |
| 203 | Em-K3 | WP'-2 (25) | 100 | 98 | 102 | 0.06 | Invention |
| 204 | Em-K4 | WP'-3 (25) | 99 | 98 | 101 | 0.08 | Invention |
| 205 | Em-K5 | WP'-11 (25) | 98 | 98 | 105 | 0.05 | Invention |
| 206 | Em-K6 | WP'-12 (25) | 99 | 98 | 104 | 0.05 | Invention |
| 207 | Em-K7 | WP'-13 (25) | 100 | 98 | 108 | 0.07 | Invention |
| 208 | Em-K8 | WP'-21 (25) | 100 | 135 | 120 | 0.10 | Comparative |

Polymers Used in Comparative Examples $Y^1-(X)-Y^2$ At least one of $Y^1$ and $Y^2$ is $HS-Z-L^1-$

| No. | $HS-Z-L^1-$ | $-(X)-$ |
|---|---|---|
| WP'-21 | No | 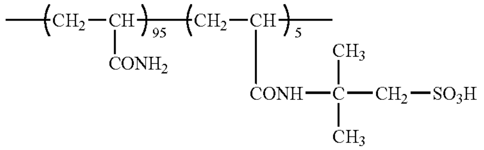 Mn = 72000 |

The results presented in Table 13 reveal that the emulsion grains employing the polymer of the present invention underwent little deterioration in granularity following dissolution and the passage of time. Further, light-sensitive materials employing the polymer of the present invention were found to undergo little change due to pressure.

What is claimed is:

1. A mercapto group-containing polymer compound represented by the following formula (2-A):

Formula (2-A)

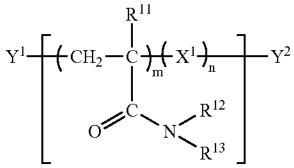

wherein $R^{11}$ represents a hydrogen atom or methyl group;

$R^{12}$ and $R^{13}$ each independently represents a hydrogen atom or a substituent;

$X^1$ represents a unit of a monomer having an ethylenic unsaturated bond, and $(X^1)_n$ optionally comprises two or more monomers;

m and n represent weight ratios of the monomer units, and m+n=100; the copolymer of the monomer unit in the formula is optionally in the form of any of a random copolymer, a block copolymer and an alternating copolymer; and $Y^1$ and $Y^2$ represent an end group, and at least one of them represents a mercapto group represented as HS-Z-$L^1$— where Z represents a nitrogen-containing aromatic ring, and $L^1$ represents a divalent bridging group selected from the group consisting of

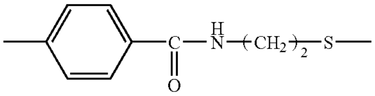

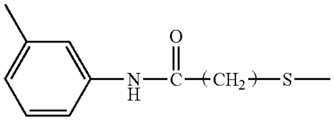

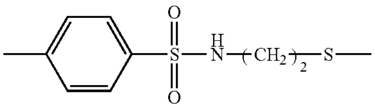

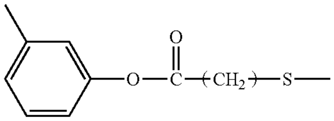

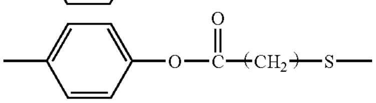

and

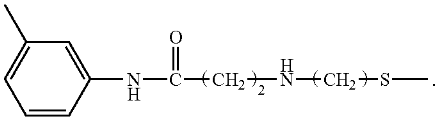

.

2. A mercapto group-containing polymer compound represented by the following formula (2-B):

Formula (2-B)

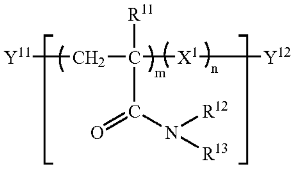

wherein $R^{11}$ represents a hydrogen atom or methyl group;

$X^1$ represents a unit of a monomer having an ethylenic unsaturated bond, and $(X^1)_n$ optionally comprises two or more monomers;

m and n represent weight ratios of the monomer units, and m+n=100; the copolymer of the monomer unit in the formula is optionally in the form of any of a random copolymer, a block copolymer and an alternating copolymer; and $Y^{11}$ and $Y^{12}$ represent an end group, and at least one of them represents a group represented by the following formula (3):

Formula (3)

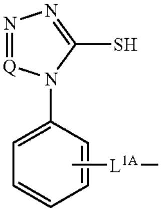

wherein $L^{1A}$ represents a divalent bridging group or a single bond selected from the group consisting of

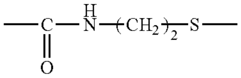

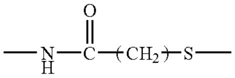

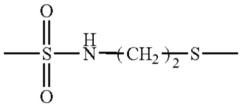

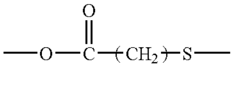

and

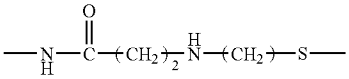

;

and Q represents N, CH or C—SH.

3. A mercapto group-containing polymer compound represented by the following formula (2-C):

Formula (2-C)

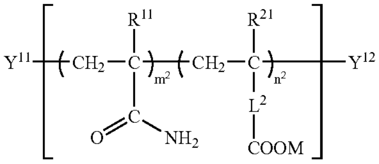

wherein $R^{11}$ represents a hydrogen atom or methyl group;

$R^{21}$ represents a hydrogen atom or methyl group;

$L^2$ represents a divalent bridging group or a single bond;

$m^2$ and $n^2$ represent weight ratios of the monomer units, and $m^{2+n2}$=100;

M represents a hydrogen atom or a cation;

the copolymer of the monomer unit in the formula is optionally in the form of any of a random copolyrner, a block copolymer and an alternating copolymer;

$Y^{11}$ and $Y^{12}$ represent an end group, and at least one of them represents a group represented by the following formula (3):

Formula (3)

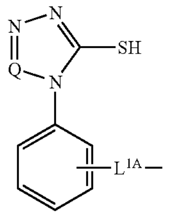

wherein $L^{1A}$ represents a divalent bridging group selected from the group consisting of

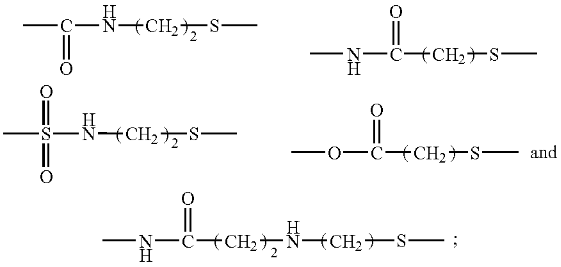

and

;

and Q represents N, CH or C—SH.

4. A mercapto group-containing polymer compound represented by the following formula (2-D):

Formula (2-D)

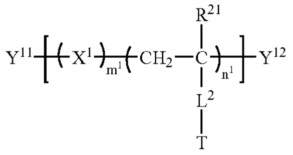

wherein $R^{21}$ represents a hydrogen atom or methyl group;

$X^1$ represents a unit of a monomer having an ethylenic unsaturated bond, and $(X^1)_{m1}$ optionally comprises two or more monomers;

$m^1$ and $n^1$ represent weight ratios of the monomer units, and $m^1+n^1$=100; $L^2$ represents a divalent bridging group or a single bond;

T represents —$SO_3M$ or —P(O)—$(OM)_2$ where M represents a hydrogen atom or a monovalent cation;

the copolymer of the monomer unit in the formula is optionally in the form of any of a random copolyrner, a block copolymer and an alternating copolymer;

$Y^{11}$ and $Y^{12}$ represent an end group, and at least one of them represents a group represented by the following formula (3):

Formula (3)

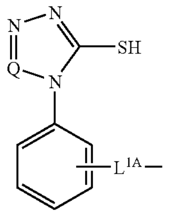

wherein $L^{1A}$ represents a divalent bridging group selected from the group consisting of

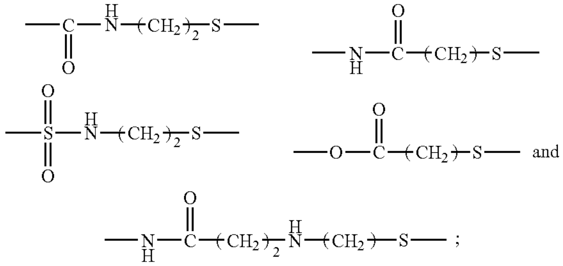

and

;

and Q represents N, CH or C—SH.

5. The mercapto group-containing polymer compound according to claim 1, wherein Z represents a divalent tetrazole ring group.

6. The mercapto group-containing polymer compound according to claim 1, wherein said mercapto group-containing polymer compound is water-soluable.

7. The mercapto group-containing polymer compound according to claim 1, wherein said mercapto group-containing polymer compound has a number average molecular weight of 5,000 or more.

8. The mercapto group-containing polymer compound according to claim 2, wherein Q in formula (3) is N.

9. The mercapto group-containing polymer compound according to claim 2, wherein said mercapto group-containing polymer compound is water-soluable.

10. The mercapto group-containing polymer compound according to claim 2, wherein said mercapto group-containing polymer compound has a number average molecular weight of 5,000 or more.

11. The mercapto group-containing polymer compound according to claim 3, wherein $L^2$ in formula (2-C) is selected from the group consisting of

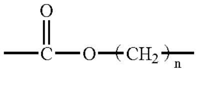

and

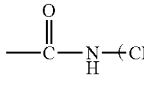

.

n = 1~9 n = 1~9

12. The mercapto group-containing polymer compound according to claim 3, wherein Q in formula (3) is N.

13. The mercapto group-containing polymer compound according to claim 3, wherein said mercapto group-containing polymer compound is water-soluble.

14. The mercapto group-containing polymer compound according to claim 3, wherein said mercapto group-containing polymer compound has a number average molecular weight of 5,000 or more.

15. The mercapto group-containing polymer compound according to claim 4, wherein $L^2$ in formula (2-D) is selected from the group consisting of

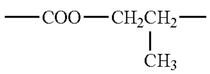

, $-COO-CH_2CH_2CH_2-$ ,

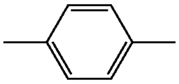

and

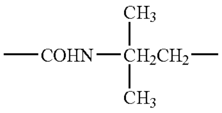

.

16. The mercapto group-containing polymer compound according to claim 4, wherein Q in formula (3) is N.

17. The mercapto group-containing polymer compound according to claim 4, wherein said mercapto group-containing polymer compound is water-soluble.

18. The mercapto group-containing polymer compound according to claim 4, wherein said mercapto group-containing polymer compound has a number average molecular weight of 5,000 or more.

* * * * *